(12) United States Patent
Yamamoto et al.

(10) Patent No.: US 11,781,912 B2
(45) Date of Patent: Oct. 10, 2023

(54) PHOTON COUNTING AND SPECTROSCOPY

(71) Applicant: MIFTEK CORPORATION, West Lafayette, IN (US)

(72) Inventors: Masanobu Yamamoto, West Lafayette, IN (US); Keegan Hernandez, Crown Point, IN (US); J. Paul Robinson, West Lafayette, IN (US)

(73) Assignee: MIFTEK CORPORATION, West Lafayette, IN (US)

( * ) Notice: Subject to any disclaimer, the term of this patent is extended or adjusted under 35 U.S.C. 154(b) by 0 days.

(21) Appl. No.: 17/536,068

(22) Filed: Nov. 28, 2021

(65) Prior Publication Data

US 2022/0082440 A1 Mar. 17, 2022

Related U.S. Application Data

(63) Continuation of application No. 16/604,557, filed as application No. PCT/US2018/027302 on Apr. 12, 2018, now Pat. No. 11,187,584.

(60) Provisional application No. 62/485,207, filed on Apr. 13, 2017.

(51) Int. Cl.
 *G01J 3/44* (2006.01)
 *G01J 3/02* (2006.01)

(52) U.S. Cl.
 CPC ........... *G01J 3/4406* (2013.01); *G01J 3/0218* (2013.01); *G01J 3/0227* (2013.01)

(58) Field of Classification Search
 CPC ...... G01J 3/4406; G01J 3/0218; G01J 3/0227; G01J 3/0208; G01J 3/44; G01J 3/18; G01J 3/0221; G01J 2001/442; G01N 15/1459; G01N 2015/1006; G01N 15/1429; G01N 21/645; G01N 21/71
 See application file for complete search history.

(56) References Cited

U.S. PATENT DOCUMENTS

| | | | | | |
|---|---|---|---|---|---|
| 5,574,790 | A | * | 11/1996 | Liang | G07D 7/121 380/54 |
| 6,049,380 | A | * | 4/2000 | Goodwin | G01N 21/6428 250/458.1 |
| 6,177,277 | B1 | * | 1/2001 | Soini | G01N 15/1434 436/63 |
| 2008/0317200 | A1 | * | 12/2008 | Lecomte | G01T 1/2985 378/19 |
| 2011/0222051 | A1 | * | 9/2011 | Heng | G01N 15/147 356/73 |

(Continued)

*Primary Examiner* — Abdullahi Nur
(74) *Attorney, Agent, or Firm* — Piroozi-IP, LLC

(57) ABSTRACT

A measurement system includes an optical source (e.g., laser) to irradiate a sample (e.g., a cell); a solid-state photon detector (SSPD) to receive resultant light from the sample; and a photon counter to count photons received by the SSPD. The photon counter can include a differentiator to provide a differentiated photon signal and a crossing detector configured to count photons based on a number of times the differentiated photon signal crosses a predetermined threshold level. In some examples, a pulse detector can provide a pulse-width signal from the SSPD output photon signal, and a pulse counter can count based on both a number of pulses and widths of the pulses. The SSPD can include a silicon photomultiplier (SiPM) array or a solid-state photomultiplier. Some examples use the measurement system to measure samples in fluids, e.g., in flow cytometers or multi-well plates.

10 Claims, 28 Drawing Sheets

(56) References Cited

U.S. PATENT DOCUMENTS

2013/0323858 A1* 12/2013 Abdulhalim ..... G01N 33/54373
        422/69
2018/0038966 A1*  2/2018 Fu ......................... G01T 1/2018
2018/0348141 A1* 12/2018 Hardman ................. G01J 1/44

* cited by examiner

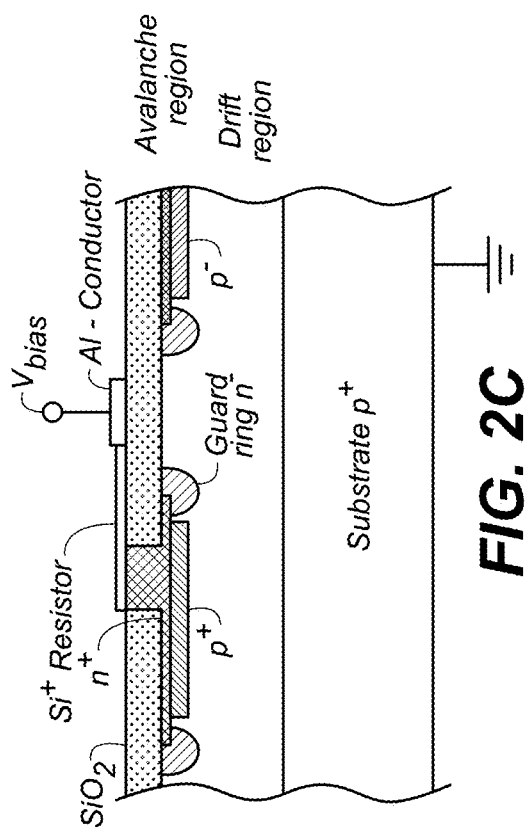
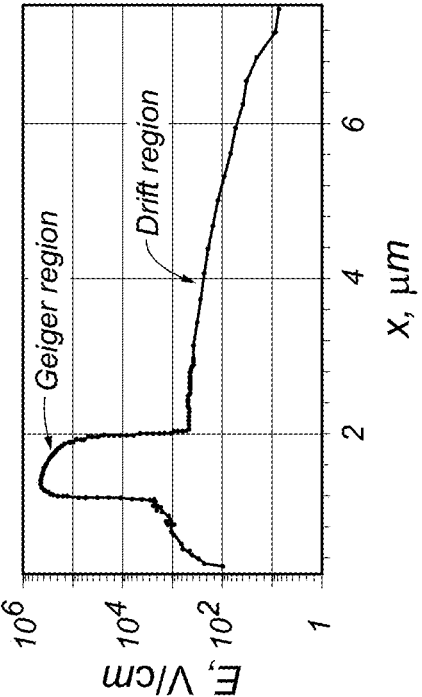
FIG. 2C
FIG. 2D
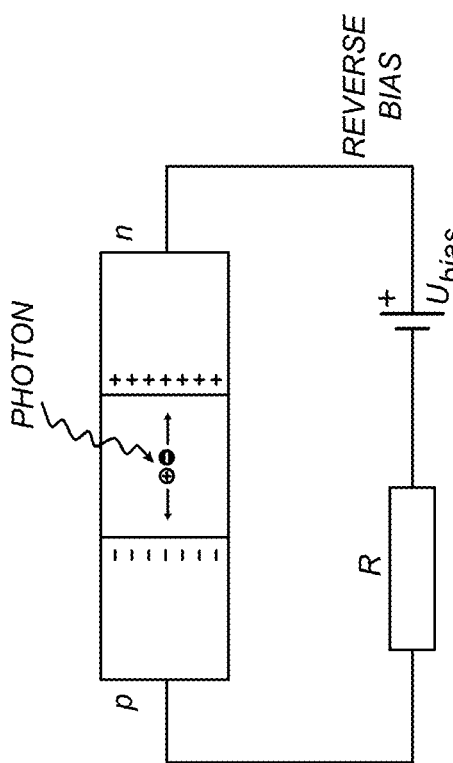
FIG. 2A
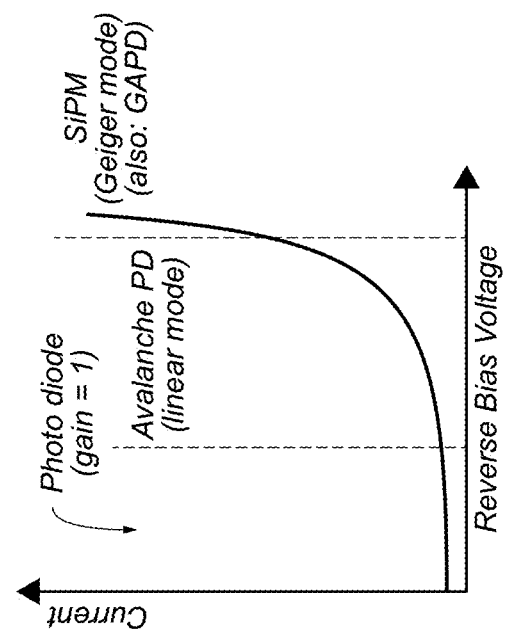
FIG. 2B

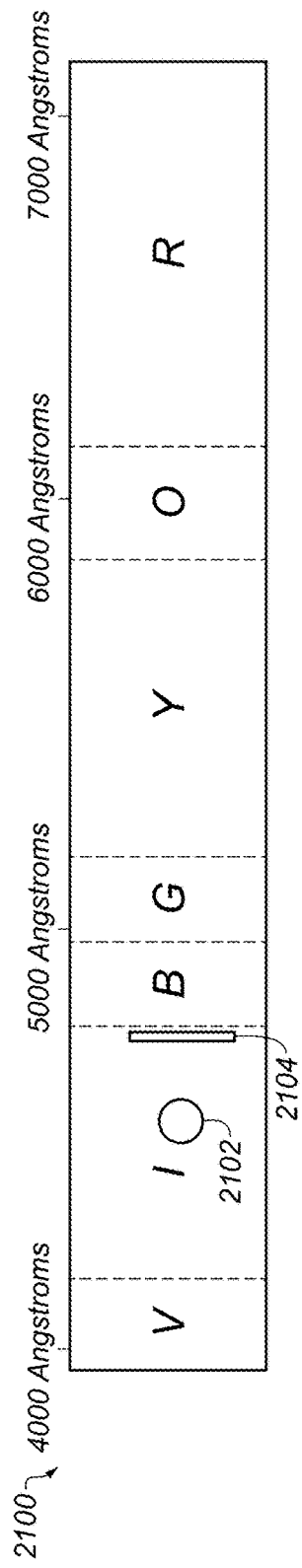
FIG. 21A
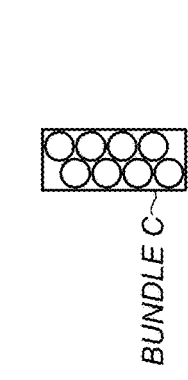
FIG. 21B
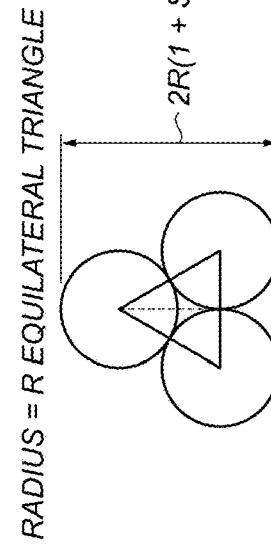
FIG. 21C
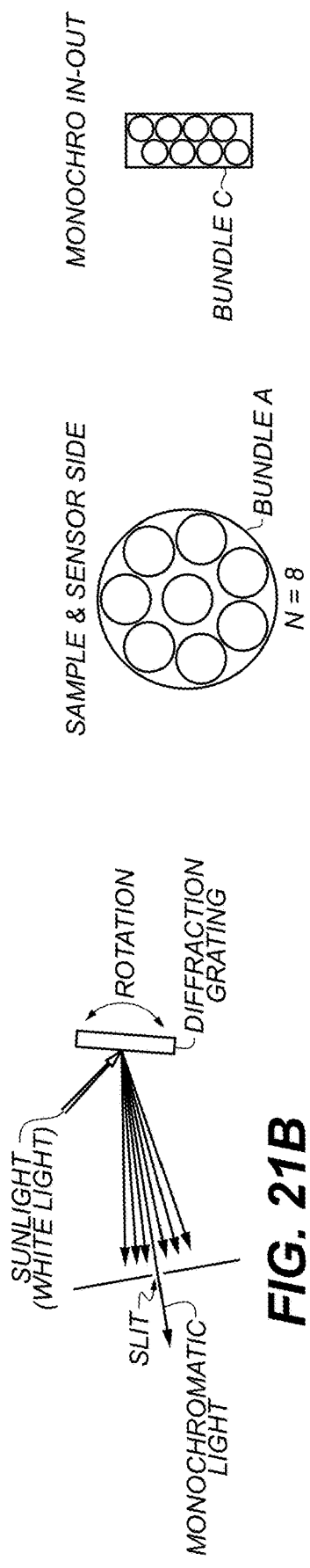
FIG. 21D
FIG. 21E
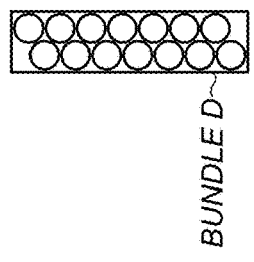
FIG. 21F
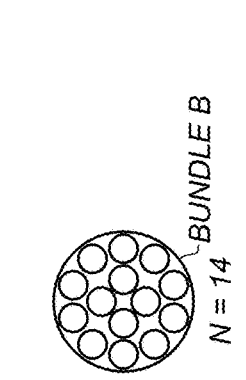
FIG. 21G

PHOTON COUNTING AND SPECTROSCOPY

CROSS-REFERENCE TO RELATED APPLICATIONS

This application is a continuation application of a U.S. nationalization application Ser. No. 16/604,557, filed Oct. 10, 2019 entitled Photon Counting and Spectroscopy from an international application No. PCT/US18/27302, filed Apr. 12, 2018 entitled Photon Counting and Spectroscopy which claims priority to, and the benefit of, U.S. Provisional Patent Application No. 62/485,207, filed Apr. 13, 2017 and entitled "Photon Counting and Spectroscopy," which is incorporated herein by reference.

BRIEF DESCRIPTION OF THE DRAWINGS

Objects, features, and advantages of various aspects will become apparent when taken in conjunction with the following description and drawings. Identical reference numerals have been used, where possible, to designate identical features that are common to the figures. The attached drawings are for purposes of illustration and are not necessarily to scale.

FIG. 2A shows an example structure of a silicon photomultiplier (SiPM) circuit.

FIG. 2B shows example characteristics of an SiPM.

FIG. 2C is an elevational cross-section of an example SiPM.

FIG. 2D shows electric-field characteristics of an example SiPM.

FIG. 21A shows a spectrum spread spatially, and example fiber-bundle shapes.

FIG. 21B depicts components and operation of an example monochromator.

FIG. 21C shows a cross-section illustrating dense packing of optical fibers.

FIG. 21D shows an example circular fiber bundle.

FIG. 21E shows another example circular fiber bundle.

FIG. 21F shows an example rectilinear fiber bundle.

FIG. 21G shows another example rectilinear fiber bundle.

DETAILED DESCRIPTION

Overview

Figure 1:
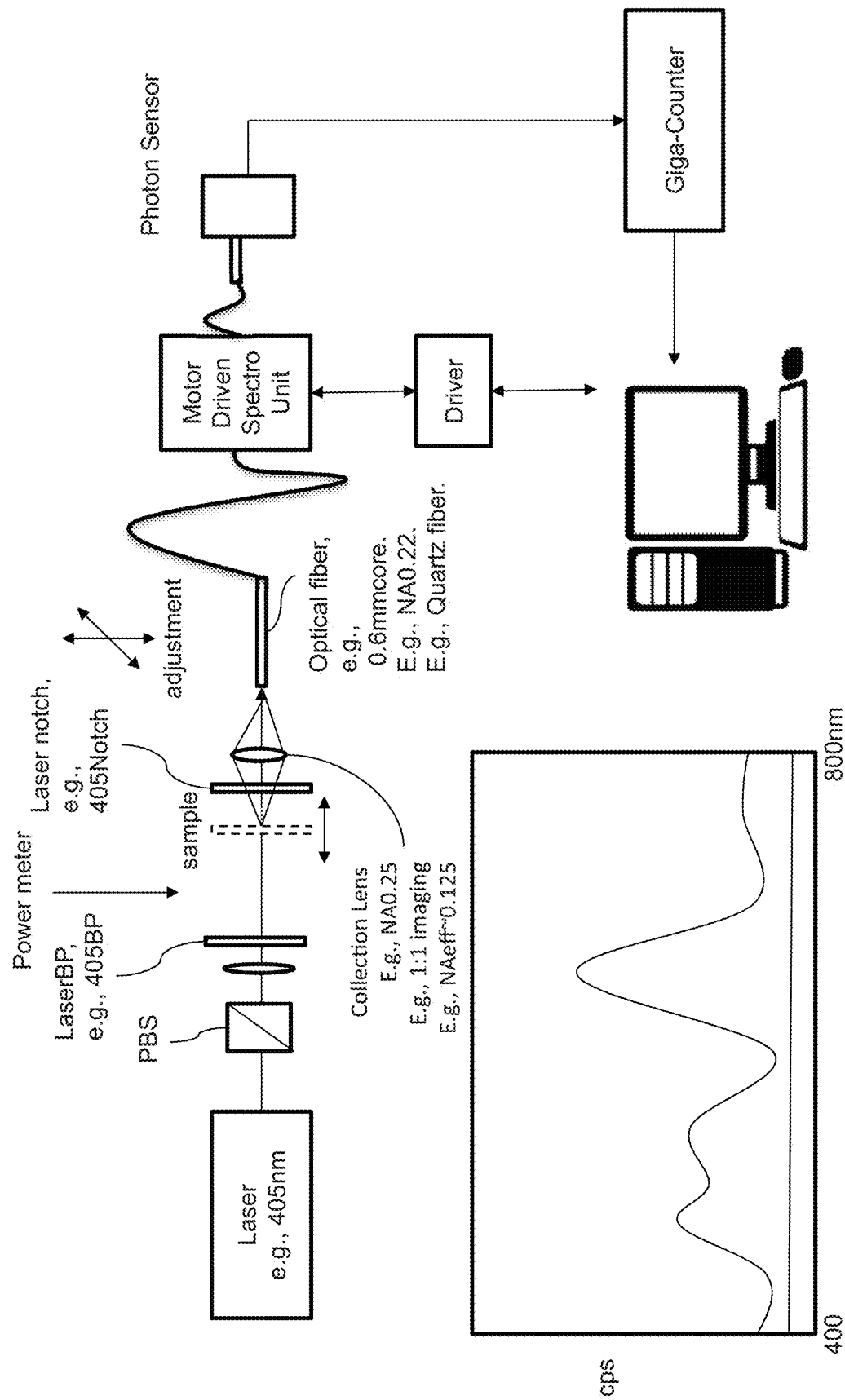
FIG. 1 shows a block diagram of an example excited-photon spectrum measurement/analysis system.

Various aspects relate to a silicon (Si)-based photon sensor and excited photon spectrum analyzer, e.g., a differential Geiger-mode photon spectroscope. Various examples receive photons at a solid-state photodetector that provides an output signal, then pass the output signal through a differentiator to provide a signal representative of the number or rate of photons striking the photodetector. Various examples count pulses or pulse widths of this representative signal to determine the rate of photons striking the photodetector. Various aspects can be used in flow cytometry, but are not limited thereto. Various aspects provide increased sensitivity and dynamic range compared to prior schemes. Various aspects relate to Single Photon Spectroscopy, e.g., counting each individual photon striking a photodetector. Various aspects can provide increased sensitivity for hyperspectral analysis, compared to prior schemes.

Laser induced fluorescence (LIF) analysis can be performed by photon counting for basic materials in flow cytometry, microscopy, imaging, and material science. Auto fluorescence (AFL) and photo bleaching phenomena in quartz, glass, sheath fluid, or other biological materials can be measured based on total photon counting over detectable spectral ranges. In order to investigate low level fluorescence, single photon spectral analysis with high spectral resolution can be performed in the spectral domain (i.e., across various wavelengths of light). Various aspects herein include devices, systems, and methods for performing single photon spectrometry. Various aspects use a motorized monochromator and a photon detector as described herein. Various aspects can measure the phenomena described in this paragraph, or optical characteristics of glass, quartz, or other light-transfer or -blocking materials, e.g., materials used in optical filters, lenses, or other components; in optically-clear vessels or adhesives; or in optical stops.

Various aspects permit using single-photon detection in flow cytometry, microscopy, or imaging. Various examples permit using single-photon detection in physics and chemistry experiments, e.g., the evaluation of materials such as optical components or other materials. Other examples of materials can include liquids, e.g., reagents, fluorochromes, buffers, or consumable liquids such as oils, wine, beer, juice, or water. Various examples of material evaluation permit measuring properties of materials with higher sensitivity and speed than some prior schemes, and at multiple wavelengths of light. Some examples permit evaluating properties of carbon nanotubes or other nanostructured materials. Such properties can include perhaps absorbance, autofluorescence, or reflectance. Some examples include measuring such properties using techniques described herein, and comparing the measured properties to references (e.g., in a database) to determine qualitative characteristics of the materials. Such characteristics can include, e.g., whether the materials are genuine.

In a tested example, samples were illuminated by 405-nm laser light in a 100 μm-diameter spot (after a bandpass filter) to reduce or eliminate accelerated spontaneous emission (ASE). Excited fluorescence on the optical axis was collected by a NA 0.125 lens and coupled to NA 0.22 optical fiber (after a laser wavelength notch filter). In some examples, e.g., using a filter with an optical density of about six (OD6), an additional notch or long pass filter can be used to separate laser illumination and induced fluorescence. The optical fiber was connected to a motorized monochromator having a 500 nm/sec scanning speed over a 200-900 nm spectral range. A synchronized stepping motor was used to drive a reflective grating. Photoelectrons were counted in a preset gating time for each spectral step selected. This permitted measuring at spectral steps of 1 nm and time intervals (gating times) of 0.1 sec. Counted photoelectrons were measured at specific photon energy levels. Such measurements can be performed in the spectral domain or the time domain. In some examples, spectral steps can be between ~0.1 nm and ~10 nm. In some examples, gating times can be between ~1 ms and ~10 s.

Various examples permit measuring or characterizing AFL spectra and bleaching phenomena, e.g., of basic materials used in flow cytometry instruments. Some examples permit observing spectra such as Raman spectra excited by laser wavelength, impurities, and molecular structures in materials. Single photon spectroscopy as described herein can provide increased sensitivity and wide dynamic range compared to prior schemes. Some examples can permit quantitative analysis of fluorescence, which can permit investigation of material characteristics as well as bio assays that exhibit lower levels of fluorescence than do assays testable by some prior techniques.

Various examples include a silicon (Si) photon sensor and single photon spectrometer that provide high sensitivity and permit quantitative analysis for fluorescence using relatively short measurement times. Single photon spectroscopy can permit next-generation cellular analysis and material improvement. Some examples can collect samples in microsecond-scale time windows via parallel spectral detection.

Various aspects relate to a wide-dynamic-range Si Photon Detection System using a differential Geiger-mode sensor. Digital photon detection based on the Einstein-Planck equation can permit sensing small numbers of photons. However, for photodetection in the context of biology, e.g., flow cytometry, some prior photodetectors do not provide a sufficiently wide dynamic range to effectively capture conjugated fluorescence signals. Therefore, various flow-cytometry schemes use photocurrent detection from a photomultiplier tube (PMT), solid-state photomultiplier (PM), or micro-PMT.

Various examples herein provide a Si photon sensor and electronics with a wide dynamic range, e.g., six orders of magnitude of dynamic range. Accordingly, sensors herein can be used in cytometry or other biological-analysis contexts.

Some examples use arrayed Si avalanche photodiodes (APDs) operating in the Geiger mode. Incident photons on a pixel (e.g., a particular APD) produce electron-hole pairs. The corresponding current is magnified by several orders of electrons by breakdown of the electric field at p-n junctions. Charged electrons are quenched by a serial register in each pixel, e.g., in ~50 ns for a ~100 kΩ quench resistor and a ~500 fF pixel capacitance. In prior schemes, the quenching time of a pixel defines the upper limit of photon pulse counting per second. The lower limit is determined by dark count or dark count deviation caused by thermal effects. In general, the dynamic range of a multi-pixel Si photomultiplier is dependent on the number of pixels.

Various examples herein collect a differential signal from a pixel. This style of collection is referred to herein as "differential Geiger mode." Using differential signals permits detection of multiple photons from a pixel even within the quenching time of that pixel. Shorter pulse pair resolution (less than 1 ns), as in various examples, can permit resolutions up to, e.g., one billion counts per second (1 Gcps). Various examples include a very-high-speed comparator and GHz-rate counter electronics, which can permit detecting and counting sub-ns photon pulses. Various examples have a low dark count of 50 kcps/mm² at room temperature, in a tested configuration. Various examples provide further reduction of the dark count by actively cooling the sensor, e.g., using a cooling unit. Various examples include a Peltier cooling unit and can achieve dark counts lower than e.g. 1 kcps, or about 100 cps at −30° C., with 10 cps standard deviation. Various examples include system-control and measurement software.

Various example Si photon detection systems herein can evaluate from sub-fW to nW range light power with theoretical linearity. Various examples provide a detectable sensitivity improved by about 3 orders of magnitude compared with prior photocurrent detection schemes. Various examples provide picosecond time resolution, which can permit measurement or analysis of individual molecular interactions in live cells. Some examples permit calibrating light power and analyzing spectrum as a measurement technology. Some examples include, e.g., calibrating based on knowledge of the Si photon sensor photon-detection efficiency (PDE) and reflective grating diffraction efficiency for particular wavelengths. Various examples can permit measuring intrinsic auto fluorescence phenomena of optical and biologically-pertinent materials such as quartz, glass, pure water, or silica or polymer beads.

Various examples can measure individual photons, which may have very low energies. Values of photon energy versus wavelength for typical laser wavelengths in flow cytometry are: 405 nm: 740 THz 3.06 eV; 488 nm: 614 THz 2.54 eV; 532 nm: 563 THz 2.33 eV; 594 nm: 504 THz 2.08 eV; 633 nm: 473 THz 1.95 eV; 780 nm: 384 THz 1.58 eV. Owing to the small energy per photon, the number of photons per pW can be expressed as megacounts per second (Mcps), e.g.: 405 nm: 2.04 Mcps/pW; 488 nm: 2.46 Mcps/pW; 532 nm: 2.68 Mcps/pW; 594 nm: 3.00 Mcps/pW; 633 nm: 3.20 Mcps/pW; 780 nm: 3.95 Mcps/pW. In general, 1 pW is the lowest detection limit of a PMT photocurrent signal. In general, a photon sensor has thermal noise, known as dark count, in the range of 1 cps to ~1 Mcps. Dark count is sensitive to temperature and determines the detection limit. In addition, dark-count standard deviation per second (r) and coefficient of variation CV (%) are considered as the resolution limit of light intensity. Temperature control of the sensor can improve dark count and its standard deviation.

Photon counting is the digital measurement of light intensity with extremely high sensitivity and linearity. If a detected photon pulse is an ideal impulse with pulse width "zero" and dark count "zero," the photon detection system is ideal. Unfortunately, real photon pulses have finite pulse width and waveform. The upper count rate is determined by pulse width and the lower limit by dark-count rate. Owing to pulse overlapping, the true count value N and measured value M are described as: N−M=NMt, where t is the pulse pair resolution. For example, with t=1 ns, the error is relatively small up to 10 Mcps and a gradually larger error for higher count rates. If necessary, it is possible to correct the measured value up to ~1 Gcps by this model. 1 Gcps is equal to 0.5/QE nW at 405 nm and 0.25/QE nW at 780 nm (QE=quantum efficiency). Therefore, it can be possible to achieve over six decades of magnitude and linearity with dark count <1 kcps and pulse pair resolution 1 ns, e.g., at a maximum 1 Gcps measurement. However, photon pulse pair resolution in some prior schemes is longer than 10 ns. Furthermore, measured signals have fluctuations that produce counting threshold deviation, causing additional error in some prior sensors.

Various examples can reach these levels of performance. Dark count rate (DCR) is another factor to determine sensitivity limit. In general, dark count is proportional to sensor area. A smaller photocathode or sensor active area usually reduces dark counts. Reducing sensor area by 90% may reduce dark count by about 90%. However, prior schemes, e.g., of flow cytometer optics for fluorescence detection, have relatively large aberrations as well as a large spot image due to broad wavelength and high NA collection lens without compensation. Various examples use reflective optics or optical fiber coupling to improve detection with smaller sensors.

Sensor structure and material can also significantly contribute to dark counts. Dark-count origins include thermal noise in the sensor or photocathode. Materials with higher sensitivity in the IR region have higher dark-count characteristics. For example, comparing bialkali and multi-alkali photocathode materials for detection at extended longer wavelengths, multi-alkali shows a higher dark count. Various examples control dark count and reduce signal deviations by temperature control. Peltier cooling can be used to reduce dark count. For cooling purposes, a smaller sensor is easier to implement.

Light intensity measurements with theoretical linearity can be performed by photon counting in the digital domain. Various examples permit analyzing the photon spectrum or photon energy. Hyperspectral analysis is a useful technique for cellular analysis. Photon spectroscopy can be implemented in at least two ways. One is in combination with a motorized monochromator and photon detector using a long capture time (>1 s). A recent motorized monochromator has a wavelength scanning speed of 500 nm/s. Because photon measurement for flow particles is in the μs to ms time domain, some examples include a parallel photon detection system.

Various examples permit biological fluorescence analysis using detectors having high sensitivity and wide dynamic range with linearity in wavelengths of interest, e.g., visible wavelengths or other wavelengths. Photon detection has sufficient sensitivity if dark count is low. The upper dynamic range of photon detection is mainly determined by maximum count capability per second. Various examples provide a shorter photon pulse width and reduced dead time, compared to some prior schemes.

Throughout this description, some aspects are described in terms that would ordinarily be implemented as software programs. Those skilled in the art will readily recognize that the equivalent of such software can also be constructed in hardware, firmware, or micro-code. The present description is directed in particular to algorithms and systems forming part of, or cooperating more directly with, systems and methods described herein. Aspects not specifically shown or described herein of such algorithms and systems, and hardware or software for producing and otherwise processing signals or data involved therewith, can be selected from systems, algorithms, components, and elements known in the art.

Steps of various methods described herein can be performed in any order except when otherwise specified, or when data from an earlier step is used in a later step. Example method(s) described herein are not limited to being carried out by components particularly identified in discussions of those methods. Section headers are solely for ease of reference and do not restrict the combinations covered by this disclosure. A feature described in a particular section can be used in conjunction or combination with features described in that section or in other sections.

Illustrative Configurations, Techniques, and Operations

FIG. 1 shows a block diagram of an example excited-photon spectrum analyzer system, and an example graph (lower left) of output in counts per second (cps) as a function of wavelength in nanometers (nm) from 400-800 nm. The example graph shows a visible range of 400 nm-800 nm, but this is not limiting. Various examples use a differential Geiger mode for photon detection. Example detectors can include an array of avalanche photodiodes having capacitive couplings ("C-couplings") to a sensor output (a "fast output"). In some examples, the fast outputs are wired in parallel, e.g., as shown in FIG. 36. Example photon sensors, and related components, are described herein with reference to FIG. 2A-15, 19, 21A-22, 27A-28, 32, 33, or 35-37. For example, any of the following SENSL SiPMs can be used: 10010, 10020, 10035, 10050, 30020, 30035, 30050, or 60035. For example, an SiPM can have an active area of 1 mm$^2$, 3 mm$^2$, or 6 mm$^2$; a photodiode-cell size between 10 μm$^2$ and 50 μm$^2$; a fill factor between 25% and 75%; a photodiode count between 250 and 3000; or a photodiode density between about 100 mm$^{-2}$ and about 1000 mm$^{-2}$. "BP" is a bandpass filter; "notch" is a notch filter. "LaserBP" is a bandpass filter that will substantially pass the laser light; "Laser notch" will substantially block the laser light. "Giga-counter" is an electronic pulse counter, e.g., capable of counting at GHz rates.

The laser light L, or other electromagnetic radiation radiated into the sample, is referred to herein as "incident light." Light or other electromagnetic radiation transmitted through the sample, or light emitted from targets, fluorescent dyes (e.g., bound to targets), or other substances within the sample, is referred to herein as "resultant light." Resultant light can include electromagnetic radiation provided by, e.g., scattering, refraction, absorption, or rotation of the plane of polarization of the incident light, or any combination thereof. Throughout this document, the terms "scatter," "scattering," and the like include refraction, absorption, and polarization rotation, as appropriate, unless otherwise explicitly noted. Resultant light can include forward-scattered (FS) light and side-scattered (SS) light. FS and SS have substantially the same wavelength as the light source, e.g., the laser. Resultant light can also include fluorescent light, since such light can be emitted by the sample or substances within the sample. Resultant light can be substantially directional (e.g., transmitted light of the laser light L) or substantially omnidirectional (e.g., fluorescence), or can have a selected or characteristic radiation pattern (e.g., a cardioidal variation of intensity as a function of angle from the direction of the incident light).

Various example sensors or detection systems herein provide at least one of: a fast output, an amplifier having a bandwidth >200 MHz, an impedance <200Ω, or a pulse width (pulse duration) of <5 ns. For example, bandwidth >200 MHz and impedance <200Ω can permit detecting 1 ns-wide pulses. In some examples, sensors as described herein, e.g., with reference to FIG. 2A-4A, 11A-11C, 32, 33, or 35-37 can be used as the illustrated "photon sensor." Various examples of photon-counting spectral-analysis systems such as that shown in FIG. 1 can provide or include pulse clamping (e.g., FIG. 9, 10, or 1517), a comparator (e.g., FIGS. 7 and 9), or very-high-speed counting (e.g., FIG. 9).

Various example systems and techniques shown in FIG. 1 and elsewhere herein can permit collecting data and analyzing the data to determine, e.g., wavelength or time dependencies for phenomena such as photo bleaching. Various examples permit detecting photon counts and, from those photon counts, together with at least one of photon energy, illumination power, optics NA, or sensor PDE, quantitatively estimating and analyzing fluorescence characteristics. Various examples permit determining optical-filter performance, performing material AFL analysis, performing color analysis, performing bio-assay analysis, or performing cellular or particle analysis.

In the illustrated example, incident light from the laser strikes the sample. Resultant light is collected in the optical fiber and carried to a spectral-discrimination device ("spectral device" or "spectro unit"), e.g., a monochromator or polychromator. The illustrated example shows a "motor driven spectro unit," e.g., a motorized monochromator. However, this is not limiting. In other examples such as some shown below in Table 1 and FIGS. 26B-29, a motorized or non-motorized polychromator can be used, e.g., with an array sensor or a fiber array. The spectral-discrimination device permits measuring different wavelengths of light separately. In FIG. 1, a single photon sensor successively measures each wavelength of interest in the resultant light. In other examples, one or more photon sensor(s) or elements thereof can concurrently measure respective wavelength(s) of the resultant light. The measurements can include rates of photon incidence on the photon sensor, e.g., in counts per second.

In various examples, a photon sensor can include a sensing element such as a vacuum-tube based photomultiplier tube (PMT), a solid-state (e.g., Si) photomultiplier tube (SSPMT, e.g., FIGS. 32 and 33), a silicon photomultiplier (SiPM, e.g., FIGS. 2A-3B), an avalanche photodiode (APD), or a single-photon avalanche diode (SPAD). The term "tube" is used in reference to SSPMTs merely to distinguish them from SiPMs and other types of photon sensors. The term "tube" does require, that an SSPMT have any particular pressure (e.g., vacuum) or material contained in the SSPMT. In various examples, a photon sensor can include multiple sensing elements, e.g., an array of SSPMTs arranged on a printed circuit board (PCB), or an array of SiPMs, APDs, or SPADs arranged on a wafer (e.g., FIGS. 2A-3B). In some examples, a photon sensor can include combinations of any of these. SSPMTs, SiPMs, APDs, SPADs, and arrays of any of those are examples of solid-state photon detectors (SSPDs). The term "SiPM" is used for brevity and can include other semiconductor photomultipliers (SPMs) that include APDs or SPADs, e.g., APDs or SPADs on InGaAs or SiC substrates, or other semiconductor types discussed below. In some examples, SiC is used for detection of ultraviolet photons.

Various examples can use different spectral-discrimination devices or photon sensors. Nonlimiting example combinations can include those listed in Table 1. Throughout this document, "CH" refers to a channel of optical measurement. Examples of various components listed in Table 1 are described herein with reference to FIGS. 1-6B, 9, 11A-11C, 17, 18, 19, 20, 21A-21G, 22, 23, 24, 25, or 26A-29.

TABLE 1

| Spectral Device | Example light extraction | Number of photon sensors | Type of photon sensor and mount | Example features of some aspects |
|---|---|---|---|---|
| Monochromator | Angular scan across slit, optical fiber coupling, or sensing element | 1 | Any SSPD listed above (e.g., FIGS. 1 or 26A) | wide λ range(200-900 nm); Accurate FWHM; Flexible combination |
| Polychromator | Linear scan across fiber coupling | 1 | Any SSPD listed above, receiving light via an optical fiber (e.g., FIG. 26B, linear scan) | λ range (340~800 nm); simple mechanism; faster scan than angular; no $2^{nd}$ harmonic |
| Polychromator | Linear scan across sensing element (e.g., mounted SSPD) | 1 | Any listed above, mounted to receive light directly from polychromator (e.g., FIG. 26B, array) | As above; All in one; compact; lower cost |
| Polychromator | No movement; fixed fiber array, 32-64CH | 32-64 | SSPD array sensor, or group of discrete sensing elements. Mounted to receive light from respective optical fibers (e.g., FIGS. 27A and 27B) | Parallel detection; High speed detection in μs |
| Polychromator | No movement; fixed SiPM array | 128-256 (or more, e.g., 1024 or 2048) | SSPD array sensor, mounted to receive light directly from polychromator (e.g., FIG. 26B, array) | As above; Low dark count; All in one |

FIG. 2A shows an example structure of a SiPM, which is an example of a solid-state photon detector (SSPD). An SiPM such as that shown can provide small size, high quantum efficiency, lower bias voltage, light durability, insensitivity to magnetic fields, lower cost, and more, compared to a conventional PMT. In a PMT, an incident photon produces an electron-hole pair in the photocathode, which is an electrical insulator; vacuum and high voltage can permit capture of the induced electron. On the other hand, the electron-hole pair of a solid-state sensor such as that shown is produced in the p-n junction, which is semi-conductive material. The produced electron moves rapidly and the acceleration depends on the reverse bias electric field. The illustrated SiPM includes a photodiode (PD), e.g., an APD or SPAD, and a quench resistor R, discussed below.

FIG. 2B shows various examples of principles of operation of example SiPMs. In the Geiger region of operation, the bias voltage is sufficiently high in magnitude (e.g., $>5 \times 10^5$ V/cm) that, when a photon strikes the sensor and releases a photoelectron, that electron can strike other atoms and release additional electrons. Accordingly, a single photon can trigger a cascade of electrons that causes the SiPM to become conductive and produce a detectable current. There are three phases of operation: P-I-N mode with gain=1, linear avalanche mode with gain~100 and Geiger mode over break-down voltage with gain ~$10^6$. Geiger mode is highly sensitive for incident photons owing to a high QE ~0.8 and gain >$10^6$.

Figure 3A:
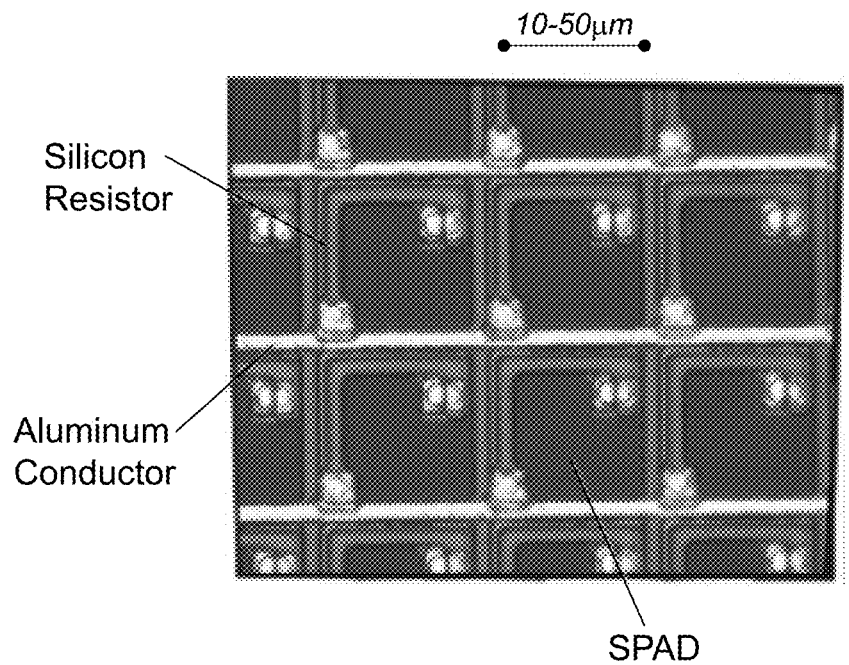
FIG. 3A is a graphical representation of a micrograph of an example SiPM.

Once a photon has hit and triggered an avalanche, a quenching resistor in series with the PD is used to reset the PD without requiring active circuitry. As the current increases, the quenching resistor's voltage increases, and so the photodiode's voltage decreases. Once the current increases to the point that the photodiode's voltage is below the Geiger breakdown threshold, conduction will substantially cease until the photodiode's voltage has risen above the breakdown threshold and the next photon impact event takes place. Quenching time, typically 50 ns, is called dead time because the detector will not fire even if struck by a photon. In order to expand the dynamic range, a Geiger mode sensor has a structure arrayed as pixels (FIG. 3A). SiPM photon detection efficiency PDE is defined as $QE \times \epsilon_{geo} \times \epsilon_{trig}$, where $\epsilon_{geo}$ is the geometrical fill-factor and $\epsilon_{trig}$ is the avalanche triggering probability. When a pixel is "fired," a SiPM has secondary fire phenomena called "crosstalk," at adjacent pixels, and "afterpulse," a delayed signal in the fired pixel. Various examples permit performing accurate photon-count measurements even in the presence of these factors.

FIG. 2C shows an elevational cross-section of an example SiPM fabricated on a wafer.

FIG. 2D shows an example of electric-field magnitude during operation of an SiPM.

APD cells vary in dimension from 20 to 100 microns depending on the mask used, and can have a density of up to 1000/mm². Avalanche diodes can also be made from other semiconductors besides silicon, depending on the properties that are desirable. Silicon detects in the visible and near infrared range, with low multiplication noise (excess noise). Germanium (Ge) detects infrared to 1.7 μm wavelength, but has high multiplication noise. InGaAs (Indium Gallium Arsenide) detects to a maximum wavelength of 1.6 ξm, and has less multiplication noise than Ge. InGaAs is generally used for the multiplication region of a heterostructure diode, is compatible with high-speed telecommunications using optical fibers, and can reach speeds of greater than Gbit/s. Gallium nitride operates with UV light. HgCdTe (Mercury Cadmium Telluride) operates in the infrared, to a maximum wavelength of about 14 μm, uses cooling to reduce dark currents, and can achieve a low level of excess noise.

Silicon avalanche diodes can function with breakdown voltages of 100 to 2000V, typically. APDs exhibit internal current gain effect of about 100-1000 due to impact ionization, or avalanche effect, when a high reverse bias voltage is applied (approximately 100-200 V in silicon). Greater voltage can be applied to silicon APDs, which are more sensitive compared to other semiconductor photodiodes, than to traditional APDs before achieving breakdown allowing for a larger operating gain, preferably over 1000, because silicon APDs provide for alternative doping. Reverse voltage is proportional to gain, and APD gain also varies dependently on both reverse bias and temperature, which is why reverse voltage should be controlled in order to preserve stable gain. SiPMs can achieve a gain of $10^5$ to $10^6$ by using Geiger mode APDs which operate with a reverse voltage that is greater than the breakdown voltage, and by maintaining the dark count event rate at a sufficiently low level.

Geiger-mode APDs produce relatively large charge pulse when struck by a photon of the same amplitude no matter the energy of the photon. When reading out conventional APDs, noise of the preamplifier significantly degrades timing and amplitude resolution performance for short (shorter then ~500 ns) light pulses. Compared to conventional APDs, SiPMs using Geiger mode APDs provide much higher output amplitude, which can reduce the effect of preamplifier noise.

Figure 3B:
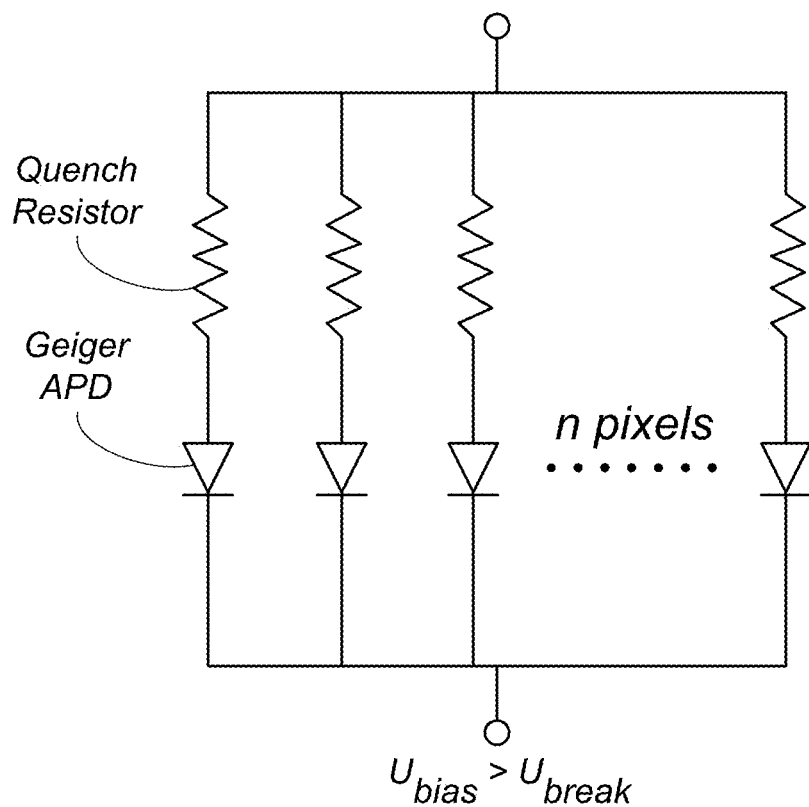
FIG. 3B is a circuit diagram of an example SiPM.

FIG. 3A is a graphical representation of a micrograph, and FIG. 3B is a circuit diagram, showing example configurations of SiPM arrays. As shown, a sensor can include rows and columns of sensor elements. As shown in FIG. 3B, each sensor element (or individual sensor elements) can include a quench resistor in series with a Geiger-mode avalanche photodiode (APD), e.g., a SPAD. as in Example details of these components are shown in FIGS. 2A-2D. The sensor elements ("pixels" or "microcells") can be electrically in parallel across a row, column, or 2-D sensor array. As current flows through the APD in response to impact of a photon thereon, voltage across the quench resistor increases. Therefore, voltage across the APD decreases. When the voltage across the APD drops below the Geiger threshold (FIG. 2B), the APD will cease to conduct and will be ready to detect another photon. This process is referred to as "quenching."

An array SiPM (e.g., using Geiger mode PDs) such as that illustrated can provide high gain (e.g., $>10^6$) and high sensitivity of photon detection. Such sensors can be relatively compact and can operate with relatively low bias voltages, e.g., <25-70 V. Such sensors can be durable under light exposure and can be relatively insensitive to magnetic fields. However, some prior schemes have a limited dynamic range due to the limited number of pixels on the sensors and the dead time during quenching, during which those prior sensors do not detect photons. Moreover, some prior sensors have relatively high dark count rates (i.e., appreciable output signal even when no light is incident) or can be sensitive to temperature variations.

In some examples, the SiPM avalanche process is very fast, e.g., on the order of picoseconds (e.g., 10 ps-100 ps). However, the quenching ("recharge" or "dead time") process is comparatively slow, e.g., on the order of nanoseconds (e.g., 50 ns-100 ns). As noted above, during some prior schemes, the sensor does not detect photons during the recharge process. Accordingly, some prior sensors only provide a dynamic range of about three orders of magnitude.

Figure 4A:
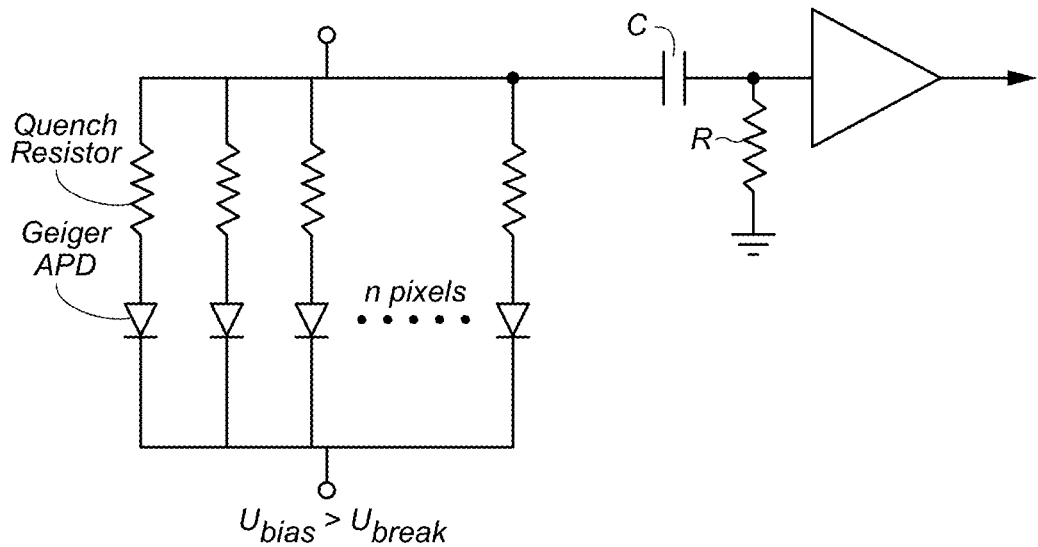
FIG. 4A shows an example SiPM readout circuit including a differentiator, and related SiPM components.

Some examples sensors and detection systems herein permit using SiPMs for biological photon detection applications that require wider dynamic range, e.g., six orders of magnitude. Various examples detect the avalanche mode using a combination of a high pass filter and a differentiation signal processing block. A tested example was able to perform multiple photon detection, even during the dead time. Accordingly, various examples can provide a dynamic range up to, e.g., six orders of magnitude FIG. 4A shows an example circuit using a differentiator (represented as an RC high-pass filter followed by a buffer (triangle)) to provide 1 ns photon pulses. In some examples, the differentiator produces a time derivative (e.g., $\Delta V/s$ or $\Delta A/s$) of the input signal (e.g., V or A). Using a differentiator can permit detecting multiple photons using a single pixel, which can in turn increase dynamic range. The SiPM output waveform has a fast avalanche process measured in picoseconds and a slow recharge process measured in nanoseconds. The high-pass filter and signal differentiation permit detecting only the avalanche process. Experiments were performed using an ultrahigh-speed differentiating circuit with GHz-bandwidth amp or equivalent differentiation in pixels to show multiple photon detection even during quenching dead time. This measurement technique, and corresponding signal processing described herein, are referred to for convenience and without limitation as "differential Geiger mode." In some examples, a monolithic or on-chip capacitor is used to perform filtering with reduced parasitic capacitance and inductance compared to off-chip parts. In the illustrated example, the differentiator's input (on capacitor C) is connected opposite the quench resistor from the APD. The illustrated differentiator can additionally or alternatively be connected to: the anode of the SSPMT shown in FIGS. 32 and 33; the Vbias or Iout electrodes shown in FIG. 35; or the Vbias, Fast out, or Iout/Common electrodes shown in FIG. 36.

Figure 4B:
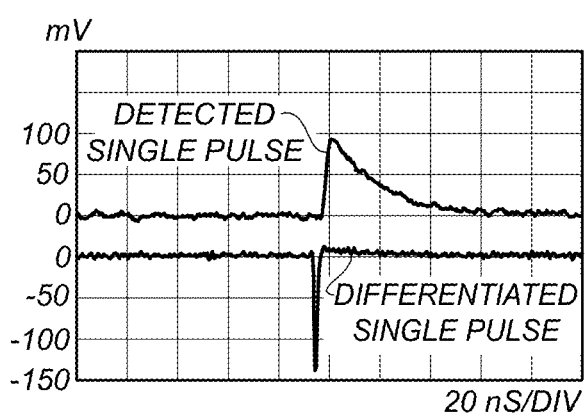
FIG. 4B shows measured data of an output from the circuit of FIG. 4A for a single photon pulse.

FIG. 4B shows an example output from the circuit of FIG. 4A, showing that a single pulse produces a detectable spike in the differentiated photon signal output by the differentiator circuit.

Figure 4C:
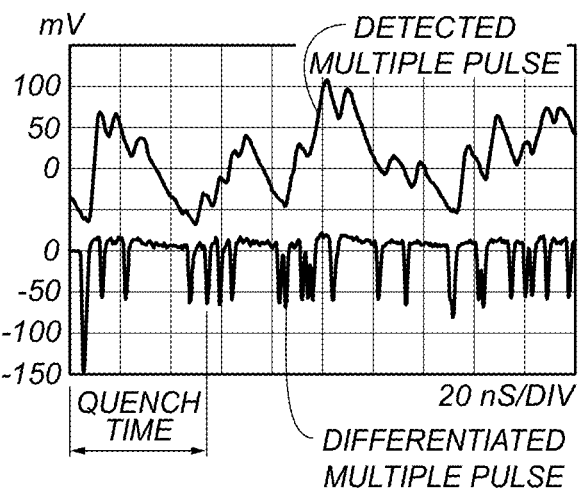
FIG. 4C shows measured data of an output from the circuit of FIG. 4A for multiple photon pulses.

FIG. 4C shows an example output from the circuit of FIG. 4A. As shown, the differentiated photon signal shows pulses even when a photon strikes the detector during the dead time (quenching period). Although the differentiator is shown as attached on the anode side of the APDs, it can additionally or alternatively be attached on the cathode side of the APDs. Similarly, the quench resistor for an individual APD can be attached on either the anode or the cathode side of that APD.

An experiment was performed to measure a photon pulse using an SiPM without a fast out, e.g., similar to the configuration of FIG. 4A. A unipolar pulse of FWHM ~600 ps duration was detected, with a pulse height of ~50 mV.

An experiment was conducted to measure counts per second (cps) from a sensor as a function of the power of the light incident on the sensor in pW. The experimental results showed a positive correlation between pW and cps. That correlation was substantially linear in certain regimes, e.g., 0-400 pW and 600-1400 pW. In some examples, accordingly, counts above 250 Mcps can be provided and counted. An experiment was also conducted to measure signals output by a differentiator circuit, e.g., as discussed herein with reference to FIGS. 4 and 5. The experimental data showed discernable pulses.

Figure 5:
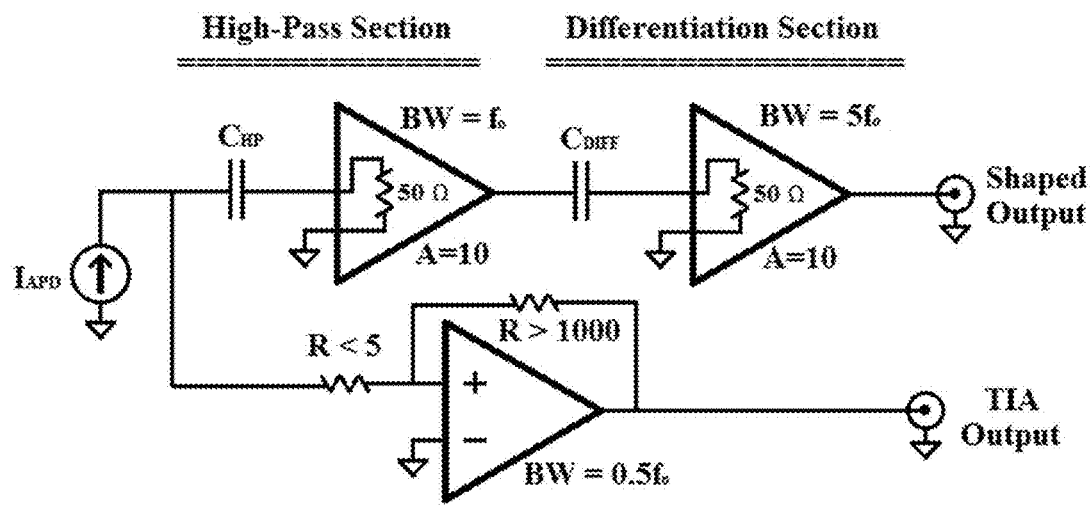
FIG. 5 shows an example differentiator circuit usable, e.g., in the circuit of FIG. 4A.

FIG. 5 shows an example differentiator circuit including a high-pass filter section and a differentiation section. Various example ranges of component values are illustrated. The values of the components illustrated can be adjusted, e.g., to provide differentiation signal processing with a rise time $T_{rise}$ corresponding to the timescale of the avalanche process with respect to a particular SiPM, e.g., 10 ps-100 ps. In some examples, differentiation circuitry such as that shown is used with SiPMs or similar devices. Differentiation circuitry can be used to increase detection sensitivity, e.g., of photon detectors that have asymmetric waveforms (e.g., ps-range rise times and ns-range fall or quenching times).

In some examples, differentiation signal processing can distinguish photons within overlapped photon pulses. This can provide more accurate photon counting, since photons that would otherwise be missed during an SiPM's dead time can be detected. In the illustrated circuit, an ideal square pulse produces a Gaussian pulse after the high pass filter. Circuit parameters of the differentiation section can be adjusted to provide separation of two partially-overlapping Gaussian pulses. Some example circuit parameters can include:

| | |
|---|---|
| $C_{HP}$ (Farad)=$T_{RISE}$/50 | High-pass filter: |
| $C_{DIFF}$ (Farad)=(⅕)$CHP$=$T_{RISE}$/250 | Differentiation filter: |
| $F0$ (Hz)=1/(10 $T_{RISE}$) | Primary corner frequency: |
| avalanche process time; typical<100 ps | $T_{RISE}$: |

Figure 6A:
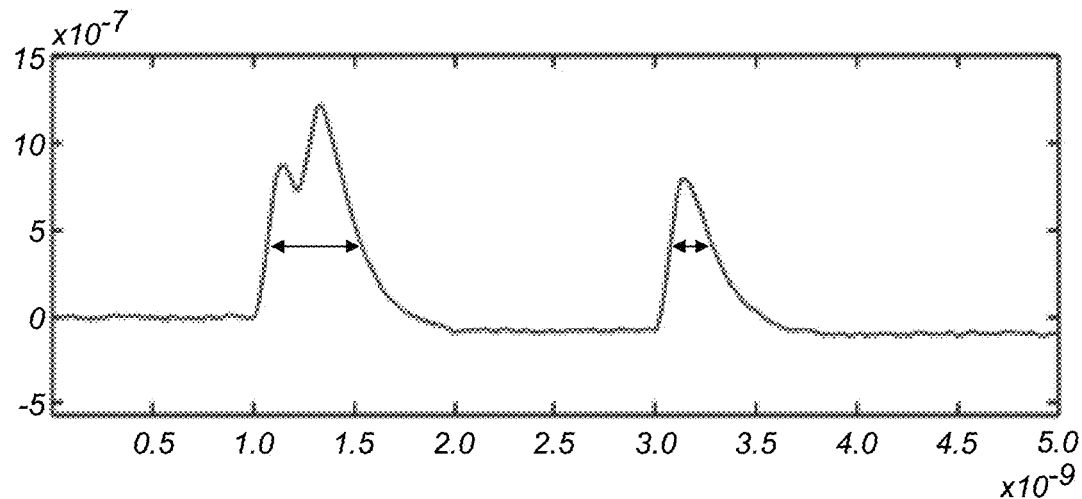
FIG. 6A shows measured data of an example input to the differentiation stage of the circuit of FIG. 5.
Figure 6B:
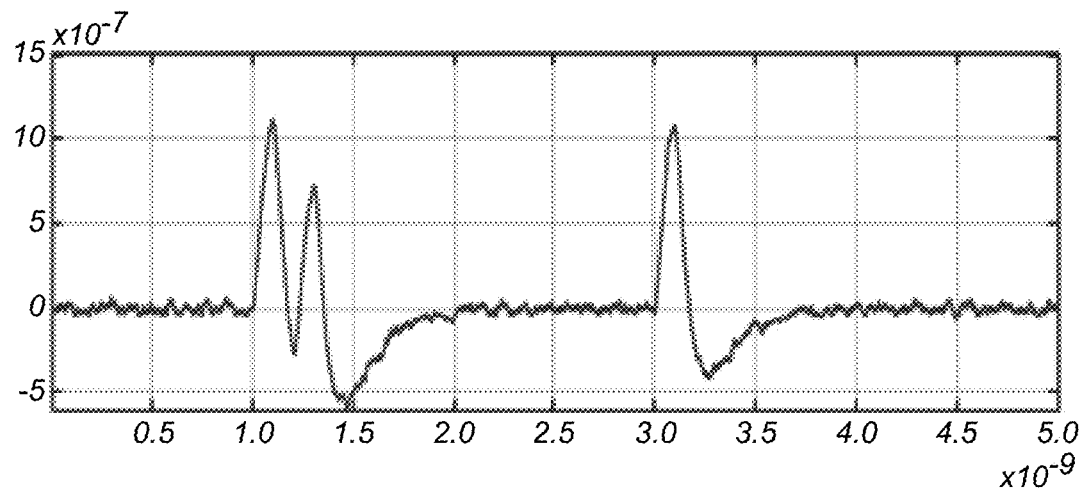
FIG. 6B shows measured data of an example output from the differentiation stage of the circuit of FIG. 5, for the input of FIG. 6A.

FIG. 6A shows an example input to the differentiation stage of the circuit of FIG. 5. FIG. 6B shows an example output from that circuit. As shown, the differentiation stage responds to two overlapping pulses (top), e.g., triggered by two separate photons, by providing a signal having two zero-crossings (bottom). Other thresholds than zero can additionally or alternatively be used. As indicated by the double-ended arrows in the top plot, a multiple-photon pulse can have a wider pulse width (longer duration) than a single-photon pulse. Accordingly, a pulse width differential can be used to discriminate closely overlapped 1-photon pulses from 2-photon pulses. Examples of pulse discrimination are described herein with reference to FIG. 14.

Figure 7:
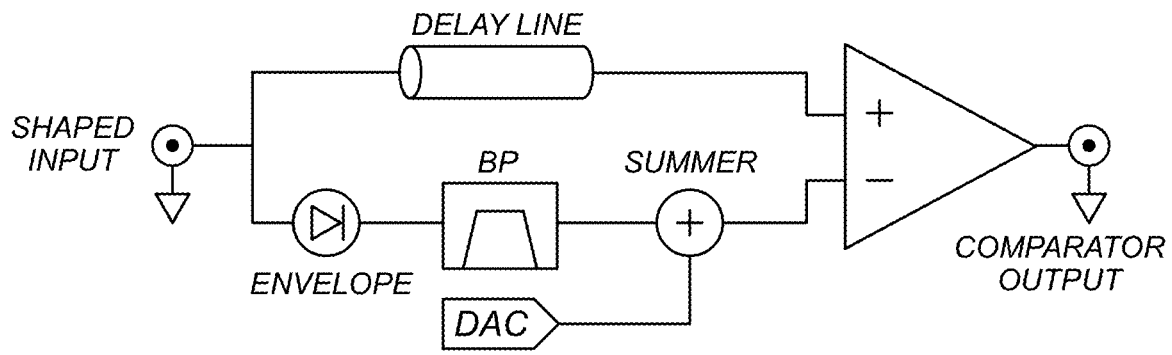
FIG. 7 shows an example adaptive comparator circuit.

FIG. 7 shows an example adaptive comparator circuit. The example circuit can provide, e.g., adaptive reference (threshold) level changes following pulse modulation. Due to AC-coupling of outputs from the differentiator section, large excursions of the signal baseline can occur among rapid successive pulses. To reduce miscounts, the illustrated circuit causes threshold level(s) respond adaptively by tracking the signal baseline. An RF envelope detector, e.g., monolithic or made from discrete COTS components, produces a signal that closely follows the negative peak excursions of the input. An appropriate filter further smooths the signal. A constant offset is added to the envelope to produce the tracking threshold level(s). The pulse is delayed, e.g., through at least one of a long transmission line or a passive network, so that the pulse arrives to the comparator at the same time as the moving threshold(s).

Figure 8:
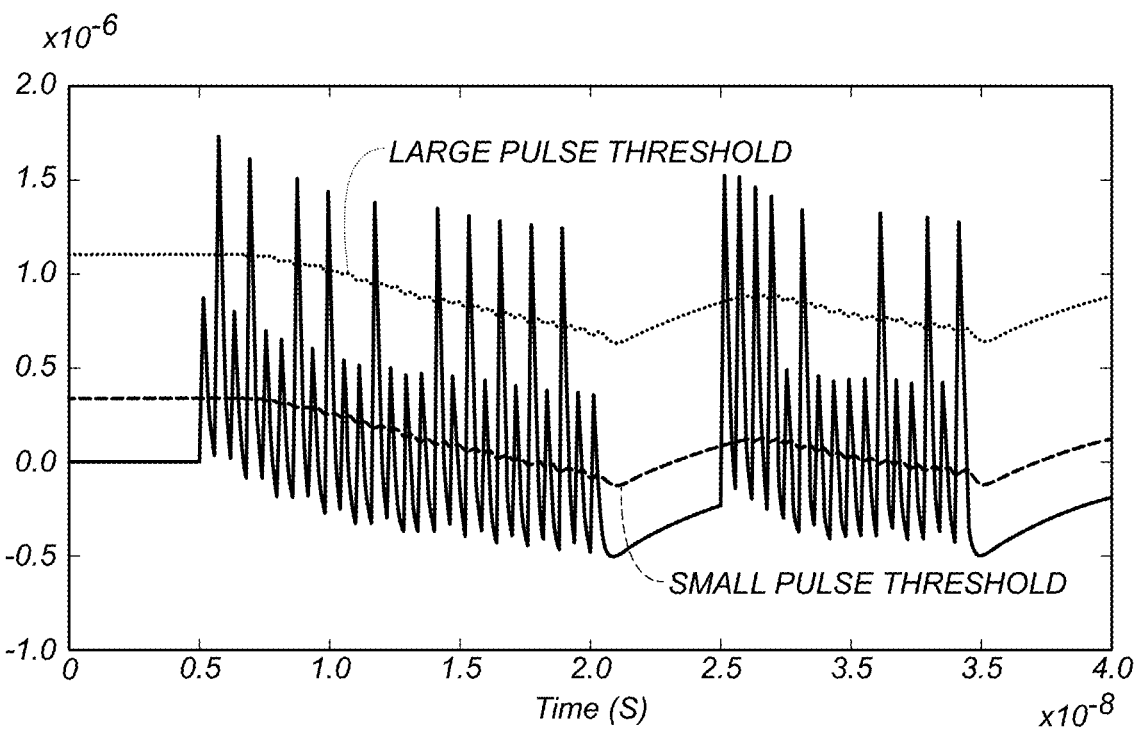
FIG. 8 shows example inputs and outputs of the adaptive comparator circuit of FIG. 7.

FIG. 8 shows example inputs and outputs of the adaptive comparator circuit of FIG. 7. Two thresholds are illustrated: a large-pulse threshold and a small-pulse threshold. In some examples, the small-pulse threshold is used to detect single-photon excitation (1PE) pulses and the large-pulse threshold is used to detect double-photon excitation (2PE) pulses. A 2PE pulse can result from near-simultaneous absorption of two photons, or from absorption of a single photon of a shorter wavelength.

Figure 9:
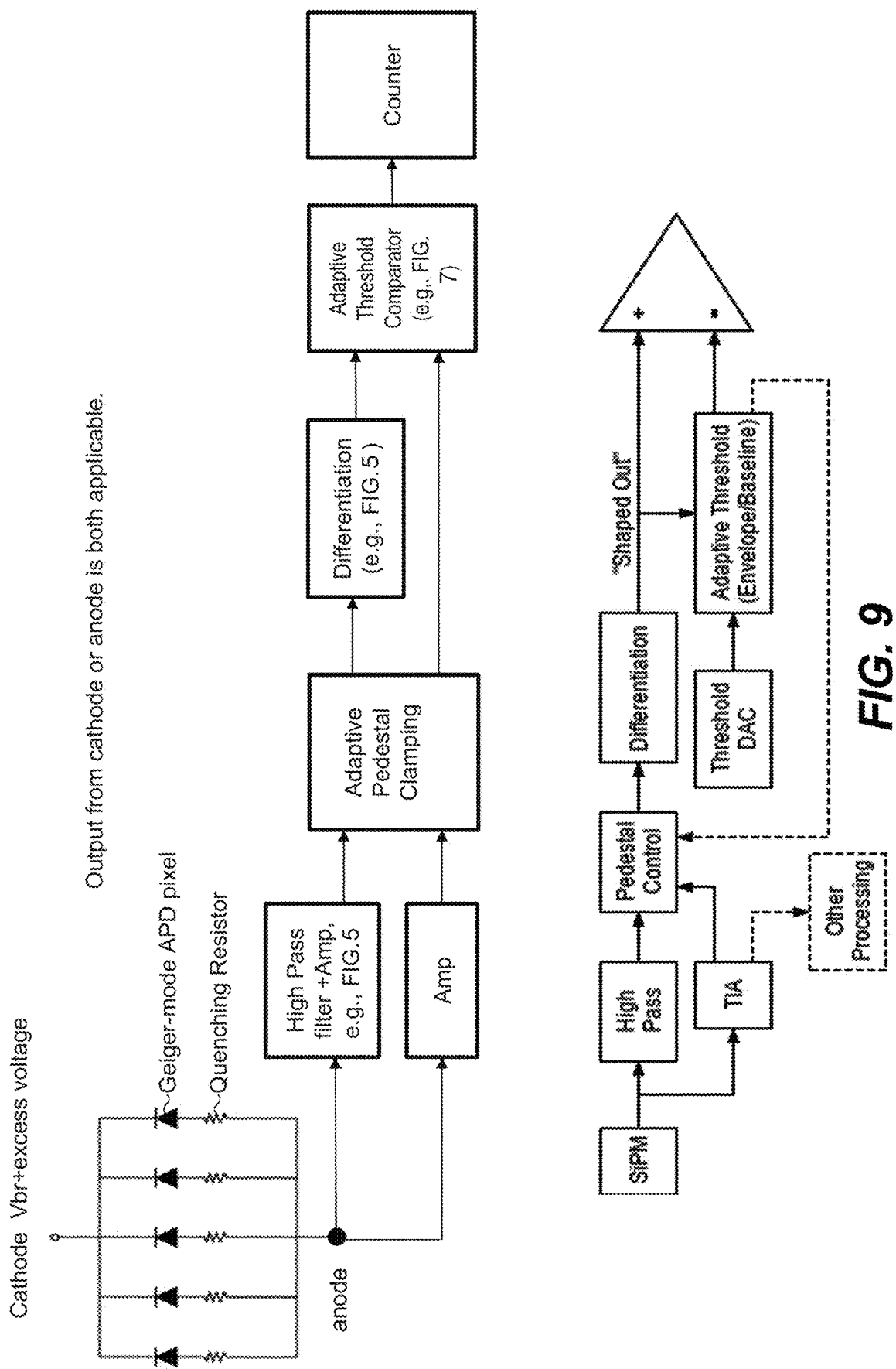
FIG. 9 shows a block diagram of signal processing for photon detection, and related components.

FIG. 9 shows a block diagram of signal processing for photon detection, and related components. Various examples are designed to operate with at least one of: an avalanche process ~100 ps, a photon pulse width <1 ns, or a quenching time >50 ns. In some examples, output can be taken from, or referenced to, the cathode, the anode, or both. Although shown as connected on the anode side of the APDs, the measurement electronics can additionally or alternatively be connected on the cathode side.

FIG. 9 shows sequencing of signal processing. FIG. 5 shows differentiation before a comparator. FIG. 7 shows determination of the comparator threshold. FIG. 9 shows an example overall flow of signal processing: photo current—HP—Pedestal clamping—differentiation (FIG. 5)—comparator (FIG. 7).

In some examples, the differentiation section can mix the signal with the differential of the signal. This can accentuate overlapping peaks, increasing dynamic range.

In some examples, a pedestal correction factor between 0.1 and 0.15 can be used. In some examples, the pedestal correction can be determined based on the light level (e.g., high vs. low) using feedback from the adaptive threshold determining unit.

In some examples, a full amplifier is used. In some examples, e.g., in which capacitance is implemented in each sensor pixel, a pre-amplifier (preamp) can be used without a full amplifier.

An experiment was conducted to measure single-pulse and multiple-pulse detection. In the tested example, multiple photons were detected, even during the avalanche quenching time. Some prior schemes are unable to detect photons during the quenching time.

In some examples, the high pass filter permits detecting avalanche processes as <1 ns-width pulses, e.g., corresponding to a single photon. In some examples, the high pass filter output can be processed to detect multiple photons even during a recharge process, unlike prior schemes.

Figure 10A:
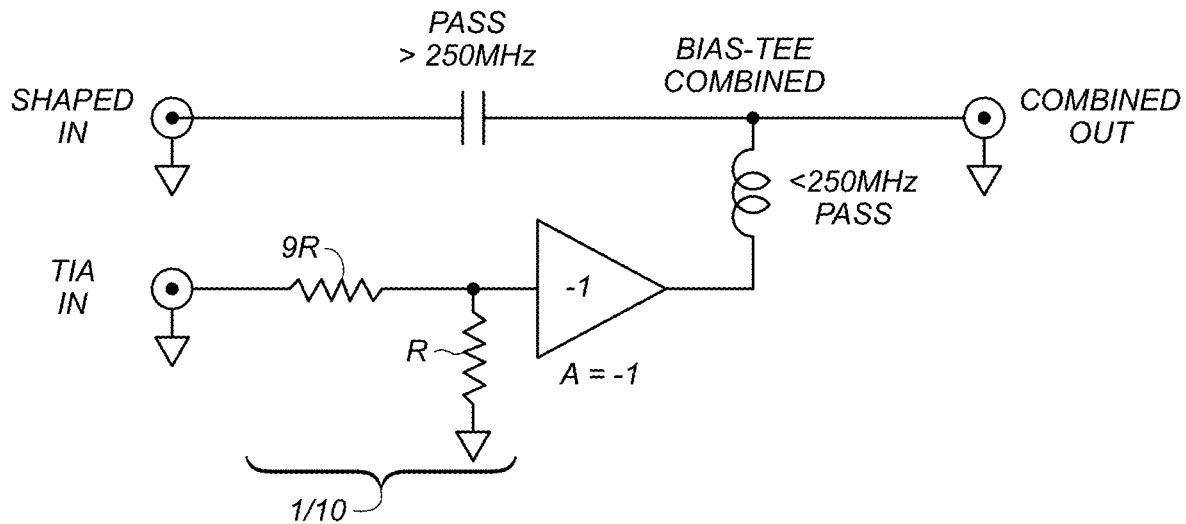
FIG. 10A shows an example circuit configuration of an adaptive pedestal clamping circuit.
Figure 10B:
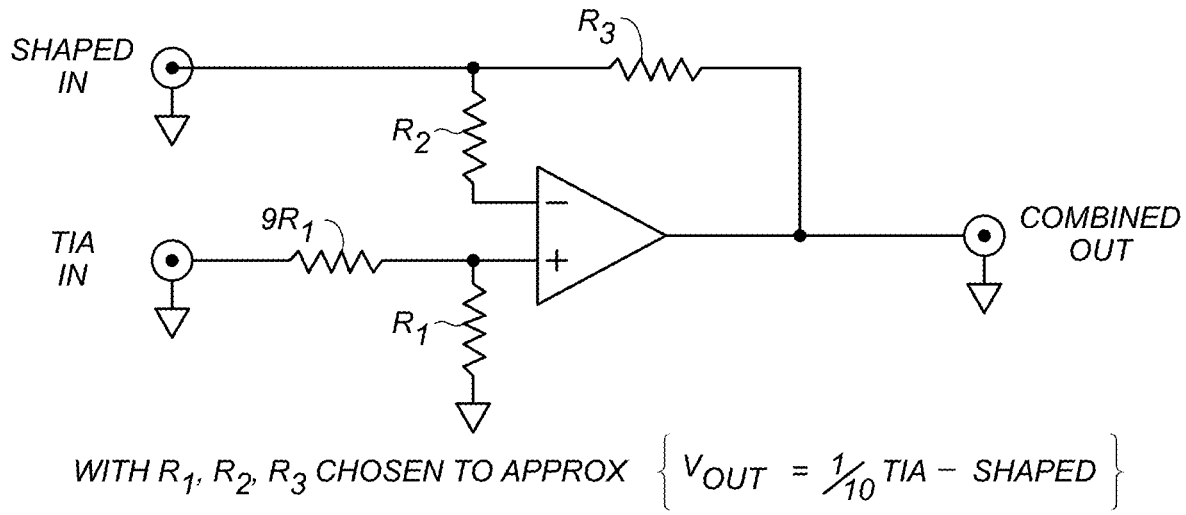
FIG. 10B shows another example circuit configuration of an adaptive pedestal clamping circuit.

FIGS. 10A and 10B show example circuit configurations of adaptive pedestal clamping circuits, e.g., as discussed herein with reference to FIG. 9. In some examples, the illustrated circuitry can stabilize the pedestal level of short photon pulse signals. In some examples, as a number of incident photons increases, a signal pedestal fluctuates due to the high-pass filter. However, counting photon signals without the high-pass filter can lead to level deviations and a smaller signal, which can result in the limited dynamic range of some prior schemes. Therefore, some examples count the high-pass filter or differentiator output and use pedestal clamping circuitry to reduce pedestal-level variation and to stabilize the inputs to the comparator.

Some examples improve the accuracy of the pedestal clamping by reducing the phase difference between the pixel-signal output and the differentiator ("HF") output. For example, components of the circuit can be adjusted, or delay lines or other delay elements added, to keep the phase shift of the electronics below the pixel pulse width.

An experiment was conducted to measure data of pixel output signals, differentiator ("HF") output signals, and signals after adaptive pedestal clamping. Tests were performed at a relatively lower count rate (lower optical power incident on the sensor) and at a relatively higher count rate. The tested adaptive-pedestal circuit provided a steady baseline from which a threshold for determining counts could be set. In some examples herein, once the baseline has been set by the adaptive pedestal clamping, the threshold determined by the adaptive threshold unit can be applied to count pixels by counting times when the differentiator output crosses the threshold.

In some examples of a Gaussian profile having a full width at half maximum (FWHM) of 1.2 ns, pulse height and pulse resolution are negatively correlated. For a photon pulse amplitude following a Gaussian form, comparator pulse resolution is correlated with count accuracy. In some examples, to detect 1 ns pulse widths, 200 ps pulse resolution is used. Reducing the pulse resolution can reduce the measured count. Some commercial universal counters have a pulse resolution of 4 ns, and some 1 GHz digital oscilloscopes have a resolution of about 0.4 ns. Therefore, in some examples, a high-frequency counter, e.g., implemented using an FPGA, is used to provide, e.g., 200 ps pulse resolution or better resolution.

Figure 11A:
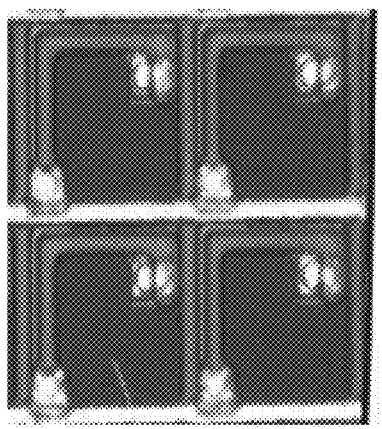
FIG. 11A is a graphical representation of a micrograph of an example SiPM.

FIG. 11A is a graphical representation of a micrograph of a portion of an example SiPM.

Figure 11B:
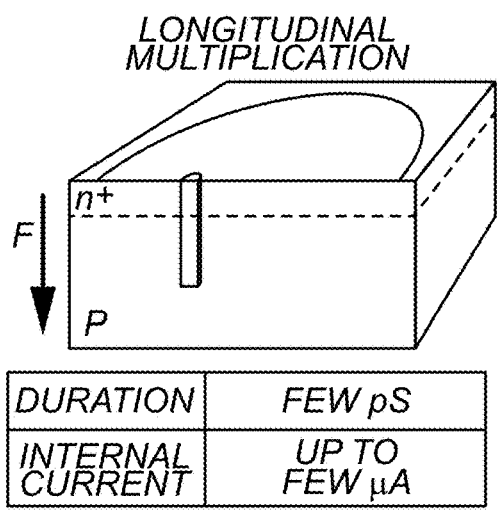
FIG. 11B depicts characteristics of longitudinal multiplication in an SiPM.
Figure 11C:
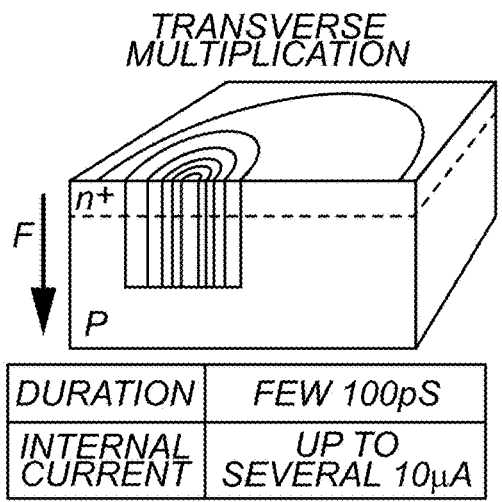
FIG. 11C depicts characteristics of transverse multiplication in an SiPM.

FIGS. 11B and 11C show examples of estimation of the avalanche process time, and internal structures of example SiPMs.

Figure 12:
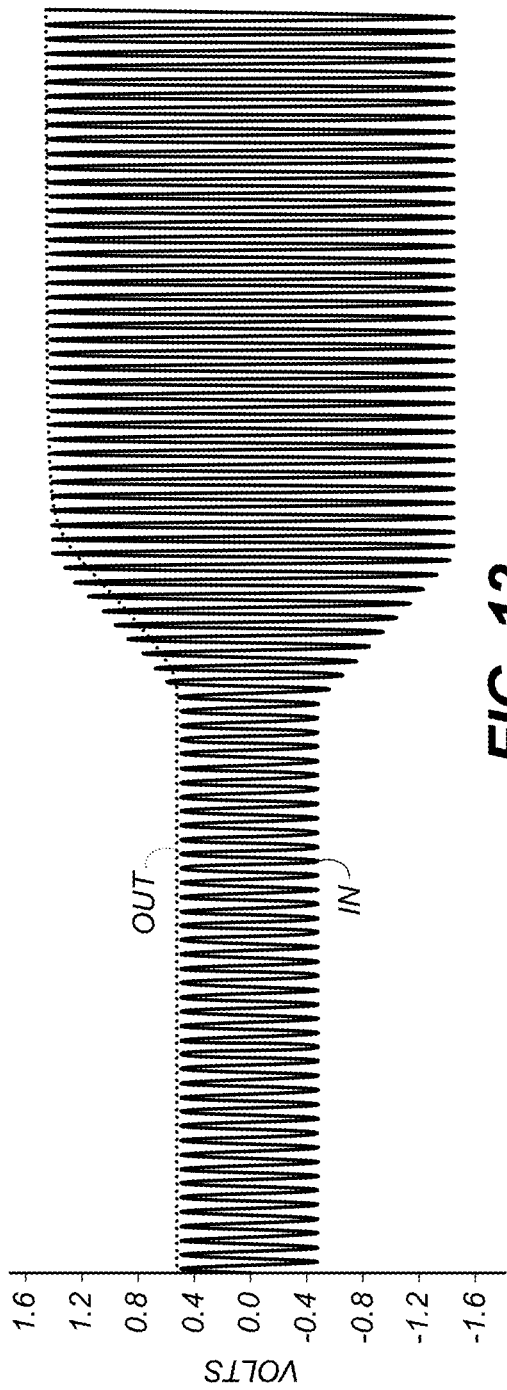
FIG. 12 shows simulated inputs and outputs of the circuit of FIG. 13.
Figure 13:
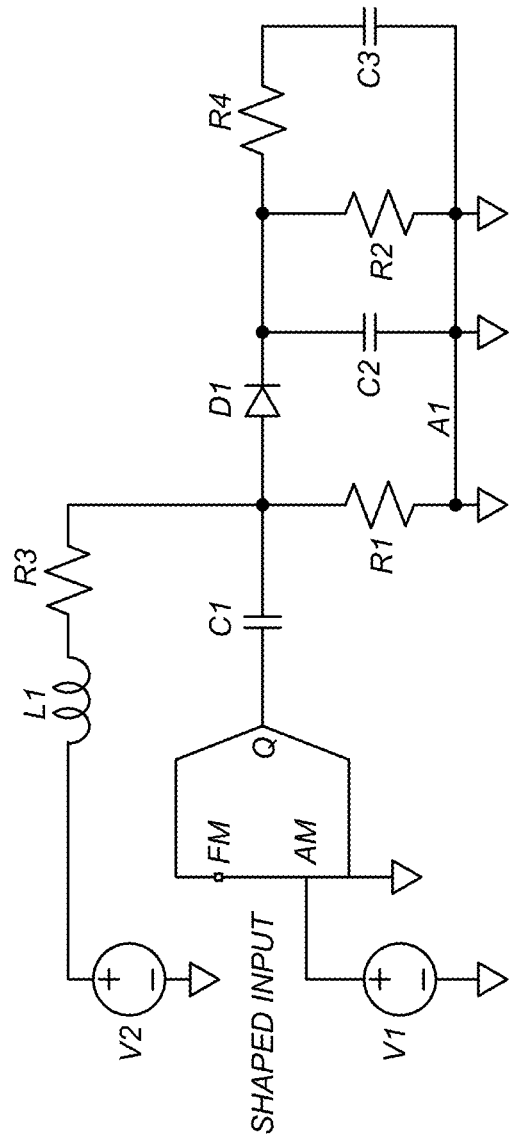
FIG. 13 is a circuit diagram of an example filter section in an envelope-detector circuit.

FIG. 12 shows simulated outputs of the circuit of FIG. 13. The SPICE simulation conditions were .tran 0.00001 0; mark=1000000000; space=0; PULSE(1.5 0.5 0.000002 0.00000001 0.00000001 0.000002 0.000004).

FIG. 13 shows an example filter section in an envelope-detector circuit (e.g., FIG. 7, 8, 10A-10B, 13, or 14). The illustrated filter section can be used, e.g., in the adaptive threshold circuit of FIG. 7.

In some example envelope detectors, the diode is specified for GHz operation with junction capacitance, e.g., about 1 pF-about 10 pF. Some example envelope detectors include a transimpedance amplifier (TIA). Component values can be, in some examples: V2 1.4 V; L1 22 nH; R3 50Ω; C1 22 nF; R4 50Ω; R1 50Ω; C2 20 pF; R2 5 kΩ; C3 20 pF.

Figure 14:
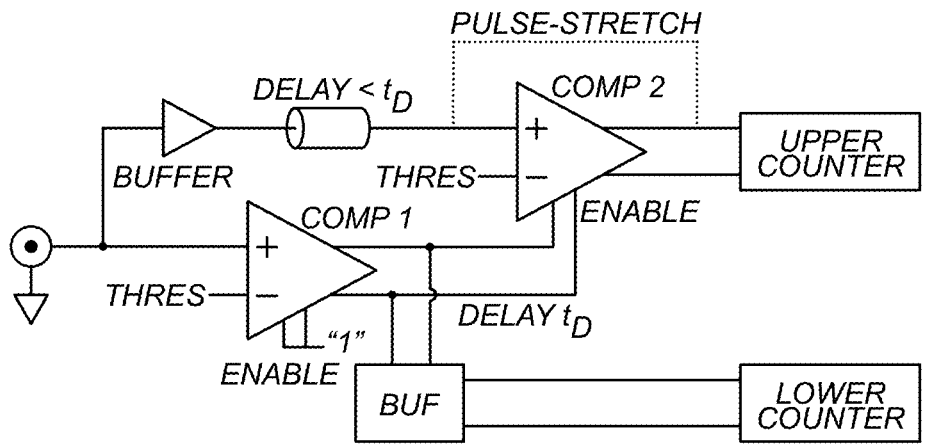
FIG. 14 is a circuit diagram of an example pulse-width counter/discriminator circuit.

FIG. 14 shows an example pulse-width counter/discriminator circuit. Some examples include various ways to distinguish pulse widths. In general, a fixed comparator threshold level can be used to detect pulse width difference. As an example, the block diagram shown in FIG. 14 can discriminate between single- and overlapped-photon pulses.

In some examples, illustrated circuits can detect two overlapping photon avalanches that result in a pulse that is longer (wider) than a "standard" pulse width of a single-photon pulse. For linearity of the measurement system, some examples identify such pulses as being two photons rather than one photon.

The illustrated examples use two comparators: Comp 1 and Comp 2. The comparators can be single-ended- or differential-output. Various comparator technologies can be used, e.g., technologies that allow for propagation delays of hundreds of picoseconds.

Figure 15:
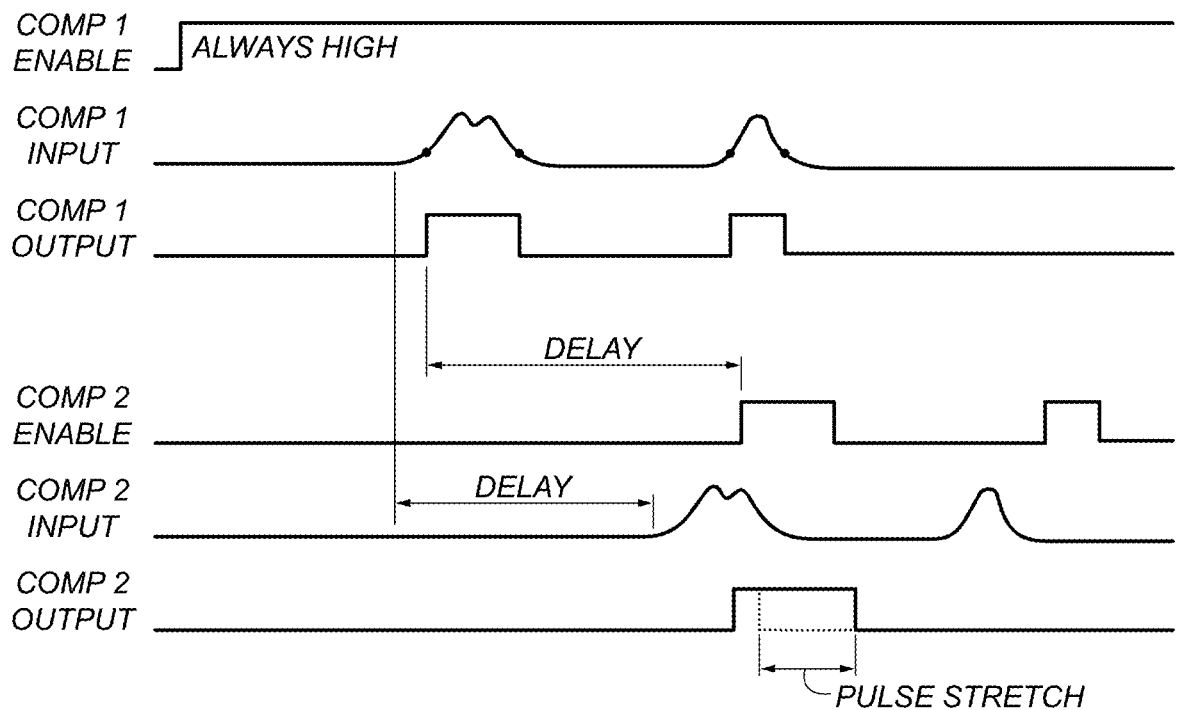
FIG. 15 shows example timing diagrams of the circuit of FIG. 14.

FIG. 15 shows example timing diagrams of the circuit of FIG. 14. In the illustrated examples, longer pulses are counted twice: once with the lower counter on Comp 1, and once with upper counter on Comp 2. The total count is then the sum of the lower counter's count and the upper counter's count. In illustrated examples, Comp 2 can only go high if the pulse is longer than one standard pulse-width, because Comp 2 is only enabled once a standard pulse-width's worth of time has passed after the onset of the pulse. This can prevent double-counting of single photons while still providing accurate counting of two overlapped photon pulses.

In some examples, Comp 1 is continuously enabled while measurements are being taken. Comp 2 is enabled by Comp 1, after a delay to. The input signal is also delayed by an amount less than to, so that it arrives at Comp 2 one standard pulse-width before Comp 2 becomes enabled. Therefore, Comp 2's input signal is high when it becomes enabled only if the pulse is wider than one standard pulse-width. In some examples, the buffer and delay line introduce a delay of td, the predetermined standard pulse-width). The propagation delay td is the time between when the input pulse arrives at Comp 1 and when comp 2 becomes enabled ($t_d < t_o$). The standard pulse-width varies by device and preamp. In some examples, the standard pulse-width can be ~400 ps-~900 ps. The standard pulse-width can be selected empirically and embodied physically, e.g., in delay lines, or as a stored configuration value in software or firmware. For a long pulse, Comp 2 outputs a high level and stretches the output pulse in time, so that the counter can register the pulse.

The illustrated polarity is an example and is not limiting. For example, the counters can increment on an active-low or active-high clock. Suppose a positive rising pulse is applied to IN+ and a threshold is applied to IN-. The comparator will go LO→HI as the positive pulse crosses the threshold. This is appropriate for an active-high counter. For a negative pulse, the inputs would be flipped in order to continue using an active high comparator. In some implementations there may be multiple buffers or multiplexers for signal observation and sourcing; those muxes could invert the signal one or more times.

Figure 16:
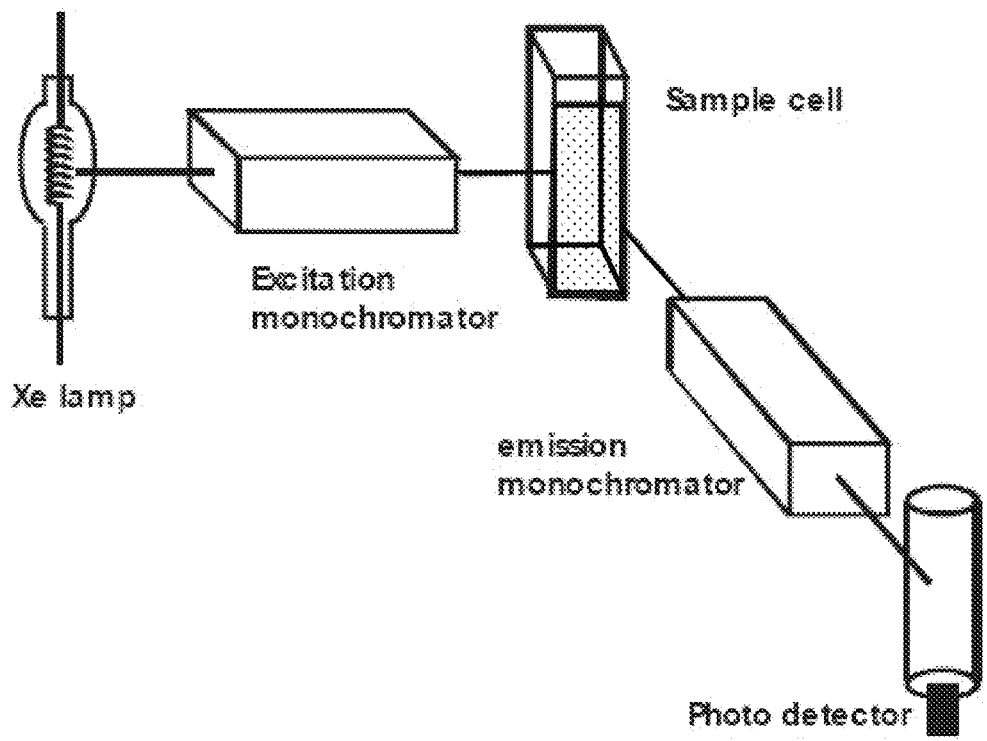
FIG. 16 shows an example spectrofluorometer configuration according to various prior schemes.

FIG. 16 shows an example spectrofluorometer configuration according to various prior schemes. Various prior schemes suffer from at least one of the following limitations. Use of an incoherent white light source (e.g., a xenon or halogen lamp) and two monochromators can result in large power consumption for the lamp, e.g., 150 W; low excitation power through a slit; intensity that is difficult to measure; or difficulty observing high-intensity phenomena like photobleaching. A perpendicular optical layout between the sample and a fluorescence detector, used to avoid effects due to the excitation light, limit the configuration and shape of samples and sample cells that can be used. Use of an emission monochromator and photocurrent detection can prevent the use of quantitative collecting optics, resulting in measured intensity values in arbitrary units rather than meaningful photometric units, and can provide a low sensitivity due to photocurrent detection. Accordingly, some prior schemes do not provide quantitative fluorescence measurement, and can be bulky and expensive.

Figure 17:
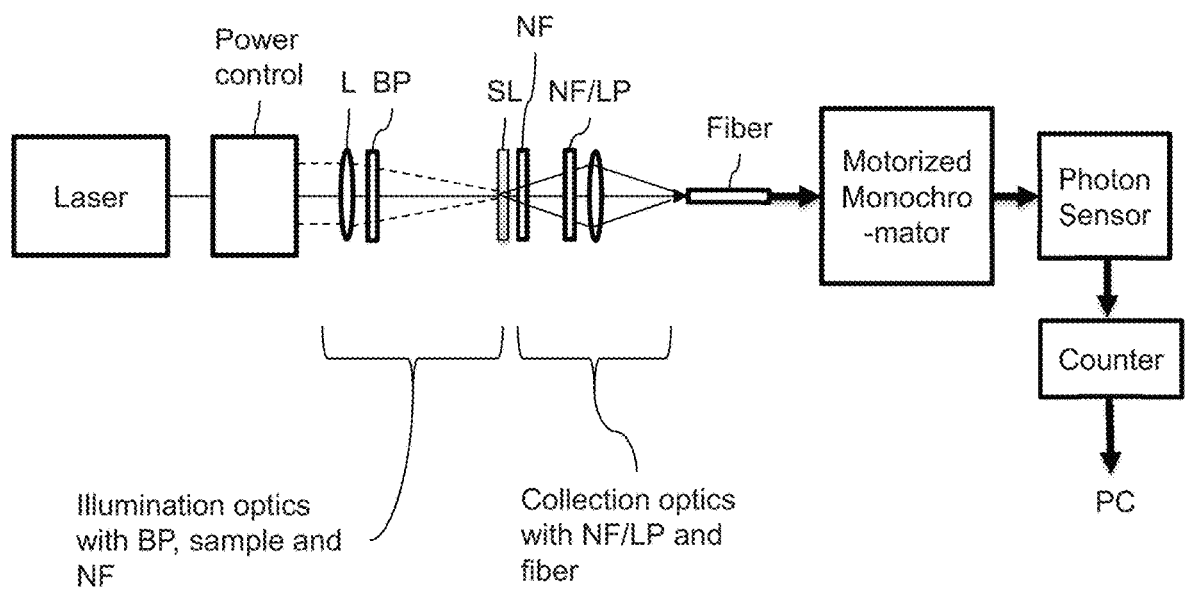
FIG. 17 shows a single-photon spectrometer configuration according to various examples herein.

FIG. 17 shows a single-photon spectrometer configuration according to various examples herein. Illustrated is a coherent light source, e.g., a laser. Other lasers or sources that provide one or more specific wavelengths of light can be used. An illumination intensity control unit can be used, and can include, e.g., at least one of a laser power control unit, a polarizer, or a neutral density (ND) filter.

In some examples, illumination optics can include a lens (L); a laser notch filter (NF), e.g., a dielectric filter, at a beam waist of the laser beam or other incident light; and a laser bandpass filter (BP) between L and NF. A sample (SL) or other target to be measured can be located adjacent to or otherwise proximal to the NF filter. This can provide a double excitation effect by reflection of the laser beam off the notch filter. Examples are discussed herein, e.g., with reference to FIG. 18 or 20. Fluorescence detection optics downstream of SL and NF can include additional notch filters, long-pass (LP) filters, lenses to focus emitted resultant light, e.g., fluorescence, to an optical fiber, or any combination thereof. A motorized monochromator can select a particular wavelength of light to direct to the photon sensor. The photon sensor and associated electronics, e.g., as in FIGS. 1-15, can drive a counter to count pulses. The counter value can be read by, e.g., a personal computer (PC) and software.

In some examples, meta-material absorption materials can be used to reduce effects due to stray light in a spectrometer. For example, a carbon-nanotube absorber can have <0.1% reflectivity. This can increase the dynamic range of the measurement system.

Some examples use an optical bandpass filter (BPF). In various examples, a BPF can reduce or substantially eliminate accelerated (or amplified) spontaneous emission (ASE). In some examples, an incident laser beam induces ASE photons with a broad spectrum, e.g., red-shifted slightly with respect to the incident light. In an example, the ASE peak extends from approximately 430 nm to approximately 465 nm. To improve the accuracy of photon counting, ASE can be reduced by adding a bandpass filter, e.g., centered at 405 nm (or other laser peak wavelength) with a width of, e.g., 20 nm (e.g., 395 nm-415 nm). Data can be measured of stray light and autofluorescence at various power levels, demonstrating that the measurement system can effectively characterize even the performance of some of its own optical components.

In a tested example, a SiPM was illuminated with a light source through a cover having a thickness of ~3 μm. The measured data exhibited peaks at specific wavelengths, indicating that interferometric effects were present in the resultant light being measured. These effects can be due to protective layers on the SiPM die or package. To reduce noise due to such interferometric effects, anti-reflective (AR) coating(s) can be used on the SiPM or optical elements associated therewith.

Additionally or alternatively, detectors as described herein can be used to measure layer thicknesses using interferometric effects. An example optical structure can include two interfaces ("1-2" and "2-3") between three layers ("1," "2," and "3"). In some examples, at least one of the layers (e.g., layer 1, or layers 1 and 3) can be air. For example, Layer 2 can represent a cover of the SiPM. The thickness d of Layer 2 can be determined based on the wavelengths (nm) of the peaks and valleys of the interference pattern ($\lambda_n$), and on a refractive index n. In an example, layer 1 is air (n≈1.0), layer 2 is a transparent layer having refractive index n, and layer 3 is a reflective layer, e.g., comprising silicon. Using measurement techniques herein can permit, e.g., measuring the thickness d of the cover of the SiPM (layer 2) using diffraction patterns. In various examples, detection circuitry as described herein (e.g., SiPM sensors and circuitry such as shown in, e.g., FIG. 9) can permit measuring thickness of optical filters or other elements, e.g., imaged onto a cover-less SiPM (or a SiPM with an AR-coated cover).

Figure 18:
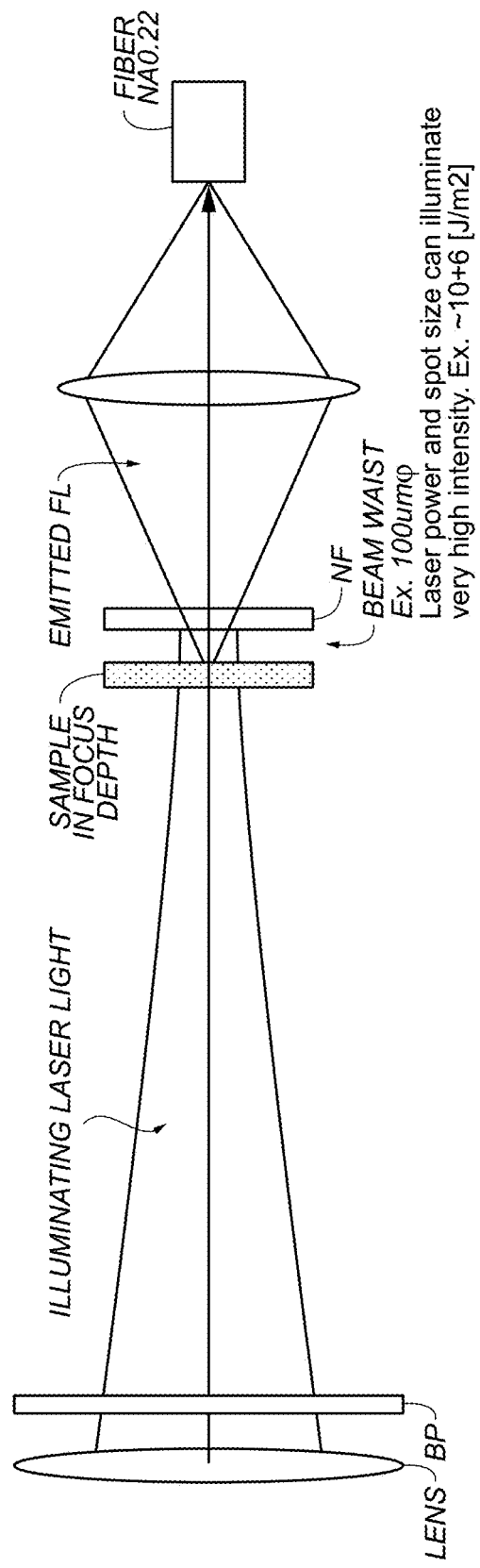
FIG. 18 shows sample-illumination and resultant-light-collection optics according to various examples herein.

FIG. 18 shows illumination and collection optics according to various examples herein. "NF" is a notch filter. "FL" is fluorescence. Various examples permit readily aligning the laser beam and the filter/sample positions. In some examples, the laser beam is focused on the NF filter to obtain a conjugate image, i.e., an image that follows an optical path symmetrical to the optical path of the incident illumination. In some examples, the laser beam is reflected by the NF and excites the sample again. This provides a double excitation effect and roughly double the detection sensitivity. For example, if the reflected laser beam illuminates a portion of the sample that has not yet been illuminated, another fluorescent photon may be emitted.

In some examples, the collection optics can have a consistent numerical aperture (NA). Therefore, the collection efficiency can be determined quantitatively. Moreover, the optical fiber used to convey the collected resultant light can couple to small sensor area effectively. In some examples, the NA of the collection optics is smaller than the NA of the fiber. In some examples, a long pass filter is positioned between NF and fiber. In some examples, a filter can be used as discussed herein with reference to FIG. 24. In some examples using a long pass filter to reduce laser leakage, only single-photon pulses are measured. In some examples, an OD6 filter is not used.

Experiments were conducted to measure cps as a function of time for various tested examples. Tests were performed of Quartz/Glass photo bleaching at a high level of exposure, as indicated by the total photon count. The tests were conducted with a 405 nm laser emitting 500 μW and a 100 μm-diameter (φ) beam waist. Three tests were conducted, respectively with: a quartz 0.1 mm thick, cover glass 0.17 mm thick, and cover glass 0.1 mm thick. The plotted exposure data were collected over the course of ten minutes (600 s). Quartz exhibited the lowest total count and intermediate photo bleaching, 0.1 mm cover glass exhibited the highest total count and high photo bleaching, and 0.17 mm cover glass exhibited an intermediate total count and low photo bleaching (relatively little change in output over the course of the ten minutes).

Figure 19:
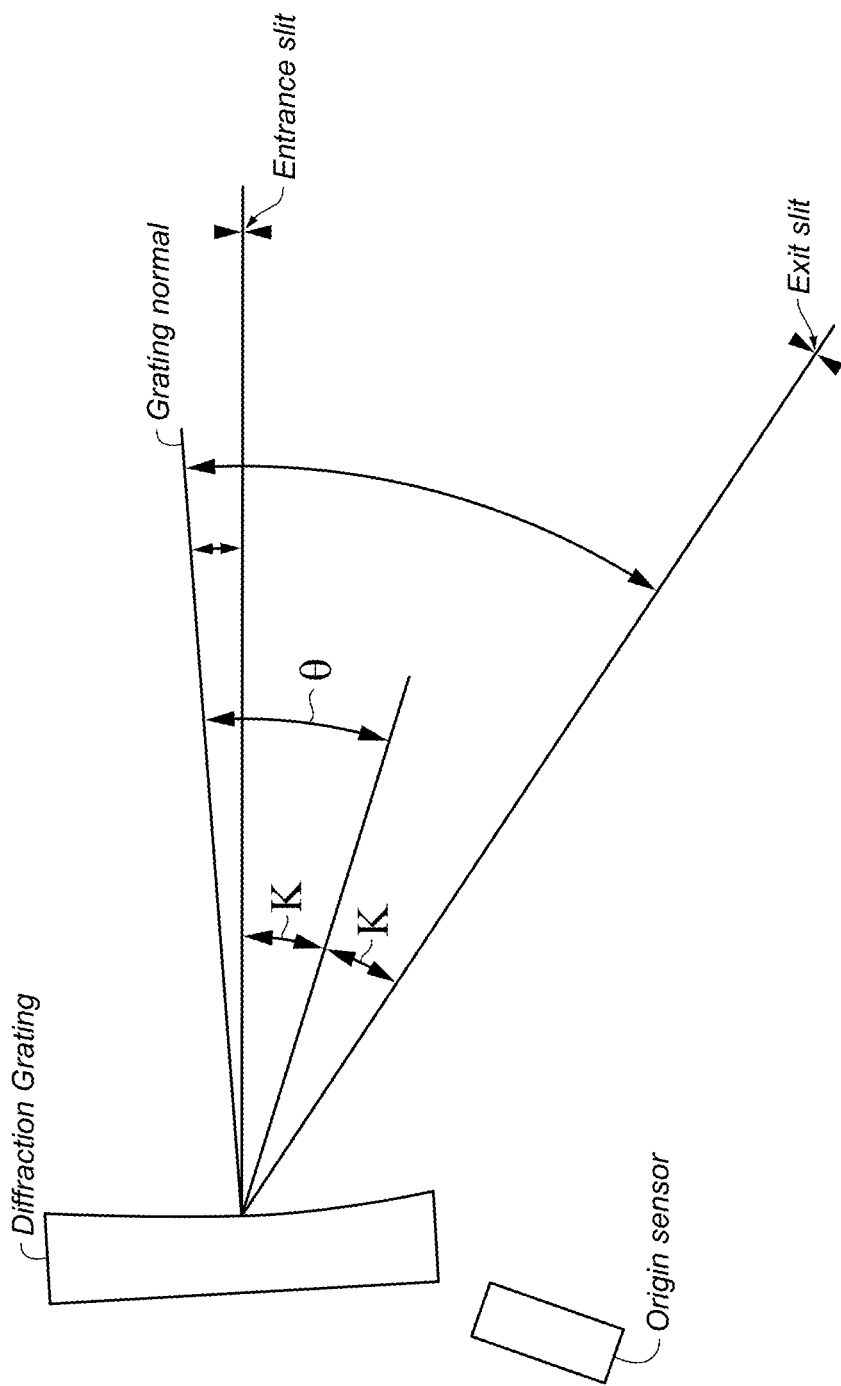
FIG. 19 shows some components and optical paths of an example motorized monochromator.

FIG. 19 shows some components and optical paths of an example motorized monochromator. The illustrated monochromator can be configured to receive broadband illumination via the entrance slit and provide illumination of a narrow bandwidth (e.g., only a few nm) via the exit slit. The motor can turn or otherwise adjust the grating or other optical components of the monochromator to select which wavelengths are collected and counted.

There are various sources of stray light in a monochromator. Some include stray light from the entrance, stray light from the exit, and AFL from the inside walls of the monochromator. Other sources include 2nd order and 0th order light from the grating, in configurations in which the 1st order light is normally used. To reduce stray light and improve detection sensitivity when using monochromators and other optical enclosures, various examples use a metamaterial absorber. For example, carbon nanotubes (CNTs) with or arranged in metastructure can absorb photons to a level of less than 0.1% reflectivity, compared to a typical anodized Al coating reflectivity of about 4%. Improvements in reflectivity can directly improve dynamic range. For example, a reduction in reflectivity to 1% of its former levels can improve the dynamic range of a spectrometer by 100 times.

Measured data was collected at various wavelengths for a tested monochromator. Calculated addresses for the wavelengths were compared with the measured data. The tested monochromator agreed with the calculated results.

Figure 24:
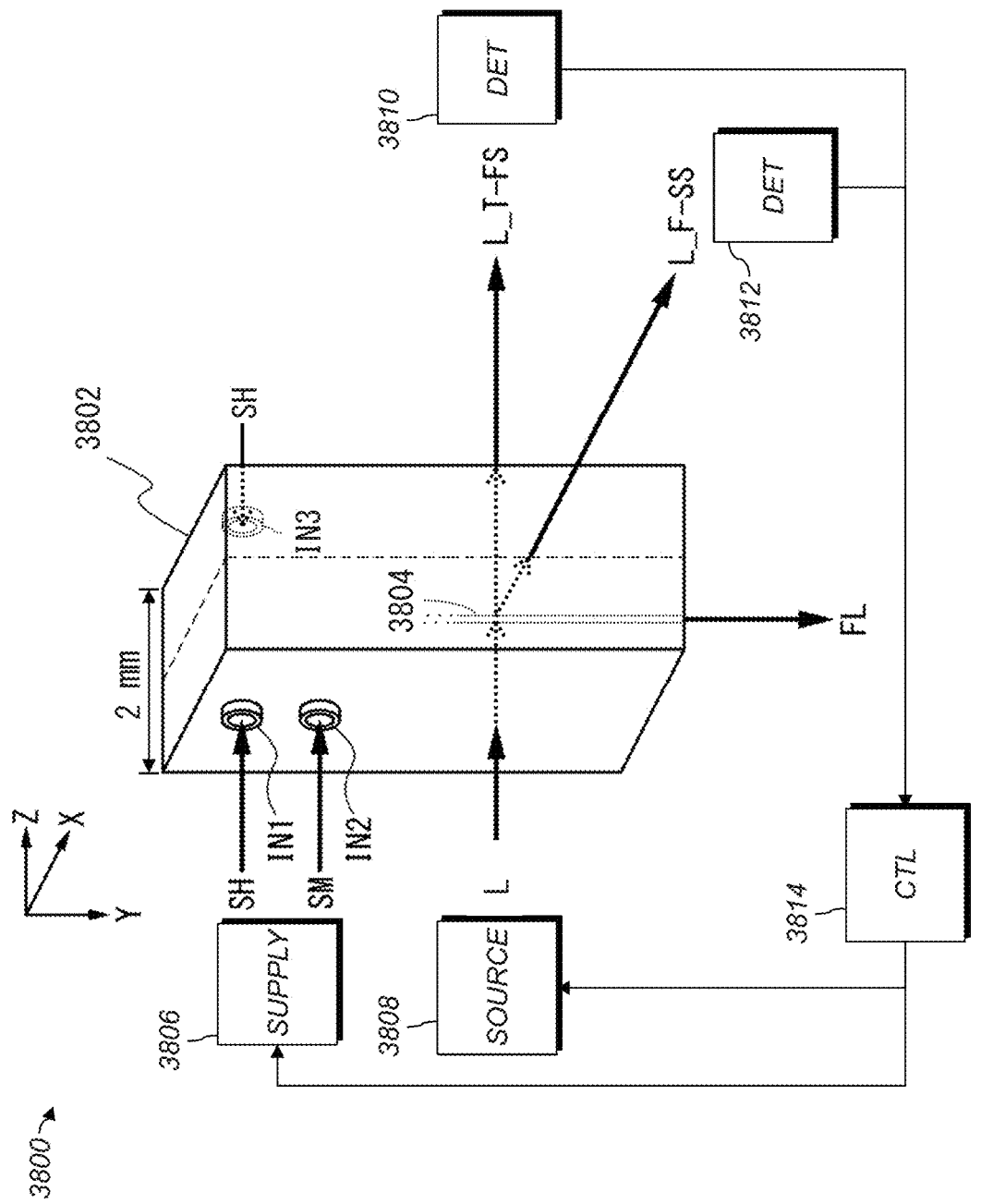
FIG. 24 shows an example flow-cytometry system according to various examples herein.

In some examples, systems such as that shown in FIG. 1 can provide photon counts for each of a plurality of wavelength intervals at each of a plurality of times (or in each of a plurality of time windows). For example, the wavelength windows can be 0.1-10 nm, the scan times for a particular wavelength can be 1-1000 s, and the exposures can be captured over 1 ms-10.00 s. However, other values outside these ranges can additionally or alternatively be used. In some examples, 1 s samples over a long period of time, e.g., ≥600 s, can be used to measure photo bleaching. An example is shown in FIGS. 24 26. In some examples, the dark count can be about 125 cps.

An experiment was conducted to measure data of a single-photon spectrum of a sheath fluid for a flow cytometer, as measured by a system such as that shown in FIG. 1 including a motorized monochromator. The system background count was measured after installing, successively, a 440 nm long-pass filter, a tube holder, and dry tubing. Measurements were then taken after liquid sample filling to determine autofluorescence (AFL) of a tested sheath liquid for a flow cytometer, e.g., as discussed herein with reference to FIG. 24. The system was able to effectively measure the sheath liquid, with cps peaking over 450,000 compared to a background level after installing the dry tubing of less than 50,000.

Figure 20:
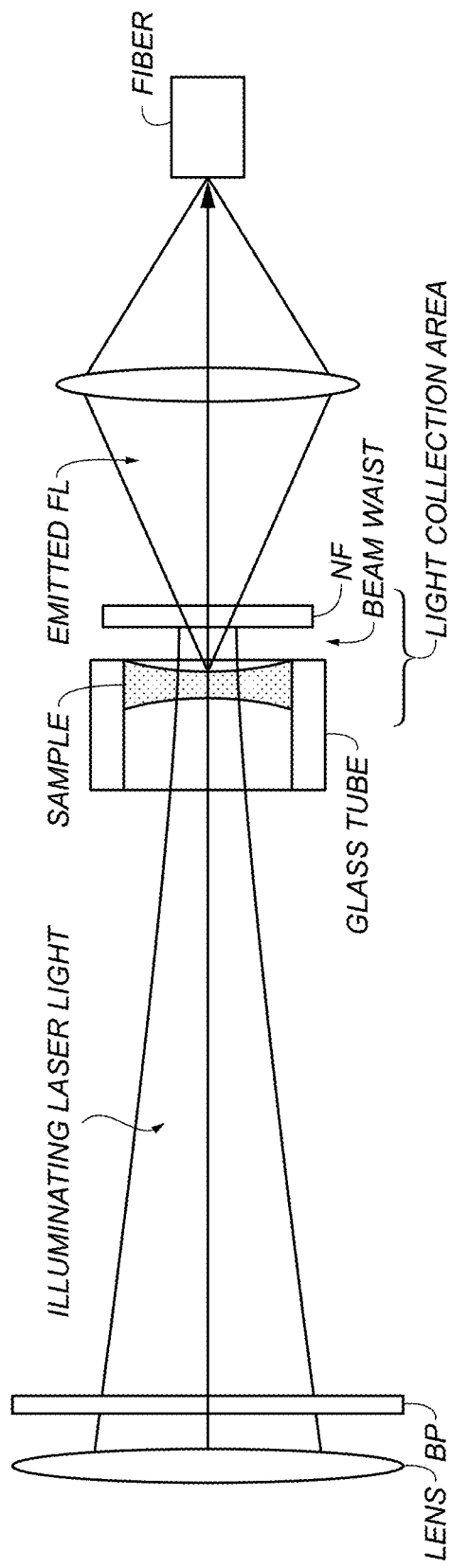
FIG. 20 shows an example configuration of an optical system permitting wall-less fluorescence detection of liquid samples by coaxial illumination in a tube.

FIG. 20 shows an example configuration of an optical system permitting wall-less fluorescence detection of liquid samples by coaxial illumination in a tube. In some examples of wall-less detection, no vessel is used in a manner that would cause the vessel to exhibit autofluoresence. Abbreviations are as discussed herein with reference to FIGS. 17 and 18.

Many materials exhibit autofluorescence (AFL), including high-grade quartzes and glasses. In some prior schemes, liquid samples require a vial for measurement. However, measurements of the sample fluorescence can be affected by AFL of the vial walls, i.e., photons emitted by the vial walls because of AFL. Therefore, wall-less capturing of sample liquid permits fluorescence detection with reduced noise from vessel AFL. In some examples, the sample liquid is held by surface tension within a 2-3 mm (inner diameter) glass tube, e.g., having relatively flat inner surfaces and open ends. This size is nonlimiting; other sizes can be used as long as the sample is retained within the tube by surface tension. Other materials than glass can be used for the tube, e.g., quartz. The sample is illuminated along a coaxial direction, e.g., substantially parallel to the walls of the tube. This can significantly reduce the amount of incident light reaching the tube walls, so can substantially reduce measurement noise due to vial wall auto fluorescence. In some examples, 10 μL-20 μL of sample fluid is used to provide a 2 mm sample thickness. In some examples, e.g., as discussed herein with reference to FIGS. 30 and 31, the tube can be a tube or well in an array of tubes, e.g., a plate array. Plates can include, e.g., 96 tubes, 384 tubes, or more tubes. In some examples, the tube has an open end and retains a fluidic sample (e.g., a liquid sample) by capillary action.

In some examples, the tube, the laser source, or other components of a measurement system are arranged so that the beam does not cross or intersect with the tube within a light-collection area associated with the tube and the sample. In the illustrated example, the light-collection area is a portion of the sample or its surroundings from which resultant light is directed to the collection fiber by the collection lens or other optics. If the beam crosses the tube away from the light-collection area, AFL photons will not be directed to the collection fiber, so will not corrupt the measurement. In some examples, the light-collection area comprises at least the smallest cylindrical volume that is coaxial with the incident light, that extends longitudinally only far enough to encompasses the entirety of the sample, and that extends radially only as far as necessary to encompass (or, in some examples, reach) the outer walls of the tube.

In some examples, measurement systems as described herein can be used for automated drug screening or other high-volume biological measurement tasks. For example, in automated high throughput screening, multiple samples can be arranged in separate tubes along the path of a laser. The fluorescence of each sample can be measured individually, permitting measuring more samples in a given amount of time. The dynamic range and wavelength selectivity can permit performing advanced chemical analyses, such as drug screening, not supported by some prior schemes.

FIGS. 21A-21G show examples of aperture shape conversion fiber bundles configured to provide increased spectral resolution and coupling efficiency. In some examples, a bundle of fibers is used to convey light between the monochromator slits and other optical components.

FIG. 21A shows spectrum 2100, e.g., as spatially distributed by a grating such as that shown in FIG. 19. Overlaid on spectrum 2100 are example fiber-bundle shapes 2102 (circular) and 2104 (rectilinear, short axis along the spectrum).

FIG. 21B shows an example monochromator for selecting light of a particular wavelength from a broadband source such as sunlight.

FIG. 21C is a cross-sectional view of an example of dense packing of circular optical fibers.

FIGS. 21D and 21E show cross-sections of fibers bundled into circular bundles 2102. Such configurations can be used, e.g., at the interfaces to the laser, lenses, sensors, or sample.

FIGS. 21F and 21G show cross-sections of fibers bundled into substantially rectilinear configurations 2104. Such configurations can be used at the monochromator entrance and exit slits to improve spectral resolution.

In the illustrated example, bundles A and B (FIGS. 21D and 21E) are circular bundles, so have aspect ratios (long side:short side) of 1:1. Bundles C and D (FIGS. 21F and 21G) are rectangular bundles. Bundles C and D are examples of bundles having an elongated shape, e.g., bundles for which the best-fit ellipsoid is substantially non-circular. For example, for bundles C and D, the elongated shape is a substantially rectangular shape. For bundle D, the elongated (rectangular) shape has an aspect ratio (long:short) exceeding 3:1, specifically, 700:186≈3.8. In some examples, the elongated shapes have aspect ratios of at least, or greater than, 2:1. Fiber bundles can provide improved power efficiency while maintaining spectral selectivity compared to some prior schemes.

Some example monochromators have performance figures of merit expressed in spectral width vs. slit width, and exit intensity vs. slit width. In some examples, narrower slit widths of the monochromator generally correspond with narrower wavelength bands into or out of the monochromator, which can increase spectral resolution. For example, a wider slit has larger signal but less spectral resolution compared to a narrower slit. In some examples, a conversion fiber bundle converts from circular close packing to linear packing, e.g., as in FIG. 21. This can provide increased signal and increased spectral resolution.

FIGS. 21F and 21G show examples of proximal ends of bundles. A bundle can receive, at its proximal end, at least one of a spatially dispersed plurality of wavelengths, e.g., from a monochromator exit slit or while scanning across the output field of a polychromator (e.g., FIG. 26B). The distal end of the bundle can be arranged to provide light to an SPM, e.g., as in FIG. 27B.

An experiment was performed to measure data of a test of conjugate excitation in Quartz 7980, and the effect of conjugated optics. The measurement equipment used for this test included a single core fiber. The sensor's dark count level was measured from 350-850 nm, as was the system's background count curve (higher than the dark count level across the range, but less so at longer wavelengths). Results were measured across that range of one-pass excitation of the quartz material, and showed a peak around 40,000 cps near 510 nm, compared to a background level of about 19,000 cps. A spectral profile was then measured by conjugated excitation, in which the quartz material receives double the illumination due to reflection of the incident light off the notch filter after passing through the quartz material the first time. The ~510 nm peak of the two-pass condition was ~71,000 cps, over twice the counts per second of the one-pass.

An experiment was performed to measure the spectral profile, after subtracting the background, of conjugate excitation in Quartz 7980. An intensity profile was measured by conjugated excitation. A separate intensity profile was measured by one-pass excitation. The double-excitation curve had a peak 2.57×higher than the peak of the single-excitation curve (51.7 kcps vs. 20.1 kcps).

An experiment was performed to measure data of cps by wavelength (350-510 nm) for, e.g., various diameters of fiber core. In the tested condition, using a core diameter >0.6 mm, the spectral FWHM was larger than the sampling resolution. The FWHM as a function of core diameter was as shown in Table 2.

TABLE 2

| Slit width | FWHM (nm) |
|---|---|
| 0.2 mm | 1.5 |
| 0.3 mm | 2.0 |
| 0.4 mm | 2.8 |
| 0.5 mm | 3.4 |
| 0.6 mm | 4.0 |
| 0.7 mm | 4.6 |
| 0.8 mm | 5.0 |

Figure 22:
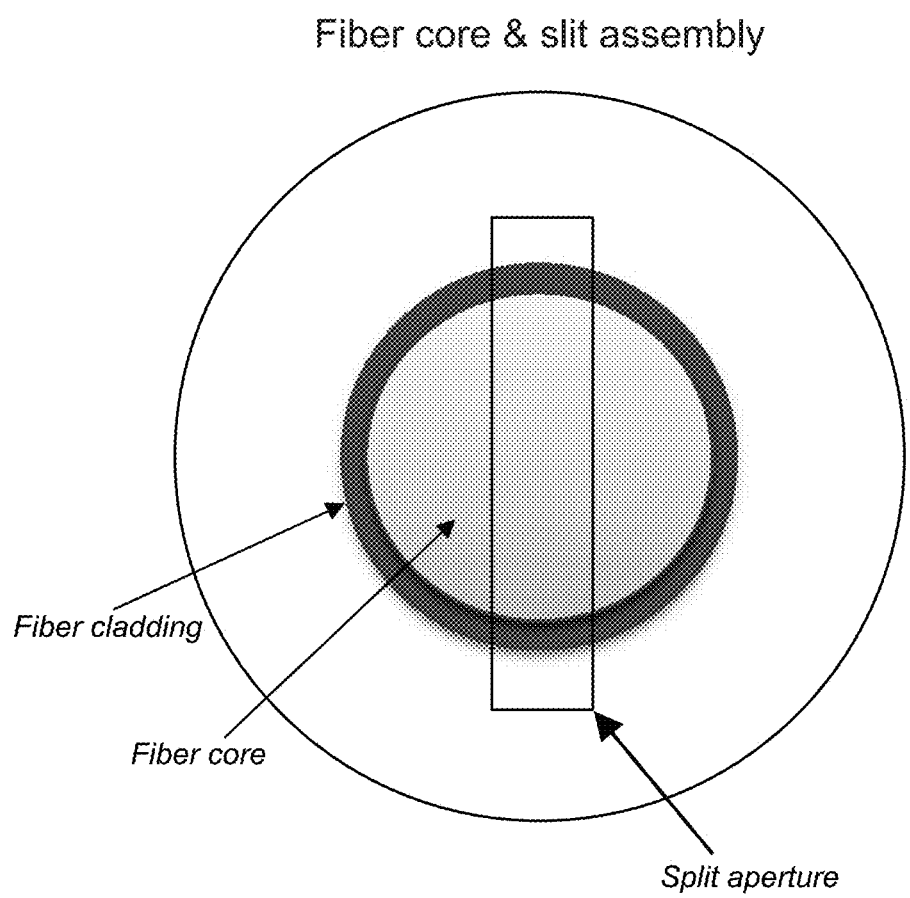
FIG. 22 shows an end view of an example using a relatively large-core fiber and a slit aperture at the end of the fiber.

FIG. 22 shows an end view of an example using a relatively large-core fiber and a slit aperture at the end of the fiber. This combination can provide improved coupling efficiency and spectral resolution compared to various prior schemes. The slit aperture can provide increased selectivity with reduced complexity compared to fiber bundles.

An experiment was performed to measure data of optical efficiency (in percent) and of FWHM (nm) as a function of slit width in mm. As slit width increased, optical efficiency and FWHM both increased. Below a slit width of 0.6 mm, efficiency dropped more rapidly as slit width decreased than was the case above 0.6 mm. The experiment showed that FWHM was controlled by the input core size.

Figure 23:
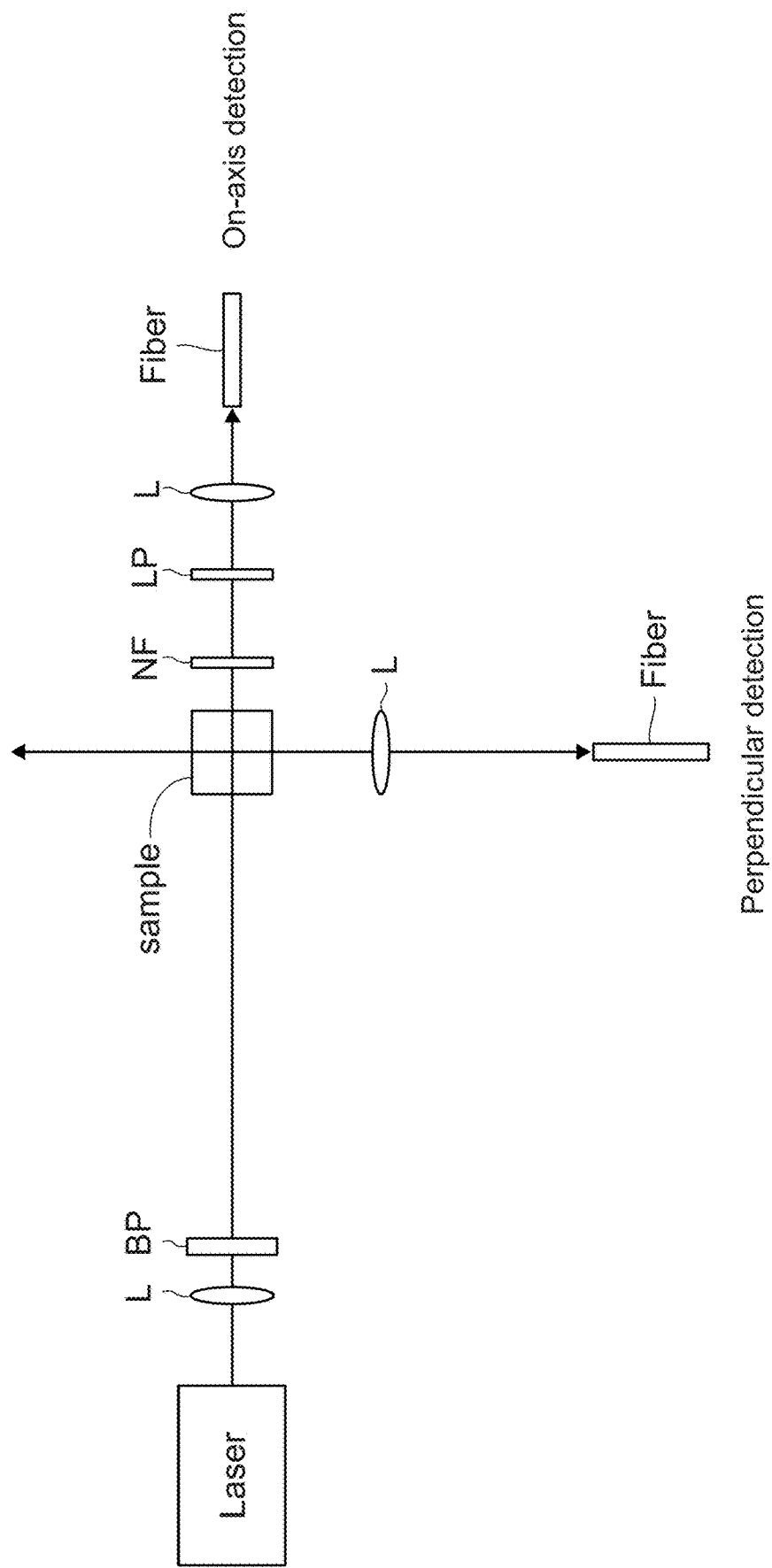
FIG. 23 shows components of an example optical system supporting on-axis and perpendicular measurement.

FIG. 23 shows components of an example optical system supporting on-axis and perpendicular measurement, in any combination. The illustrated components can additionally or alternatively be applied at other angles than those shown, e.g., 45°. In some examples, the illustrated sample can be located in a flow chamber, e.g., as discussed herein with reference to FIG. 24. In some examples, detectors using a monochromator as described herein (e.g., FIG. 17, 19, 21B, or 26A), or a polychromator as described herein with reference to FIG. 26B, can be used to measure the on-axis and perpendicular resultant light. Some examples can use a slit and large core combination (FIG. 22) with perpendicular detection. The on-axis and perpendicular configurations are shown for purposes of example; single photon spectroscopy as described herein can be applied at any angle with respect to the incident beam. For example, on-axis detection can be used with transparent samples and conjugate excitation. Perpendicular detection can be performed without a filter, so can have reduced spectral loss.

The Influence of excited AFL depends on optics configuration. In-line detection to laser incident direction may be more affected than perpendicular fluorescence detection. In the case of confocal fluorescence imaging or flow cytometry with longer gate period for small particles, optics AFL can be reduced for higher contrast and accurate detection.

An experiment was performed to measure data of photon spectra of two different quartz samples, in cps over the wavelength range (in nm). In the tested example, the two types of quartz were distinguishable from each other using single-photon measurements.

The experimental data were collected in a step mode. In some examples, counting can be performed in, e.g., a step mode or a scan mode. In step mode, the monochromator can be adjusted to a particular wavelength (e.g., a 1 nm window), photons can be collected for a predetermined time (e.g., 1 s) while the monochromator is substantially fixed with respect to wavelength, and the adjusting and collecting operations can be repeated to collect respective photon counts for each of a plurality of wavelengths.

In scan mode, by contrast, the monochromator can be adjusted to change the wavelength continuously at a predetermined rate. For example, the monochromator can scan a 2 nm-wide window across the spectrum, and data can be collected, e.g., substantially continuously, or at points or intervals in time associated with predetermined wavelengths (e.g., the window centered on 400 nm, 405 nm, 410 nm, . . . ).

FIG. 24 is a perspective view schematically showing an example flow-cytometry system 3800 that can be used with sensors and detection systems described herein, e.g., FIG. 23. System 3800 includes a flow cell 3802. The flow cell 3802 includes a flow chamber 3804, and is, at least in part, transparent or substantially transparent to irradiation such as light L and resultant light such as light L_T-FS and L_T-SS. For clarity, only part of flow chamber 3804 is shown. Further details of various configurations of flow chamber 3804 and other parts of a flow system 330 (FIG. 3) are discussed below with reference to FIGS. 3A, 3B, and 5-10B. As shown, the flow cell 3802 can be 2 mm thick along the direction of propagation of light L.

A sheath flow SH flows into the flow cell 3802 from an inlet port IN1. For example, saline, which is an isotonic liquid, or water, can be used as the sheath flow SH. However, the sheath flow SH is not limited to saline, but various types of liquid such as water, other aqueous solutions (whether isotonic or not), and organic solvents can be used. In various examples, the sheath flow SH also flows into the flow cell 3802 from at least one additional inlet port, shown as IN3.

Further, a sample flow SM including microparticulate samples or other targets to be analyzed flows into the flow cell 3802 from an inlet port IN2. For example, saline, which is an isotonic liquid, can be used as the sample flow SM. However, the sample flow SM is not limited to saline, but various types of liquid such as water, other aqueous solutions (whether isotonic or not), and organic solvents can be used. The inflow pressure of the sample flow SM can be higher than or lower than the inflow pressure of the sheath flow SH. Flow chamber 3804 or other fluid channels in flow cell 3802 can be arranged so that the center of the sample flow is the fastest and the flow velocity approaches zero at the walls of the flow channel 3804. This can cause targets to be hydrodynamically focused, i.e., positioned by the fluid flow, substantially in the center of the sample flow. In the illustrated example, the fluid flows SM and SH are provided by a fluidic supply 3806.

The inlet ports IN1, IN2, IN3 can be bored, molded, or otherwise formed in the flow cell 3802. In an example, the flow cell 3802 includes glass or quartz. For example, flow channels (e.g., flow chamber 3804) can be formed by micro-blasting of quartz sheets. Ports IN1, IN2, IN3 can be drilled out of the quartz sheets. Other etching and boring techniques can be used to form flow channels, inlets, and other features. For example, sample channels, including flow chamber 3804, can be etched, and sheath channels can be micro-blasted using a mask to define the desired pattern. In other examples, channels and other cavities described herein can be injection molded, molded using other techniques, bored, or etched.

The sheath flow SH and the sample flow SM merge in the flow chamber 3804, so that a flow FL is provided in which the sample flow SM is substantially hydrodynamically focused with the sheath flow SH, e.g., around the sample flow SM, or arranged in other hydrodynamic-focusing configurations. The flow FL can be discharged to the outside of the flow cell 3802 in some examples.

An optical source 3808, e.g., a laser or other illumination source, can provide light L aimed, focused, or otherwise directed to irradiate the targets entrained within the sample flow SM. Laser light L can be at least partly transmitted or at least partly scattered, providing resultant forward-scattered light L_T-FS and resultant side-scattered light included in L_F-SS. Targets, e.g., chromophores bound to target molecules of interest, can fluoresce, producing resultant fluorescent light also included in L_F-SS. A detector 3810, e.g., an on-axis detector (FIG. 23), can detect light L_T-FS. A detector 3812, e.g., a perpendicular detector (FIG. 23), can detect light L_F-SS. Various examples can use one detector or more than one detector. Detectors can be placed at any angle with respect to the axis of the light L.

In some examples, optical source 3808 can include at least one component described in at least one of FIG. 1, 16, 17, 18, 19, 20, 21, 22, 23, or 25. In some examples, at least one of detector 3810 or detector 3812 can include at least one component described in at least one of FIG. 1-5, 7, 9-11C, 13, 14, 17-23, 25, 28, or 32-37. For example, optical source 3808 can include a laser and conjugate focusing optics, and detector 3810 can include a motorized monochromator, a SiPM using Geiger-mode PDs, and a differential detection circuit (FIGS. 4A-6B).

In some examples, a controller ("CTL") 3814 can control operation of the fluidic supply 3806 or the optical source 3808. In some examples, controller 3814 can receive information, e.g., photon counts, from detectors 3810, 3812.

Example Features

Various examples relate to multiple photon detection, e.g., with <1 ns pulse width, e.g., by avalanche signal processing. Various examples relate to spectrum analysis. Various examples relate to or include at least one of the following features, in any combination:

1. High pass filter Signal Processing: E.g., $C_{HP}$ (Farad)= $T_{RISE}/50$, e.g., t=100 ps, c=2 pF. E.g., CHP (Farad)=$T_{RISE}/25\sim100$ 2. Adaptive pedestal clamping by ADD signal processing—Add two signals using a gain that stabilizes the pedestal level. In some examples, the two signal phase difference is smaller than 10 pulse pairs in resolution.

3. Differential Signal Processing of Photon Pulse: e.g., $C_{DIFF}$(Farad)=(⅕)CHP=$T_{RISE}/250$. In some examples, the primary corner frequency F0 (Hz)=1/(10 $T_{RISE}$)

3, using Differential Amplitude: $C_{DIFF}$(Farad)=(⅕)$C_{HP}$=$T_{RISE}/250$; Primary corner frequency F0 (Hz)=1/(10 $T_{RISE}$)

3, using Differential Pulse Width: Two comparators at a threshold level of photon pulses; pulse width discrimination by pulse width comparison.

4. Adaptive comparator: Adaptive Envelope reference level determined as constant+envelope signal.

5. Comparator pulse resolution: smallest resolvable pulse smaller than pulse width at 70% level of Pulse height.

6. Photon Spectrum Analyzer including at least one of the following: Excitation Laser; focus lens; bandpass filter (laser wavelength); sample illumination; collection lens; notch filter; fiber-motorized monochromator; fiber-photon detection.

6, including a scanning monochromator for synchronized spectrum window Δλ at x seconds.

6, including photon counting per each Δλ, and repeated exposures.

6, configured to provide data indicating n×Δλ vs. photon count as a histogram.

6, configured to provide data indicating a counting trend at a specific wavelength (photon energy).

7. Spectrometer including a coherent-light illumination unit, a monochromator, and a single photon detector.

7, where the optics includes illumination optics and collection optics that convey the light to an optical fiber.

7, where the optics are arranged in an in-line layout between illumination and detection.

7, where the illumination optics focus the laser beam on a reflective laser notch filter. This way, the light excites the sample twice: once before reflection and once after. The sample is located close to the laser beam waist and the notch filter.

7 or the preceding, where the Illumination optic include a laser band pass filter to reduce laser spontaneous emission (e.g., ASE).

7, where the collection optics collects fluorescence photon in specific solid angle defined by a NA.

7, where the monochromator IN and OUT fiber bundles have slit shapes with close packing at the monochromator.

The preceding, where the fiber bundles have circular shapes away from the monochromator.

8. Tube Trapping of a liquid sample. This can reduce vial AFL.

9. Fluorescence photons scanned by a motorized monochromator for spectral analysis.

10. Data is analyzed for wavelength and time dependence, e.g., photo-bleaching.

11. Estimating and analyzing fluorescence characteristics quantitatively based at least in part on photon count, photon energy, illumination power, optics NA, or sensor PDE.

12. Any of the foregoing example features, combined or used with components described herein with reference to FIG. 2A-2D, 4A-4C, or 32-34.

13. Examples described herein with reference to FIG. 2A-2D, 4A-4C, or 32-34.

Various aspects described herein provide detection and quantitative measurement (e.g., counts) of photons, e.g., using an SiPM or SSPMT. A technical effect is to measure emissions of fluorescent targets, e.g., in a sample fluid. A further technical effect is to effectively detect photons that strike a SiPM during the quench/recharge/dead time of that SiPM.

In some examples, SiPM or SSPMT Photon Detectors as described herein can provide improved sensitivity and linearity of fluorescence analysis. A dynamic range of six orders of magnitude can be measured, compared to three orders of magnitude for conventional photocurrent analysis. In some examples, flow cytometry systems herein can apply high power laser beam illumination to a sample in order to analyze material characteristics at high intensity illumination. Some examples can detect photo-bleaching phenomena using single photon analysis, unlike some prior schemes. Some examples can reduce auto fluorescence compared to some prior cytometers, e.g., by removing AFL effects due to a quartz flow chamber, sheath fluid, water, or calibration microbeads. Some examples permit cellular analysis by determining material AFL and providing very-low-fluorescence detection, e.g., of microparticles or single molecules.

Example Data-Processing System

Figure 25:
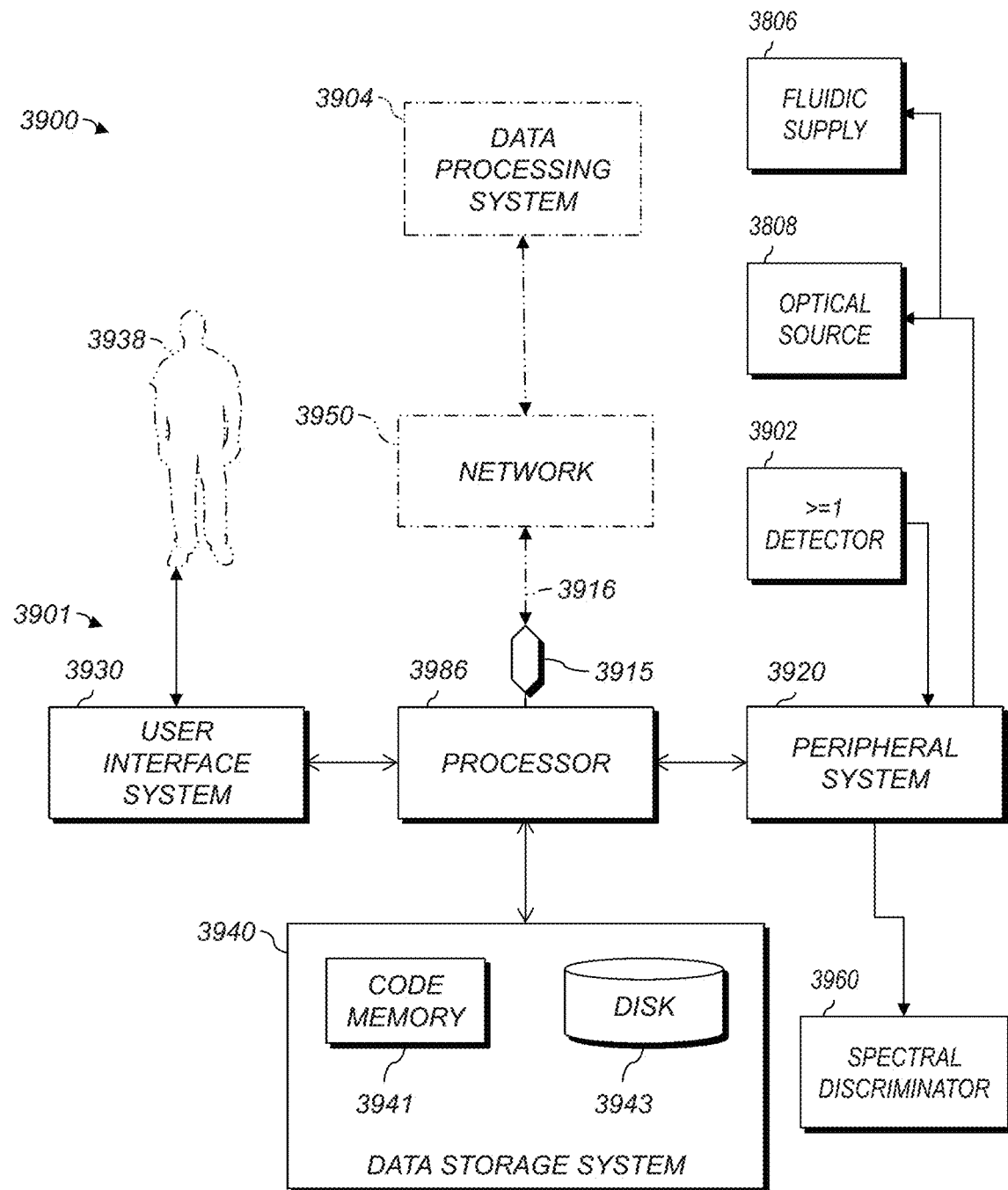
FIG. 25 shows an example data-processing system according to various examples herein.

FIG. 25 is a high-level diagram 3900 showing the components of an example data-processing system 3901 for analyzing data and performing other analyses described herein, and related components. The system 3901 includes a processor 3986, a peripheral system 3920, a user interface system 3930, and a data storage system 3940. The peripheral system 3920, the user interface system 3930, and the data storage system 3940 are communicatively connected to the processor 3986. Processor 3986 can be communicatively connected to network 3950 (shown in phantom), e.g., the Internet or a leased line, as discussed below. Devices above (e.g., the PC in FIG. 1, the system in FIG. 9, the PC in FIG. 17, controller 3814 shown in FIG. 24, the PC shown in FIG. 34, or other processing systems herein) can each be or include one or more of systems 3901, 3986, 3920, 3930, or 3940, and can each connect to one or more network(s) 3950. Processor 3986, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 3986 can implement processes of various aspects described herein. Processor 3986 and related components can, e.g., carry out processes for detecting photons, collecting count data from counters, operating a laser (e.g., adjusting the laser power), operating a monochromator (e.g., to scan across a wavelength band), or operating a fluid supply or other components of a flow-cytometry system as in FIG. 24.

Processor 3986 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 3920, user interface system 3930, and data storage system 3940 are shown separately from the processor 3986 but can be stored completely or partially within the processor 3986.

The peripheral system 3920 can include or be communicatively connected with one or more devices configured or otherwise adapted to provide digital content records to the processor 3986 or to take action in response to processor 186. For example, the peripheral system 3920 can include digital still cameras, digital video cameras, cellular phones, or other data processors. The processor 3986, upon receipt of digital content records from a device in the peripheral system 3920, can store such digital content records in the data storage system 3940. In the illustrated example, the peripheral system 3920 permits the processor 3986 to control fluidic supply 3806 and optical source 3808. The peripheral system 3920 also permits the processor 3986 to receive data from detector(s) 3902, e.g., detectors 3810 or 3812. In some examples, the peripheral system 3920 also permits the processor 3986 to control a spectral discriminator 3960, e.g., a motor or other drive that operates a monochromator to select the particular wavelength band output by the monochromator (e.g., FIG. 19 or 26).

The user interface system 3930 can convey information in either direction, or in both directions, between a user 3938 and the processor 3986 or other components of system 3901. The user interface system 3930 can include a mouse, a keyboard, another computer (connected, e.g., via a network or a null-modem cable), or any device or combination of devices from which data is input to the processor 3986. The user interface system 3930 also can include a display device, a processor-accessible memory, or any device or combination of devices to which data is output by the processor 3986. The user interface system 3930 and the data storage system 3940 can share a processor-accessible memory.

In various aspects, processor 3986 includes or is connected to communication interface 3915 that is coupled via network link 3916 (shown in phantom) to network 3950. For example, communication interface 3915 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. Communication interface 3915 sends and receives electrical, electromagnetic, or optical signals that carry digital or analog data streams representing various types of information across network link 3916 to network 3950. Network link 3916 can be connected to network 3950 via a switch, gateway, hub, router, or other networking device.

In various aspects, system 3901 can communicate, e.g., via network 3950, with a data processing system 3904, which can include the same types of components as system 3901 but is not required to be identical thereto. Systems 3901, 3904 can be communicatively connected via the network 3950. Each system 3901, 3904 can execute computer program instructions to operate measurement systems or capture measurements as described herein, or to communicate measurement data, e.g., via network 3950.

Processor 3986 can send messages and receive data, including program code, through network 3950, network link 3916, and communication interface 3915. For example, a server can store requested code for an application program (e.g., a JAVA applet) on a tangible non-volatile computer-readable storage medium to which it is connected. The server can retrieve the code from the medium and transmit it through network 3950 to communication interface 3915. The received code can be executed by processor 3986 as it is received, or stored in data storage system 3940 for later execution.

Data storage system 3940 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 3986 can transfer data (using appropriate components of peripheral system 3920), whether volatile or nonvolatile; removable or fixed; electronic, magnetic, optical, chemical, mechanical, or otherwise. Example processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 3940 can be a tangible non-transitory computer-readable storage medium, i.e., a non-transitory device or article of manufacture that participates in storing instructions that can be provided to processor 3986 for execution.

In an example, data storage system 3940 includes code memory 3941, e.g., a RAM, and disk 3943, e.g., a tangible computer-readable rotational storage device or medium such as a hard drive or solid-state drive (SSD). Computer program instructions are read into code memory 3941 from disk

3943. Processor 3986 then executes one or more sequences of the computer program instructions loaded into code memory 3941, as a result performing process steps described herein. In this way, processor 3986 carries out a computer implemented process. For example, steps of methods described herein, blocks of the flowchart illustrations or block diagrams herein, and combinations of those, can be implemented by computer program instructions. Code memory 3941 can also store data, or can store only code.

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 3986 (and possibly also other processors), and that, when loaded into processor 3986, cause functions, acts, or operational steps of various aspects herein to be performed by processor 3986 (or other processor). Computer program code for carrying out operations for various aspects described herein may be written in any combination of one or more programming language(s), and can be loaded from disk 3943 into code memory 3941 for execution. The program code may execute, e.g., entirely on processor 3986, partly on processor 3986 and partly on a remote computer connected to network 3950, or entirely on the remote computer.

Further Example Embodiments, Features, and Experimental Results

An experiment was performed to measure PE characteristics, in cps by mV, at bias voltages from 27 V-29 V, by 0.5 V. As bias voltage increased, a given mV level produced higher CPS. The five tested curves showed generally the same shape (a double waterfall), but shifted to the right (+mV) and slightly up (+cps) as bias voltage increased.

An experiment was performed to measure photo bleaching, indicated as the cps of the spectral peak as a function of accumulated exposure in mJ. The observed photo-bleaching occurs over a period of time, as the exposure accumulates. In the tested example, cps peaked at 23 kcps at <10 mJ of exposure, and declined to 2.6 kcps after about 280 mJ of exposure.

An experiment was performed to determine the amount or extent of photo bleaching using normal and reverse scans. In the illustrated example, measurements were collected from short wavelengths to long wavelengths (normal scan), 420 nm-670 nm. Subsequently, measurements were collected from long wavelengths to short (reverse scan). The difference between the two measurements at a given wavelength indicates the photo-bleaching at that wavelength. In some examples, the reverse scan can be performed before the normal scan. In the tested example, the normal scan peaked at (446 nm, 110 kcps). The corresponding peak on the reverse scan was at around 55 kcps. The curve shapes were generally the same.

An experiment was performed to measure spectra of a multi-ion discharge lamp in cps as a function of wavelength from 400-700 nm using techniques described herein. The measurements showed strong peaks at ~430 nm and ~540 nm. Techniques described herein can additionally or alternatively be used to measure other types of lamps, e.g., to test conformance of standard lamps or other sources to corresponding illuminants.

The experimental data covered more than three orders of magnitude (from below $10^3$ cps to above $10^6$ cps). Accordingly, some prior schemes having at most three orders of magnitude of dynamic range would not be able to effectively measure the lamp to provide the experimental data. Moreover, some prior lamp-characterization systems provide results in arbitrary units. As discussed above, counts measured by some example detectors described herein can be readily converted to physical units. This can make the collected data applicable to a wider range of uses than data provided by some prior schemes.

An experiment was performed to measure spectra using techniques described herein, in cps as a function of wavelength. A tungsten-halogen light source was measured without a filter, and found to have broadband emission over the range 400-700 nm. Two filters were measured: "525 BPA" and "525 BPB". The wide dynamic range (cps as high as $~1.6 \times 10^7$) and possibility to report results in physical units permit characterizing filters more accurately than in some prior schemes. This can permit improving the quality of data from flow cytometry, since filter characteristics can significantly affect cytometric results.

An experiment was performed to measure spectra (log scale) of various colors of physical test targets: Semi-transparent sky blue; Largely opaque violet; Semi-transparent red; Semi-transparent pink; Semi-transparent orange; Semi-transparent yellow; Semi-transparent green; Semi-transparent blue.

The physical test targets were plastic POST-IT flags of different colors. The measurements were able to span more than four orders of magnitude, from a system baseline of $~10^4$ cps to a peak measurement $~1.2 \times 10^8$ cps. This is much more dynamic range than some prior schemes.

Figure 26B:
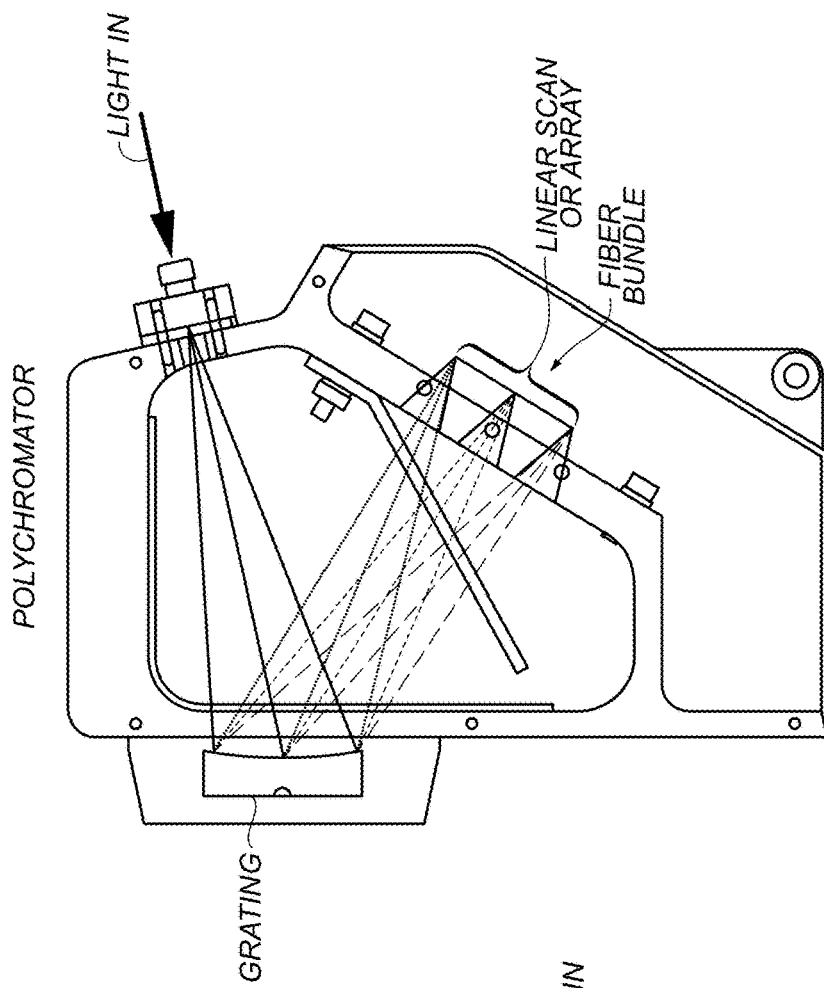
FIG. 26B shows an elevational cross-section of an example polychromator.
Figure 26A:
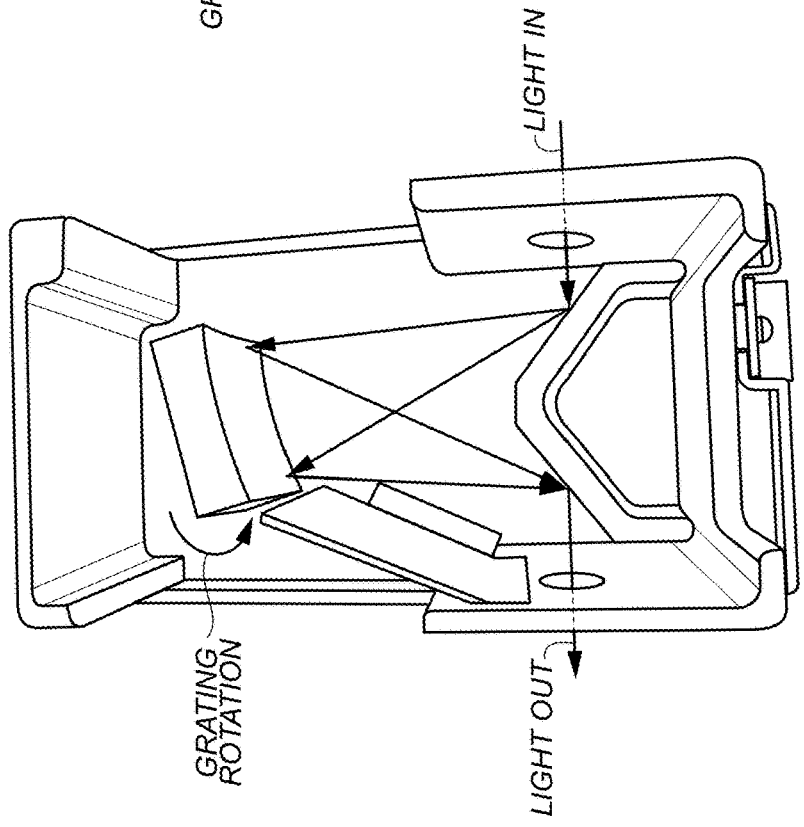
FIG. 26A shows a perspective of components of an example motorized monochromator.

FIG. 26A shows a perspective of an example motorized monochromator. Example monochromators are described herein with reference to FIGS. 17, 19, and 21.

FIG. 26B shows an elevational cross-section of an example polychromator. The polychromator can, e.g., disperse incoming light across to a fiber-optic cable bundle, e.g., as in FIG. 21 or 22. Additionally or alternatively, the polychromator can include or be connected to a motion system (e.g., a linear stage) that translates a fiber or fiber bundle across the spectrum spatially distributed by the grating.

Figure 27B:
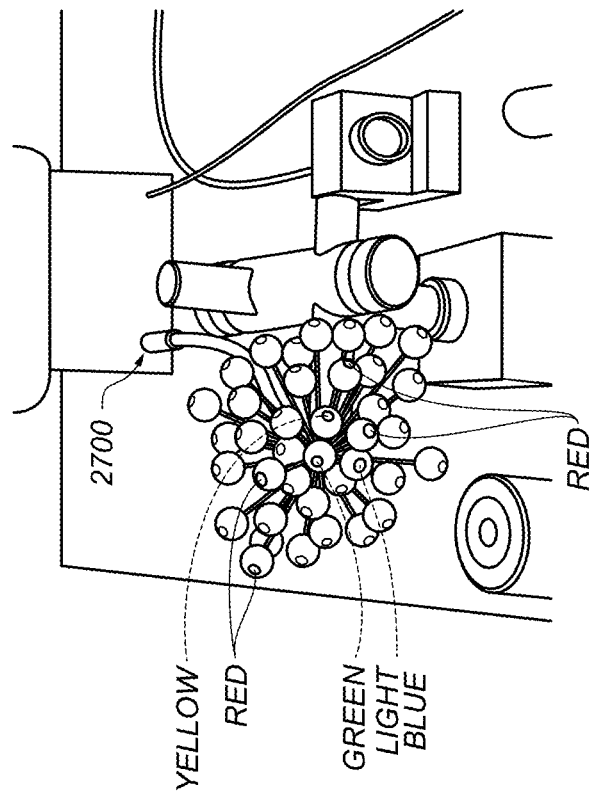
FIG. 27B shows output fibers fed by a polychromator.
Figure 27A:
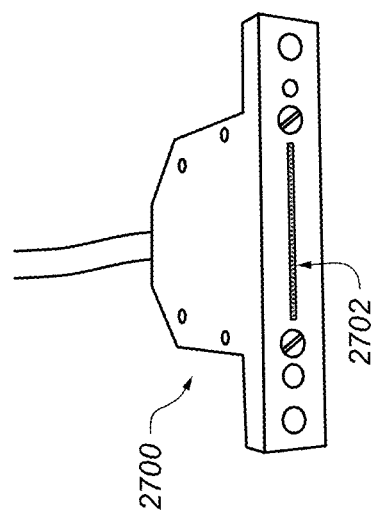
FIG. 27A shows an example linear fiber array and connector.

FIG. 27A shows an example 42-channel ("42 CH") linear fiber array connector 2700. The illustrated connector includes a bundle 2702 of 42 optical fibers arranged along a line.

FIG. 27B shows output fibers fed by a polychromator such as that shown in FIG. 26. Connector 2700 can connect to the polychromator and carry the output fibers in bundle 2702. As noted by the color labels, different output fibers are carrying different wavelengths of output light.

Figure 28:
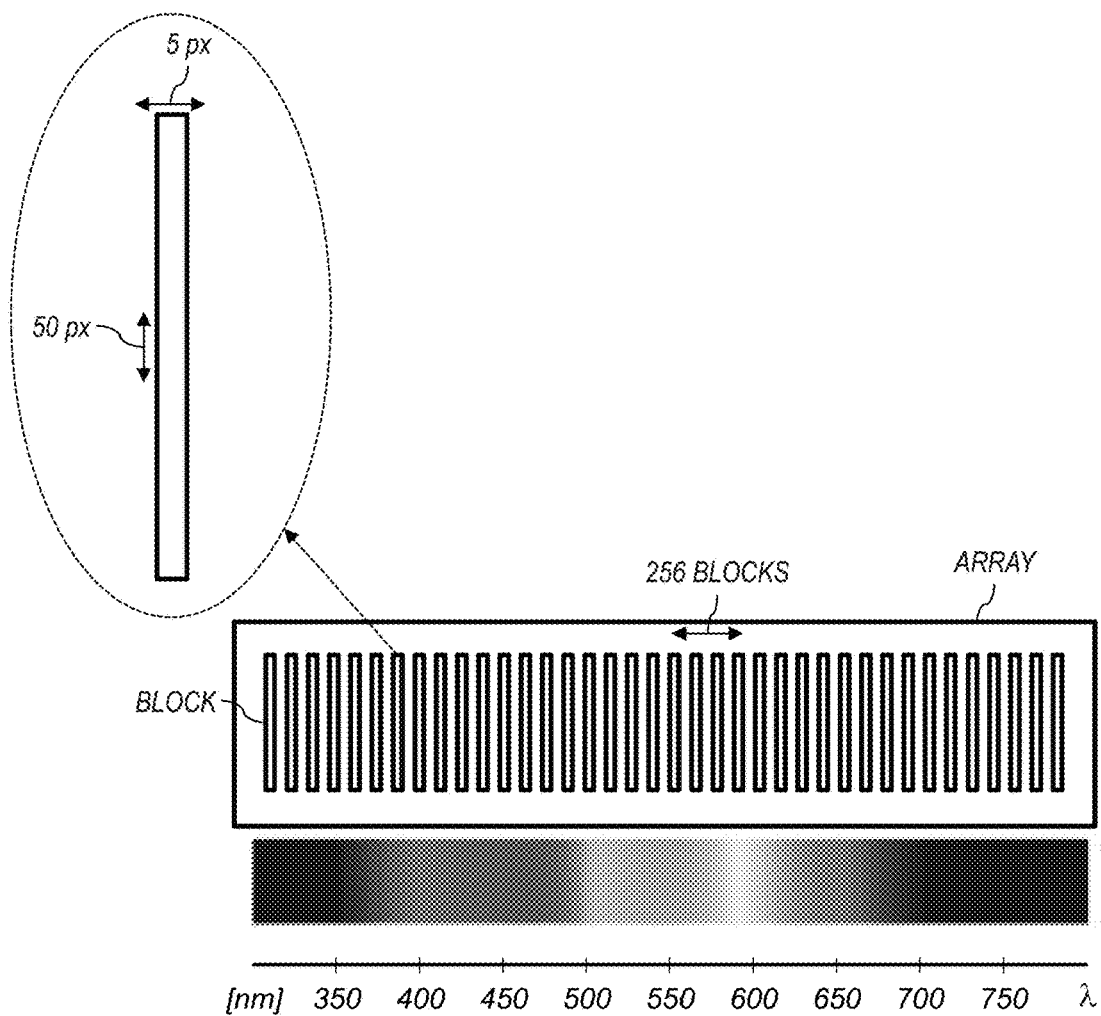
FIG. 28 shows an example SiPM linear array.

FIG. 28 shows an example SiPM linear array configured for high-speed (e.g., µs) single-photon spectrum detection. The array can be used as a photon sensor or optical detector in various configurations herein, e.g., FIG. 1, 9, 17, 18, 20, 24, or 25. As shown, the array includes multiple blocks of SiPM pixels (e.g., 250 pixels each, as 5 px×50 px). Each SiPM pixel can include a PD and a resistor, e.g., as discussed herein with reference to FIG. 2A, 3A, 3B, 4A, or 11A-11C. Each block of pixels extends substantially along an axis that is substantially not parallel with (e.g., is substantially perpendicular to, or is at least 40° from) a direction (horizontal) across which the spectrum is spread. Multiple blocks are arranged along the spectrum-spread direction (e.g., 256 blocks for a 256-channel array). Any number of blocks, or of pixels per block, can be used. In the illustrated example, the array is or includes a monolithic SiPM array. In some examples, electronics, e.g., as in FIG. 4A, 5, 7, 9, 10A-10B, 13, or 14, can be integrated within a die or package holding the SiPM array. In some examples, multiple array or electronics dice can be integrated within a package. The illustrated array has 256 blocks (shown as strips extending vertically), each corresponding to one output channel. The blocks are packed together horizontally. Each illustrated block can have a width of 100 µm, for a total array width of ~25.6 mm. Each block can be, e.g., 1 mm long. Each block can include 250 pixels, e.g., arranged in five rows of 50 pixels each (as shown in the inset). In some examples, the blocks can be separate blocks, e.g., spaced apart or abutted. In some examples, the blocks can be portions of an area sensor having a regular 2-D array of SiPM pixels. In some examples, the linear array can comprise an area sensor.

In some examples, the dark count of a SiPM sensor is proportional to sensor area. Therefore, using small blocks (e.g., 1.0×0.1 mm as shown) can reduce the dark current (e.g., to one-tenth that of a 1×1 mm sensor). Cooling, filtering, or other techniques herein can further reduce the dark count.

Dark-count rate (DCR) is the lower limit of sensitivity and largely determines the dynamic range of photon counting. A cause of high dark counts is thermal noise in p-n junctions. Thermal electrons are amplified in a similar manner to incident photons. Unlike photo current noise (thermal noise, shot noise, amp noise, and so on), the dark count can easily be subtracted from the evaluated count rate. A Peltier cooler or other cooling unit can be arranged proximal to the SiPMs or other SSPDs and configured to cool the SSPDs to reduce dark count. Other examples of coolers include forced-air ventilation coolers, e.g., cooling heatsinks applied to the SiPMs; liquid-cooling systems; or cooling systems using dry ice or other compounds with freezing temperatures below 0° C., either in direct contact with the SSPDs to be cooled or arranged so that the vapor from those compounds is brought into thermal contact with the SSPDs to be cooled.

A 1 mm$^2$ SiPM sensor was tested. At temperatures higher than 25° C., the DCR was over 100 kcps, but was reduced to 2 kcps at −10° C. Various examples provide a DCR <1 kcps by cooling the sensor below −20° C. Experimental evidence showed that a DCR of 100 cps was attained by dry-ice cooling at −50° C. A counting range from 1 kcps to 1 Gcps provides a six-orders-of-magnitude dynamic range with theoretical linearity in the digital environment. Temperature control also provides improved data accuracy, stability, and reproducibility. The measured value of DCR at 4° C. was 5 kcps, the standard deviation per second, r, was 10 to 50 cps, and the coefficient of variation was 0.2-1.0%, respectively.

Figure 29:
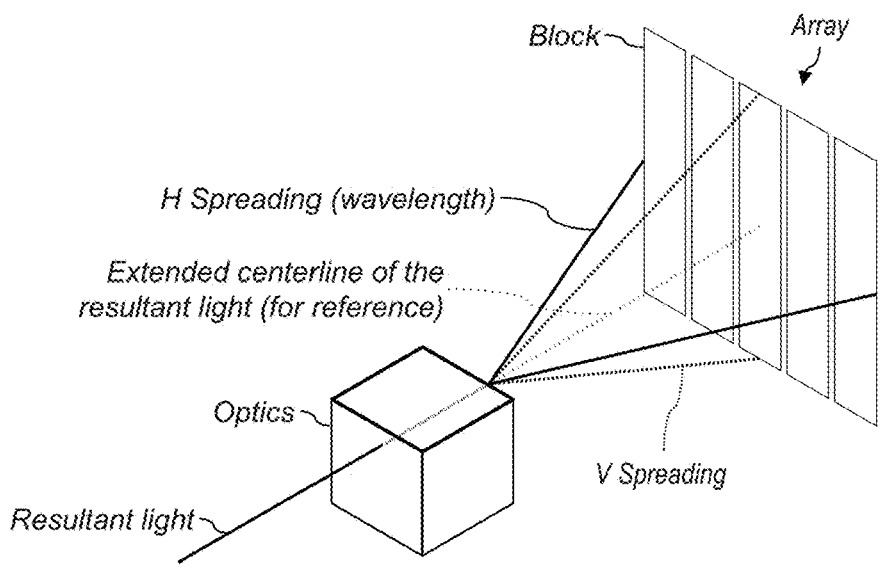
FIG. 29 shows components of an example optical system and array.

FIG. 29 shows an isometric view of an example optical system and array. Resultant light is shown for clarity of explanation as a collimated beam, although this is not required. The illustrated optics collect resultant light and spread the light over the array (five blocks are shown, but any number can be used). The optics causes different wavelength bands of light to strike each block ("H spreading"). For a particular block, the optics can spread the light within the corresponding wavelength band across the block to increase sensitivity or dynamic range of the detection system ("V spreading"). In some examples, H and V spreading can be performed by separate optics, e.g., a beam expander for V spreading followed by a grating for H spreading. In some examples, only H spreading is performed (e.g., for beams already substantially as wide as the blocks are long). V spreading can additionally or alternatively be performed by directing the beam onto the sensor at an angle other than normal to the sensor, e.g., from below or above in the illustrated configuration, to expand the width of the beam as projected on the sensor.

Accordingly, the optics can be configured to spread out different wavelengths of the resultant light along the same direction the blocks are spread out (horizontal, as illustrated) and to spread out light within a particular wavelength along a second direction substantially different from that direction (vertical, as illustrated), e.g., a direction perpendicular to or more than 40° from that direction. The illustrated optics can include at least one slit, grating, beam shaper, beam expander, prism, mirror, or lens, in any combination. In an example, optics includes a spectral discriminator, e.g., a grating or prism, to perform the H spreading, followed by a slit or a lens arrangement to perform the V spreading. The illustrated orientation, and the terms "H" and "V," are not limiting; other orientations or spatial arrangements can be used.

In some examples, the optics can include a toroidal mirror grating for the H spreading. Additionally or alternatively, the optics can include a plurality of dichroic mirrors configured to reflect respective wavelengths to respective blocks or groups of blocks. Additionally or alternatively, the optics can include prism(s).

Figure 30:
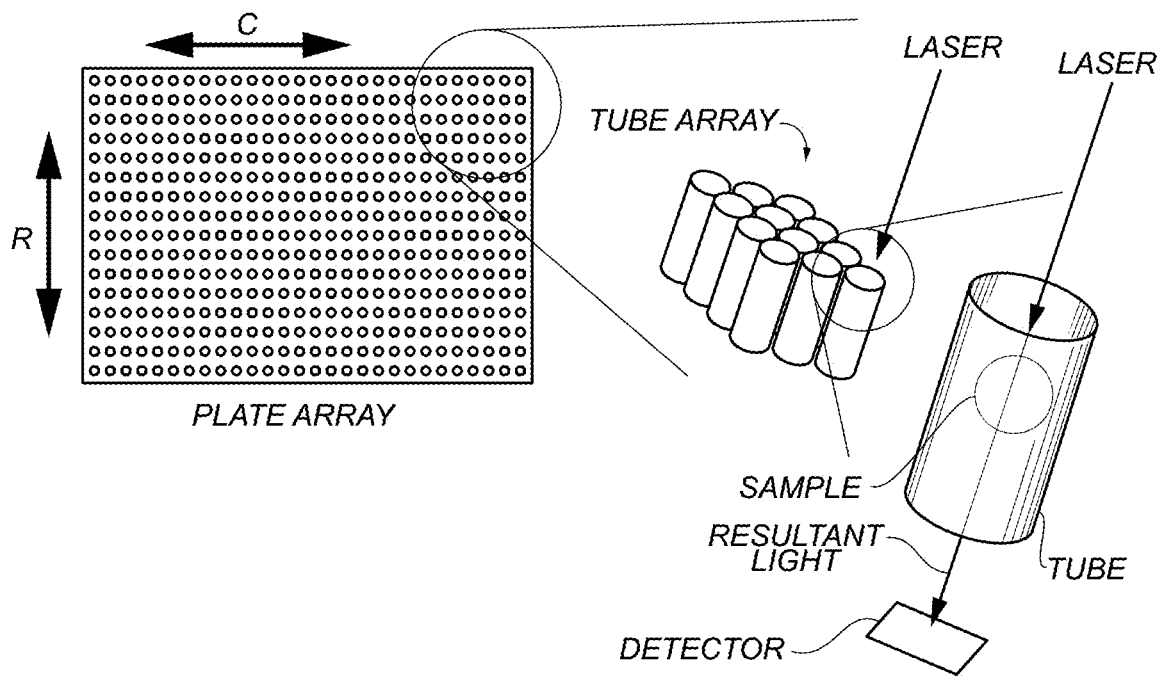
FIG. 30 shows an example system for high-throughput sample measurement.

FIG. 30 shows an example system for high-throughput sample measurement or analysis. Insets are indicated using dash-dot lines. A plate array, e.g., a substantially transparent microwell plate, can hold a plurality of samples, e.g., fluidic samples. In some examples, e.g., as discussed herein with reference to FIG. 20, the plate can include open tubes, and samples can be held in the tubes by capillary action. A laser beam or other incident light can be directed into each tube, e.g., successively in a raster scan across the plate. Additionally or alternatively, multiple wells can be illuminated at once with respective laser beams or other incident light, e.g., from multiple light sources or from one source split, e.g., using partially-silvered mirrors, diffraction gratings, or other optical elements, into multiple beams.

Resultant light from the sample, e.g., fluorescent light or other light as in FIG. 1, 17, 18, 20, 23, or 24, can travel out of the indicated tube (e.g., microwell), e.g., substantially in the direction of travel of the laser or other incident light. This can reduce crosstalk between wells. Other directions of resultant-light travel can additionally or alternatively be used. A detector, e.g., as in FIG. 1, 17, 18, 20, 21, 23, 24, 25, 28, or 29, can detect the resultant light. One tube at a time can be measured, or multiple tubes can be measured concurrently using multiple detectors.

In the illustrated example, the system has R rows of wells and C columns of wells. In some examples, the system is configured with a detector for each row, or for each column, and an irradiation system configured to provide incident light to each tube in a column, or each tube in a row, respectively. This can permit measuring an entire row or an entire column at once, which can increase throughput.

Figure 31:
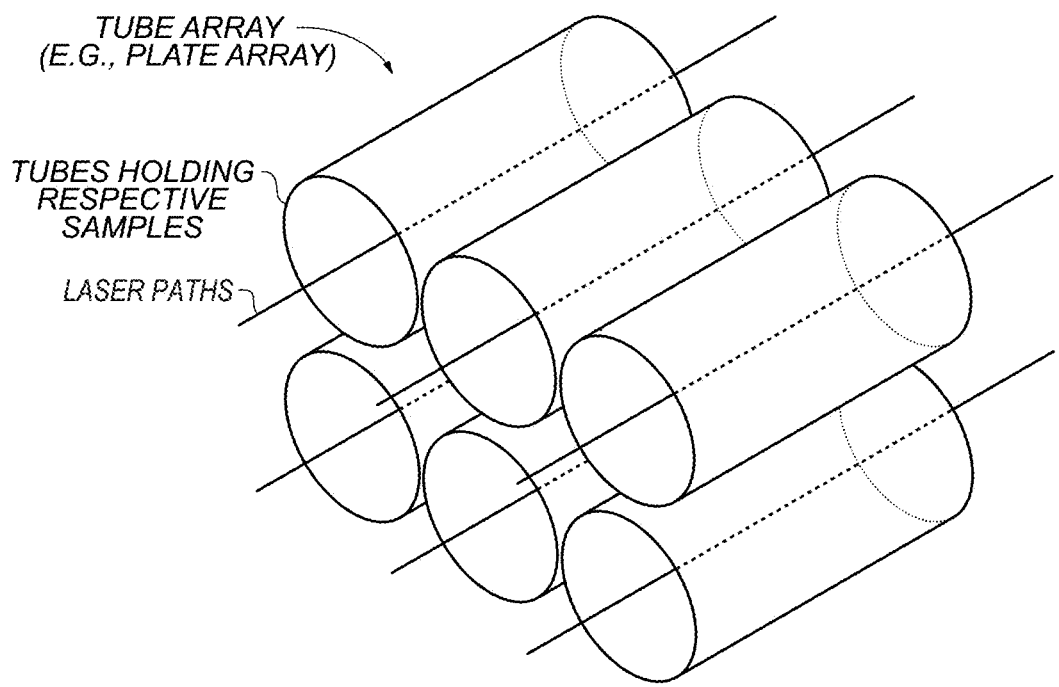
FIG. 31 is an isometric view of tubes in a portion of a plate array such as that in FIG. 30.

FIG. 31 is an isometric view of tubes in a portion of a plate array such as that in FIG. 30. Illustrated are six tubes and, for each, a respective path of the laser beam or other incident light.

Still Further Example Embodiments and Features

Figure 32:
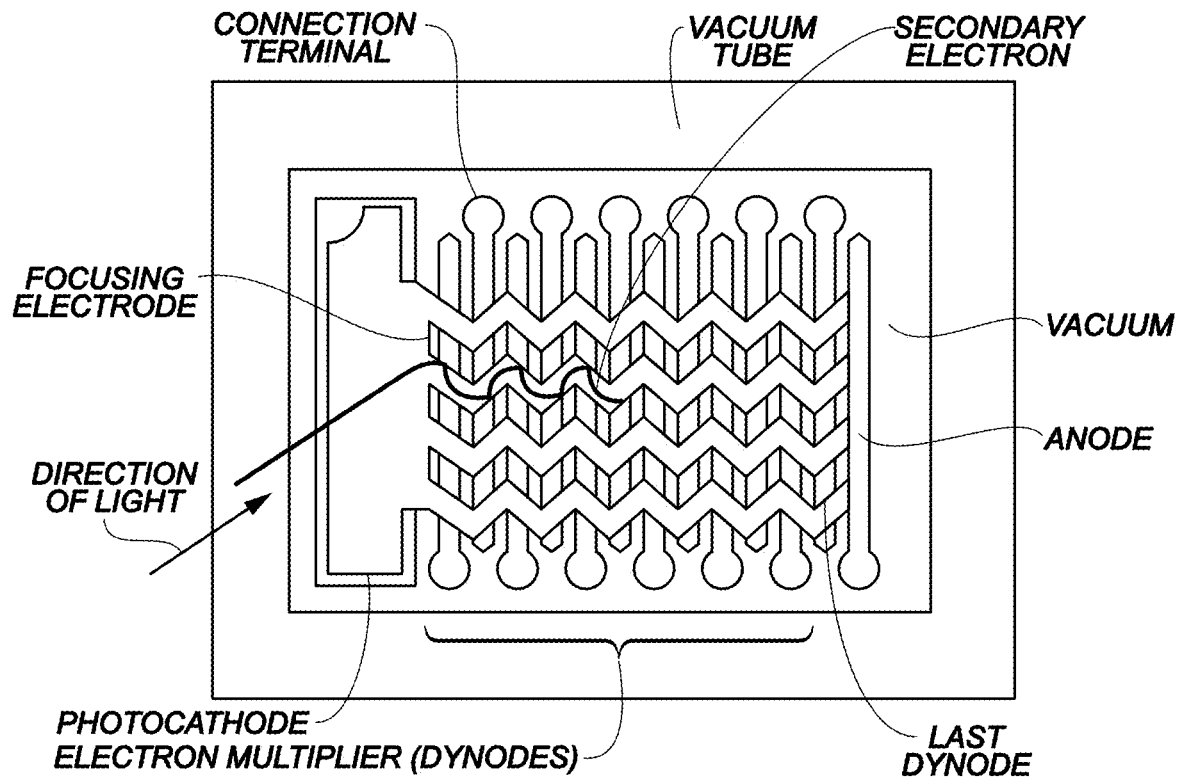
FIG. 32 shows a plan view of an example silicon microelectromechanical system (MEMS) photomultiplier (PM).

FIG. 32 shows a plan view of an example solid-state silicon microelectromechanical system (MEMS) photomultiplier tube (PMT), e.g., sold by HAMAMATSU. The illustrated SSPMT is an example of an SSPD, and can be used instead of or in addition to SiPMs in measurement systems described herein. Unlike a conventional PMT with metal dynode structure, the micro-PMT dynode is made by a Si MEMS process, which accurately produces a small and thin structure. When a photon pulse from a micro-PMT is amplified by a high-speed preamp, it is possible to obtain a photon pulse of 4-5 ns. Example pulse waveforms from such micro-PMTs show lower noise and distortion than some prior PMTs from smaller input capacitance owing to short distance and small area. In addition, a small photocathode area (e.g., 1×3 mm) can achieve very low dark-count rates at room temperature. According to the velocity distribution of cascade electrons, the photon pulse for the PMT can show a continuous photoelectron (PE) level. The combination of low dark count and narrower pulse width can provide a photon detection system with a wider dynamic range. Some PMTs provide gain and dynamic range control on the outputs for both photocurrent and photon mode, permitting calibrating the detected value to the absolute power level for each measurement condition. In some examples, the output from the SSPMT is a current, and an external transimpedance amplifier (TIA) is used to provide a voltage-based photon signal. In some examples, the SSPMT includes or is packaged with a TIA (e.g., in a system-in-package or system-on-chip configuration) and so can produce a voltage-based photon signal. In various examples such as those shown in FIG. 1, 17, 18, 20, 21A-24, or 26A-34, in order to collect fluorescence light and couple to the sensor, fiber- or aberration-free optics can be used.

In some examples, an SSPMT does not exhibit a significant quench or recharge time, unlike an SiPM. For example, there is no structure in some SSPMTs that is required to recharge after a pulse. Therefore, some examples that use an SSPMT and not an SiPM do not use differentiation circuitry such as that shown in FIGS. 4A and 5.

Figure 33:
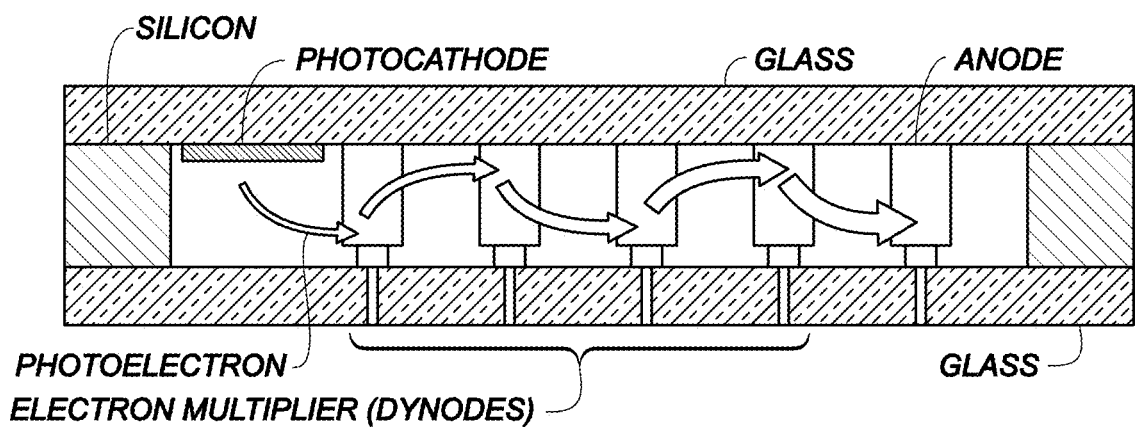
FIG. 33 shows an elevational cross-section of the PM of FIG. 32.

FIG. 33 shows an elevational cross-section of the PMT of FIG. 32. As shown, the PMT has glass covers on the top and the bottom. In some examples, incoming light may reflect off both the top and the bottom of a glass layer due to the difference in indices of refraction between the outside air, the glass, and the inside environment of the PMT (e.g., vacuum or neutral gas). Similarly, light may reflect off both sides of a protective layer (e.g., ~3 μm thick) over an Si base used in a SiPM (e.g., FIG. 2C). This can produce interferometric effects that affect SSPD output. Therefore, in some examples, the protective layer, glass, or other layer(s) through which light travels have anti-reflective (AR) coatings or surface structures, e.g., with one or more layers. In some examples, at least one surface of at least one layer in a SiPM or SSPMT has a metamaterial coating or structure, e.g., a surface nanostructure, configured to reduce reflection at that surface.

Figure 34:
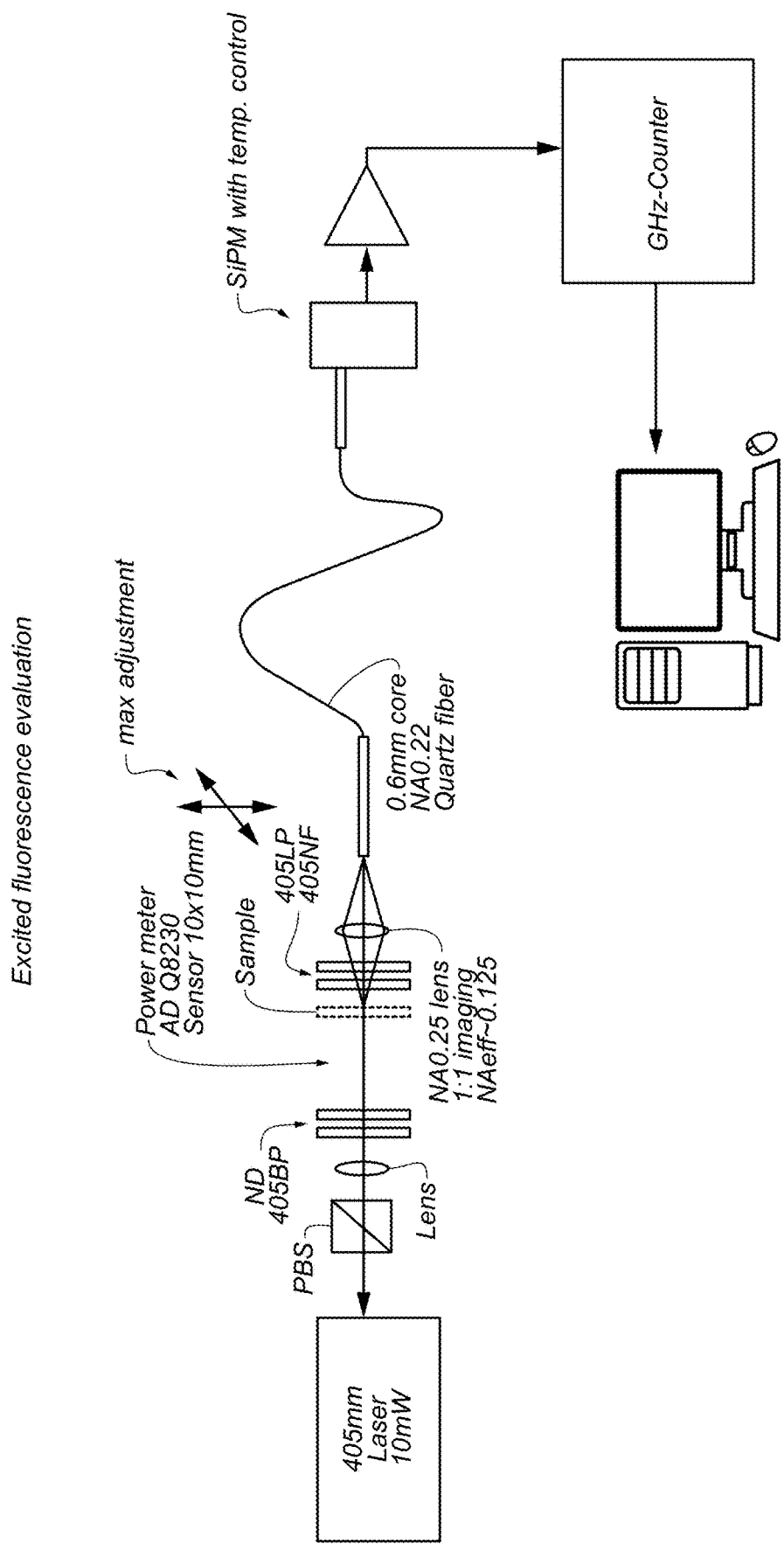
FIG. 34 shows an example photon-counting measurement system, e.g., using a PM.

FIG. 34 shows an example photon-counting measurement system, e.g., using SSPMTs such as shown in FIGS. 32 and 33. The illustrated components and parameters are illustrative and not limiting. In the case of 10 kcps photons at 405 nm, the intensity is approximately 5 fW. This is roughly 1000 times higher sensitivity than is obtained with a conventional photocurrent approach. Various examples of photon counting can distinguish each photocurrent noise cause, permitting more accurate cellular analysis, e.g., of basic material in flow cytometry and biology. Some examples include optical or other components such as described herein with reference to FIG. 1. Similar to FIG. 1, incident light from the laser reaches the sample, and resultant light from the sample is focused by the collection lens into the optical fiber. The optical fiber carries the resultant light (e.g., broadband) to a spectro unit (motor-driven, as shown, or other examples such as those in FIG. 1). A photon sensor, e.g., an SSPMT or other SSPD, measures the resultant light at various wavelengths. The illustrated example shows an amplifier, e.g., a TIA, that amplifies the photon signal. Other example spectral discriminators and photon sensors are described herein with reference to Table 1.

FIG. 34 shows autofluorescence (AFL) evaluation optics in a tested example. An excitation wavelength of 405 nm is the shortest wavelength in the visible region with excitation energy that provides a full visible spectrum longer than the laser wavelength. A laser spot 100 μm in diameter illuminates the sample behind a bandpass filter to remove stimulated spontaneous emission in the laser beam. Excited fluorescence photons are collected by an NA-0.125 lens and coupled to an NA-0.22 optical fiber through a 405-nm notch filter and a long-pass filter to remove excitation photons. Detection occurs at 420-900 nm and count is given as total number of photoelectrons (PEs) without detection-efficiency correction.

Assuming that excited fluorescence is emitting uniformly to any solid angle, the total number of emitted photons is estimated as 1000 times the measured PE number because of lens collection efficiency (1/250) and sensor PDE (¼).

Excited autofluorescence intensity is roughly proportional to illuminating power and sample thickness under fixed optics. In order to compare autofluorescence, an excitation coefficient k is defined as the detected PE number per μW illumination for a 1-mm sample thickness (PEcps/μW mm). Interestingly, quartz, glass, and many materials show AFL and photobleaching. An experiment was performed to check the excitation coefficient before and after photobleaching. Photobleaching is difficult to observe with the noncoherent light source in a conventional fluorescence spectrometer. Lasers can provide very high illumination intensity, over $10^6$ $J/m^2$, which is not proportional to total illumination energy (J). Measurement is first dark count, system AFL, and dry vial for liquid, and finally the sample to calculate a count only for that sample.

As an example, an excitation coefficient of 1000 cps/pW mm means that the total number of emitted photon is estimated as 1 Mcps (1 k×1 kcps) under measurement conditions. A photon measurement of 1 Mcps represents about 1 pW of incident flux captured by the sensor. Illumination at 405 nm/1 μW contains 2.04 Gigaphotons. This equals 1 Mcps/2 Gcps, ~1/2000; it takes 2000 illuminating photons to produce a single emitted photon. Using a measured excitation coefficient, it is possible to estimate the AFL from the illumination level. A material with k=1000 cps/μW mm emits 1 k×1 kcps=1 Mcps, ~1 pW AFL under 1 mW illumination. Several material-evaluation results are shown in Table 3. Table 3 shows the measured excitation coefficient per 1 μW/405 nm exposure and 1-mm sample thickness for basic materials in flow cytometry. Measurements were taken with conditions 405 nm, 1 μW, 100 μm spot, and NA 0.125.

TABLE 3

| Material | Excitation coefficient k (cps/uW mm) | Remark |
|---|---|---|
| Flow cell quartz | 3500-1500 | Photobleach before/after |
| Highest grade quartz | 700-300 | Photobleach before/after |
| Distilled water | 250 | Tube trapping |
| Sheath | 1120 | Tube trapping |
| Clean polymer bead 1 pm in water | 2210 | Tube trapping |
| Clean silica bead 1 pm in water | 10,700 | Tube trapping |
| Y-G highlighter | 1,180,000 | Tube trapping |
| Slide glass borosilicate | 4700 | 1 mm thick |
| Cover glass borosilicate | 3200 (530) | 0.17 mm thick |

Many materials for flow cytometry exhibit autofluorescence, e.g., distilled water, sheath, or clean beads. Yellow-Green dye diluted in water for flow check in a cytometer has a count of 1.2 Mcps/pW mm, meaning roughly one emitted photon for every two excitation photons in the illuminated volume. In order to reduce the influence of AFL from the tube, a trapping method involving illumination along the coaxial direction for liquid-sample evaluation can be used, as discussed herein with reference to FIG. 20.

Figure 35:
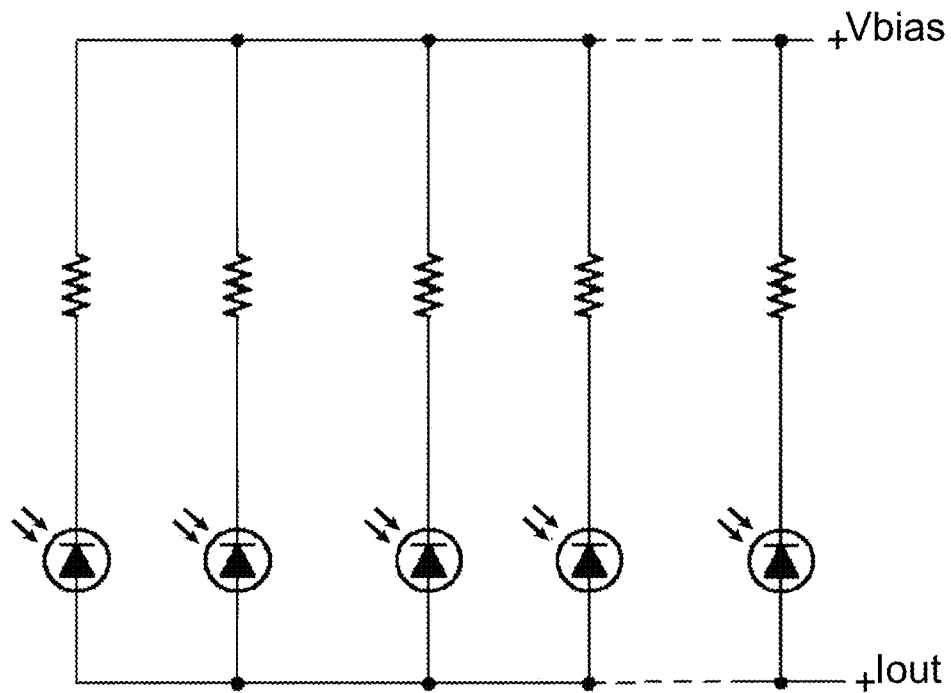
FIG. 35 shows circuitry of an example silicon photomultiplier.
Figure 36:
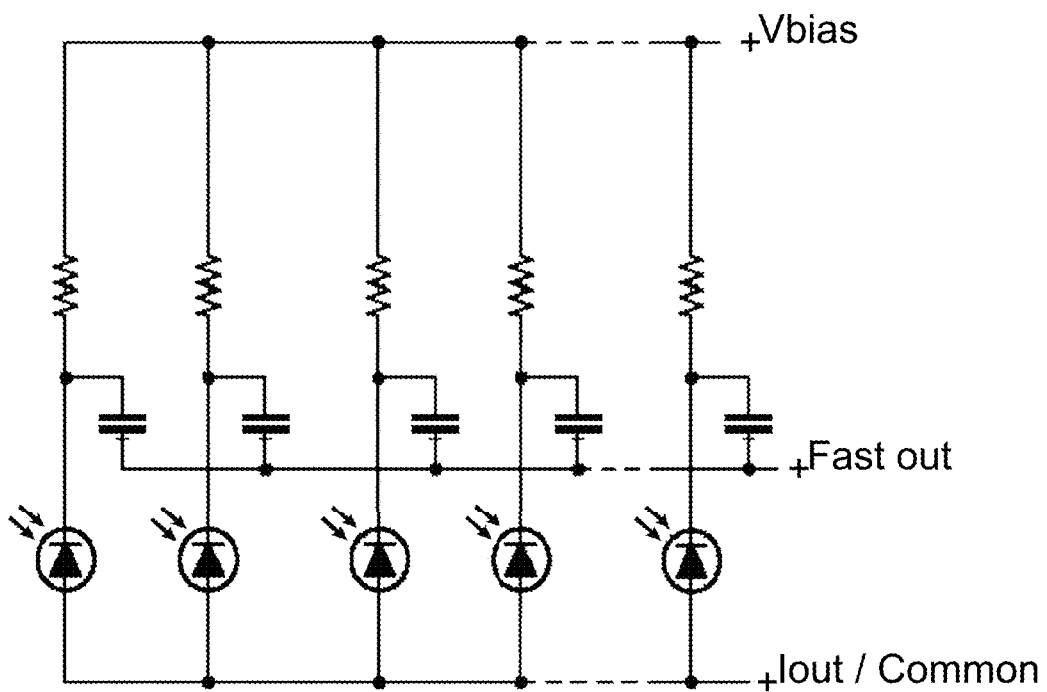
FIG. 36 shows circuitry of an example silicon photomultiplier including a fast readout electrode.

FIG. 35 shows a silicon photomultiplier in which the anodes of an array of photodiodes are connected to a common ground electrode and the cathodes of the array are connected via current limiting resistors to a common bias electrode for applying a bias voltage across the diodes.

FIG. 36 shows an example SiPM in which a third electrode is capacitively coupled to each photodiode cathode to provide a fast readout of the avalanche signals from the photodiodes. When the photodiode emits a current pulse, part of the resulting change in voltage at the cathode will be coupled via mutual capacitance into the third electrode. Using a third electrode for readout avoids the compromised transient performance resulting from the relatively large RC time constant associated with the biasing circuit.

In the illustrated example, the quench resistors and the fast-readout capacitors are connected to the respective cathodes of the photodiodes. In other examples, the quench resistors and the fast-readout capacitors are connected to the respective anodes of the photodiodes. The illustrated example shows a 1-D arrangement of photodiodes. However, the same circuit can be used in a 2-D array such as that of FIG. 3A or 11A by, e.g., wiring all the cathodes in each row together, and to all the cathodes in the other rows (and likewise for the anodes and the fast output electrodes). In some examples, a 2-D array can be segmented, e.g., into multiple groups of rows, the photodiode circuitry in each group connecting to a single cathode and a single anode, and the groups having respective, different cathodes and respective, different anodes.

In some examples, the readout electrode is insulated by Silicon Oxide or another dielectric from all the elements of the SiPM structure but has weak capacitive coupling to each photocell. Such capacitive coupling provides fast, partial (1-10% or so) injection of the signal charge (which is of the order of 0.15 pC/photocell) when the photocell is firing. The capacitance of the third electrode toward other electrodes of the SiPM stays rather low, of the order of 10% of total SiPM capacitance. To implement this electrode, a transparent conductor (for example very thin gold, or a transparent conducting oxide such as Indium Tin Oxide) or a grid-like structure comprising a non-transparent conductor may be used. The third electrode may be galvanically isolated from the first and second electrode. The signal in the third electrode may be induced electrostatically. The third electrode may be coupled to a cathode of the photodiode, for example via a capacitive coupling. The signal in the third electrode may be induced by capacitive coupling between the third electrode and the photodiode cathodes. The capacitance of the third electrode with the photodiode cathodes may be between 2% and 20% of the total silicon photomultiplier capacitance. The capacitance of the third electrode with the photodiode cathodes may be approximately 10%.

Figure 37:
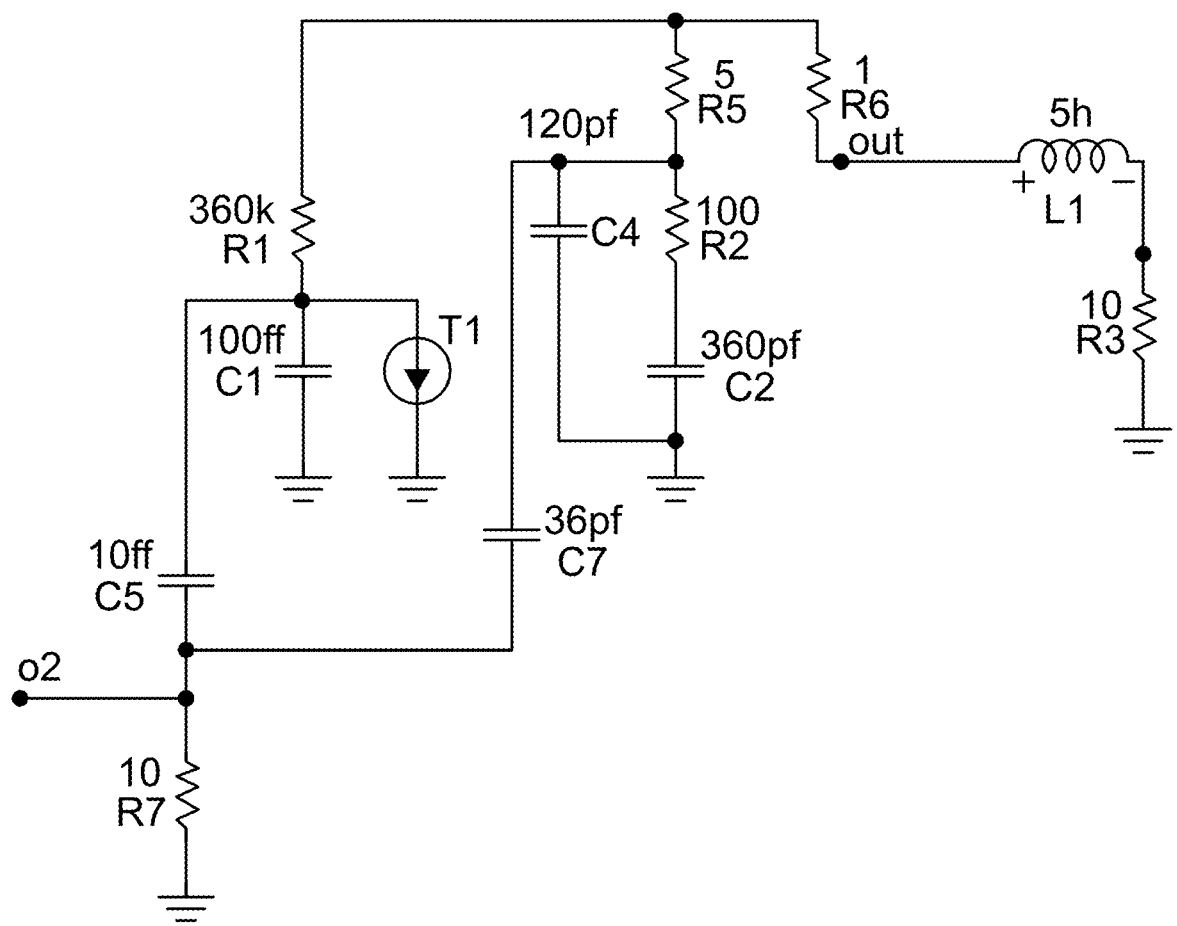
FIG. 37 shows an equivalent circuit illustrating characteristics of the photomultiplier of FIG. 36.

FIG. 37 shows an equivalent circuit showing a manner of operation of various aspects such as that shown in FIG. 36. The current source I1 represents the avalanche current of the diode, C1 the capacitance of the photodiode and C5 the capacitance between the third electrode and the photodiode. The remaining network represents a biasing and readout circuit. In the illustrated example, the current through R7 simulates the readout, unlike some prior schemes using R3. The current through R7 can respond more quickly in both rise and fall than the current through R3. Various examples include reading the output signal from the third electrode using a wideband amplifier with low input impedance. The wideband amplifier may have a bandwidth greater than 200 MHz and may have an input impedance of less than 200 ohms. Various examples include reading the output signal from the third electrode using a current integrating charge amplifier to provide an output proportional to the number of photodiodes firing within a period of time of interest.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: Signal-processing apparatus comprising: a differentiator (e.g., FIG. 1, 4A-6B, or 9) configured to provide a differentiated photon signal based at least in part on a photon signal associated with a photon sensor; and a crossing detector (e.g., FIG. 1, 4A-6B, 7, 9, 10A-10B, or 14) configured to provide a count signal representing a number of times the differentiated photon signal crosses a threshold level.

B: The apparatus according to paragraph A, further comprising a high-pass filter (e.g., FIG. 5) configured to receive an output signal of the photon sensor and provide the photon signal.

C: The apparatus according to paragraph A or B, further comprising: a high-pass filter (e.g., FIG. 5) configured to receive an output signal of the photon sensor and provide a filtered signal; and a pedestal-clamping circuit (e.g., FIG. 5, 9, 10A-10B, 14, or 15) configured to determine the photon signal by adjusting a level of the filtered signal based at least in part on an envelope of the filtered signal.

D: The apparatus according to any of paragraphs A-C, wherein the crossing detector further comprises an adaptive envelope reference unit (e.g., FIG. 5 or 7-9) configured to provide the threshold level by offsetting an envelope level of the differentiated photon signal by a predetermined offset level.

E: The apparatus according to any of paragraphs A-D, further comprising a silicon photomultiplier (SiPM) (e.g., FIG. 1-4C, 11A-11E, 25, 32, 33, or 35-37) configured to receive resultant light from a sample and, in response, provide the photon signal.

F: The apparatus according to any of paragraphs A-E, wherein: the apparatus further comprising a silicon-photomultiplier array sensor (FIG. 28) configured to receive resultant light from a sample and, in response, provide the photon signal; the array sensor comprises multiple blocks associated with respective sensor channels and arranged along a first direction; and each block (e.g., a single row of pixels, or a two-dimensional array of pixels) comprises a plurality of silicon photomultiplier pixels (e.g., SiPM sensor pixels as in FIG. 2A-4D, 11A-11E, 32, 33, or 35-37) (e.g., each block can be a freestanding block, or a portion of an area sensor).

G: The apparatus according to paragraph F, further comprising optics (FIG. 29) configured to: spread out different wavelengths of the resultant light along the first direction (e.g., a spectral discriminator); and spread out light within a particular wavelength along a second direction substantially different from the first direction (e.g., a beam shaper).

H: The apparatus according to any of paragraphs A-G, further comprising a solid-state photomultiplier (e.g., a micro-photomultiplier tube, μPMT™, by HAMAMATSU, or other SSPMT) configured to receive resultant light from a sample and, in response, provide the photon signal.

I: Signal-processing apparatus comprising: a pulse detector configured to provide a pulse-width signal based at least in part on a photon signal associated with a photon sensor; and a pulse counter configured to provide a count signal based at least in part on both a number of pulses of the pulse-width signal and respective widths of individual pulses of the pulse-width signal (e.g., FIG. 14 or 15).

J: The apparatus according to paragraph I, further comprising: a first counting unit configured to count the pulses of the pulse-width signal; a second counting unit configured to count those pulses of the pulse-width signal that have a pulse time greater than a predetermined time (e.g., FIG. 14 or 15).

K: The apparatus according to paragraph J, wherein the second counting unit comprises: a comparator ("COMP 2") configured to provide a signal indicating that a pulse of the pulse-width signal has crossed a predetermined threshold; a delay circuit ("DELAY t0") configured to enable the comparator substantially the predetermined time after a start of the pulse of the pulse-width signal; and a counter ("Upper Counter") configured to count outputs of the comparator.

L: A measurement system, comprising: an optical source configured to irradiate a sample; a solid-state photon detector (SSPD) (e.g., a silicon photomultiplier, SiPM, or solid-state photomultiplier tube, SSPMT) configured to receive resultant light from the sample and, in response, provide a photon signal; and a photon counter configured to receive the photon signal and, in response, provide a count signal, wherein the photon counter comprises: a differentiator configured to provide a differentiated photon signal based at least in part on the photon signal; and a crossing detector configured to provide the count signal representing a number of times the differentiated photon signal crosses a predetermined threshold level (e.g., FIG. 1, 17, 18, 20, 21A-21G, 23-25, 28, or 29) (in some examples, the SSPD can include an anti-reflective coating) (in some examples, optical components of the measurement system can be coated with an optical absorption material, e.g., carbon nanotubes).

M: The system according to paragraph L, wherein: the optical source comprises a laser or other source configured to emit substantially monochromatic light towards the sample; and the system comprises a monochromator (e.g., FIG. 19 or 26A-26B) configured to successively provide a plurality of wavelength bands of the resultant light to the SSPD.

N: The system according to paragraph M, further comprising a drive (e.g., a motor; FIG. 1, 17, 19, 21A-21G, or 25) configured to cause the monochromator to successively provide the plurality of wavelength bands.

O: The system according to any of paragraphs L-N, comprising: illumination optics (e.g., FIG. 1, 17, 18, or 20) configured to substantially focus the light onto the sample.

P: The system according to paragraph O, wherein: the optical source comprises a laser configured to provide a laser beam having a primary wavelength; the illumination optics comprise a laser bandpass filter upstream of the sample along a direction of travel of the laser beam, wherein the laser bandpass filter is configured to absorb light at wavelengths substantially different from the primary wavelength; the illumination optics comprise a laser notch filter configured to substantially block light at the primary wavelength, wherein the laser notch filter is arranged downstream of the sample along the direction of travel of the laser beam; the illumination optics are configured to focus the laser beam on the laser notch filter; and the illumination optics are configured to focus a beam waist of the laser beam proximal to the sample and the notch filter (e.g., FIG. 18 or 20).

Q: The system according to any of paragraphs L-P, further comprising collection optics comprising an optical fiber and configured to convey the resultant light to the SSPD via the optical fiber.

R: The system according to paragraph Q, further comprising illumination optics, wherein the illumination optics, the sample, the collection optics, and the SSPD are arranged in an in-line layout.

S: The system according to paragraph Q or R, wherein: the system comprises a monochromator configured to successively provide a plurality of wavelengths of the resultant light to the SSPD; and the collection optics comprise: a bundle of optical fibers; and a retaining structure configured to arrange the bundle of optical fibers substantially in an elongated shape at an exit of the monochromator and substantially in a circular shape at a port facing the SSPD.

T: The system according to paragraph S, wherein the elongated shape is a substantially rectangular shape having an aspect ratio (long:short) exceeding 3:1.

U: The system according to any of paragraphs L-T, wherein: the optical source comprises a laser or other source configured to emit a beam of light towards the sample; and the system comprises a tube configured to retain the sample and arranged so that the beam does not cross or intersect with the tube within a light-collection area associated with the tube and the sample (e.g., FIG. 20) (in some examples, the system can be configured so that the beam does not cross or intersect with the tube).

V: The system according to any of paragraphs L-U, wherein the photon counter comprises signal-processing apparatus as recited in any of paragraphs A-K.

W: A method, comprising detecting resultant light from a sample using detection equipment recited in any of paragraphs A-V.

X: The method according to paragraph W, further comprising irradiating the sample using irradiation equipment recited in any of paragraphs A-V.

Y: A method, comprising: receiving a photon signal representing resultant light from a sample; providing a differentiated photon signal based at least in part on the photon signal; determining a number of times the differentiated photon signal crosses a predetermined threshold level; and providing a count signal representing the number of times.

CONCLUSION

This disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

Although some features and examples herein have been described in language specific to structural features or methodological steps, it is to be understood that the subject matter herein is not necessarily limited to the specific features or steps described. For example, the operations of example processes herein are illustrated in individual blocks and logical flows thereof, and are summarized with reference to those blocks. The order in which the operations are described is not intended to be construed as a limitation unless otherwise indicated, and any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium that, when executed by one or more processors, enable the one or more processors to perform the recited operations. Accordingly, the methods and processes described above can be embodied in, and fully automated via, software code modules executed by one or more computers or processors. Generally, computer-executable instructions include routines, programs, objects, modules, code segments, components, data structures, and the like that perform particular functions or implement particular abstract data types. Some or all of the methods can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more data processing systems 3901, 3904 or processors 3986, such as one or more internal or external CPUs or GPUs, or one or more pieces of hardware logic such as FPGAs, DSPs, or other types of accelerators.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

The invention claimed is:

1. A measurement system, comprising:
a flow chamber configured to propagate a sample in a flow stream;
one or more optical sources configured to irradiate the sample in the flow stream;
one or more detector systems each configured to receive resultant light from the sample and, in response, provide a photon signal;
wherein each of the one or more detector systems further configured to process the photon signal to count photons based on i) single photon pulses and ii) integrating photo-electron charge over a time interval from the photon stream present in the resultant light.

2. The measurement system of claim 1, wherein each of the one or more detector systems includes one or more semiconductor photomultipliers (SPMs) selected from the group consisting of vacuum-tube based photomultiplier tube (PMT), a solid-state photomultiplier tube (SSPMT), a silicon photomultiplier (SiPM), an avalanche photodiode (APD), and a single-photon avalanche diode (SPAD).

3. The measurement system of claim 2, further comprising one or more dispersion elements configured to successively provide a plurality of wavelength bands of the resultant light to the one or more SPMs.

4. The measurement system of claim 2, further comprising collection optics comprising one or more optical fibers configured to convey the resultant light to the SPMs.

5. The measurement system of claim 1, wherein each of the one or more optical sources is a laser.

6. The measurement system of claim 1, wherein the time interval is less than 100 ns.

7. The measurement system of claim 1, wherein light intensity from the sample in the flow stream is determined by number of counted pulses.

8. The measurement system of claim 1, wherein each of the one or more detector systems is positioned to detect forward scattered light, side scattered light, transmitted light, emitted light or a combination thereof.

9. The measurement system of claim 1, each of the one or more detector systems is a detector array comprising a plurality of detectors.

10. The measurement system of claim 1, each of the one or more detector systems includes a spectral element.

* * * * *